US012064753B2

(12) United States Patent
Jones et al.

(10) Patent No.: US 12,064,753 B2
(45) Date of Patent: Aug. 20, 2024

(54) METAL OXIDE NANOFIBROUS MATERIALS FOR PHOTODEGRADATION OF ENVIRONMENTAL TOXINS

(71) Applicants: The Research Foundation for The State University of New York, Binghamton, NY (US); LEIDOS, Inc., Reston, VA (US)

(72) Inventors: Wayne E. Jones, Vestal, NY (US); Jian Liu, Beijing (CN); William E. Bernier, Endwell, NY (US); Julia B. Tollin, Bellmore, NY (US); Danielle McCarthy, Johnson City, NY (US); Emilly Obuya, Troy, NY (US); Jared DeCoste, Bel Air, MD (US)

(73) Assignee: The Research Foundation for The State University of New York, Binghamton, NY (US)

( * ) Notice: Subject to any disclaimer, the term of this patent is extended or adjusted under 35 U.S.C. 154(b) by 964 days.

(21) Appl. No.: 16/883,425

(22) Filed: May 26, 2020

(65) Prior Publication Data

US 2020/0316577 A1 Oct. 8, 2020

Related U.S. Application Data

(62) Division of application No. 15/069,764, filed on Mar. 14, 2016, now Pat. No. 10,661,261.
(Continued)

(51) Int. Cl.
*B01J 23/42* (2006.01)
*B01J 21/06* (2006.01)
(Continued)

(52) U.S. Cl.
CPC ............. *B01J 31/38* (2013.01); *B01J 21/063* (2013.01); *B01J 23/06* (2013.01); *B01J 23/42* (2013.01);
(Continued)

(58) Field of Classification Search
CPC ... B01J 31/34; B01J 31/16; B01J 21/06; B01J 35/00; B01J 37/08; C02F 1/32; C02F 1/72; D01D 5/00; C04B 35/62
See application file for complete search history.

(56) References Cited

U.S. PATENT DOCUMENTS 7,575,707 B2   8/2009   Xia et al.
7,635,518 B1   12/2009  Misra
(Continued)

FOREIGN PATENT DOCUMENTS

CA    2664837 A1 * 9/2008 ......... B01D 39/2082
CN    101546655 A * 9/2009
(Continued)

OTHER PUBLICATIONS

CA-2664837-A1, Quasi Solid Dye-sensitized Flexible Solar Cell Component and Preparation Method Thereof (Year: 2008).*
(Continued)

*Primary Examiner* — Walter D. Griffin
*Assistant Examiner* — Cameron J Allen
(74) *Attorney, Agent, or Firm* — Hoffberg & Associates; Steven M. Hoffberg

(57) ABSTRACT

Mixed-phase $TiO_2$ nanofibers prepared via a sol-gel technique followed by electrospinning and calcination are provided as photocatalysts. The calcination temperature is adjusted to control the rutile phase fraction in $TiO_2$ nanofibers relative to the anatase phase. Post-calcined $TiO_2$ nanofibers composed of 38 wt % rutile and 62 wt % anatase exhibited the highest initial rate constant of UV photoca-
(Continued)

talysis. This can be attributed to the combined influences of the fibers' specific surface areas and their phase compositions.

20 Claims, 27 Drawing Sheets

Related U.S. Application Data

(60) Provisional application No. 62/132,611, filed on Mar. 13, 2015.

(51) Int. Cl.

| | | |
|---|---|---|
| *B01J 23/06* | (2006.01) | |
| *B01J 31/16* | (2006.01) | |
| *B01J 31/38* | (2006.01) | |
| *B01J 35/39* | (2024.01) | |
| *B01J 35/61* | (2024.01) | |
| *B01J 37/08* | (2006.01) | |
| *C02F 1/32* | (2023.01) | |
| *C02F 1/72* | (2023.01) | |
| *C04B 35/622* | (2006.01) | |
| *C04B 35/624* | (2006.01) | |
| *C04B 35/626* | (2006.01) | |
| *C04B 35/628* | (2006.01) | |
| *D01D 5/00* | (2006.01) | |
| *B01J 35/23* | (2024.01) | |
| *B01J 35/58* | (2024.01) | |
| *B01J 37/03* | (2006.01) | |

(52) U.S. Cl.
CPC ........... *B01J 31/1691* (2013.01); *B01J 35/39* (2024.01); *B01J 35/613* (2024.01); *B01J 35/615* (2024.01); *B01J 37/082* (2013.01); *B01J 37/086* (2013.01); *C02F 1/32* (2013.01); *C02F 1/725* (2013.01); *C04B 35/62259* (2013.01); *C04B 35/624* (2013.01); *C04B 35/62675* (2013.01); *C04B 35/62844* (2013.01); *D01D 5/003* (2013.01); *B01J 35/23* (2024.01); *B01J 35/58* (2024.01); *B01J 37/036* (2013.01); *C02F 2305/08* (2013.01); *C02F 2305/10* (2013.01); *C04B 2235/5264* (2013.01); *C04B 2235/5409* (2013.01); *C04B 2235/85* (2013.01); *Y02W 10/37* (2015.05)

(56) References Cited

U.S. PATENT DOCUMENTS

| | | |
|---|---|---|
| 7,655,112 B2 | 2/2010 | Koslow |
| 7,709,088 B2 | 5/2010 | Nonokawa et al. |
| 7,709,597 B2 | 5/2010 | Tamura |
| 7,718,112 B2 | 5/2010 | Drew et al. |
| 7,789,930 B2 | 9/2010 | Ensor et al. |
| 7,931,683 B2 | 4/2011 | Weber et al. |
| 7,938,855 B2 | 5/2011 | Gregorich et al. |
| 7,942,926 B2 | 5/2011 | Benco et al. |
| 7,976,915 B2 | 7/2011 | Scheuermann et al. |
| 7,981,150 B2 | 7/2011 | Scheuermann et al. |
| 8,002,823 B2 | 8/2011 | Kuehling |
| 8,029,554 B2 | 10/2011 | Holman et al. |
| 8,066,763 B2 | 11/2011 | Alt |
| 8,067,054 B2 | 11/2011 | Weber |
| 8,070,797 B2 | 12/2011 | Flanagan et al. |
| 8,071,156 B2 | 12/2011 | Weber et al. |
| 8,080,335 B2 | 12/2011 | Kawakami et al. |
| 8,187,620 B2 | 5/2012 | Chandrasekaran et al. |
| 8,197,890 B2 | 6/2012 | Misra |
| 8,216,632 B2 | 7/2012 | Schoenle et al. |
| 8,216,961 B2 | 7/2012 | Lee |
| 8,221,822 B2 | 7/2012 | Flanagan et al. |
| 8,225,641 B2 | 7/2012 | Wang et al. |
| 8,231,980 B2 | 7/2012 | Atanasoska et al. |
| 8,263,029 B2 | 9/2012 | Jakli et al. |
| 8,287,937 B2 | 10/2012 | Radhakrishnan et al. |
| 8,318,126 B2 | 11/2012 | Wong et al. |
| 8,329,091 B2 | 12/2012 | Maffia |
| 8,353,949 B2 | 1/2013 | Weber et al. |
| 8,383,539 B2 | 2/2013 | Sumida et al. |
| 8,414,806 B2 * | 4/2013 | Sun .................. C01G 41/02 210/651 |
| 8,415,267 B2 | 4/2013 | Lee |
| 8,431,149 B2 | 4/2013 | McMorrow et al. |
| 8,449,603 B2 | 5/2013 | Weber et al. |
| 8,460,547 B2 | 6/2013 | Sun et al. |
| 8,460,790 B2 | 6/2013 | Ochi et al. |
| 8,540,826 B2 | 9/2013 | Ray et al. |
| 8,562,895 B2 | 10/2013 | Murakami et al. |
| 8,574,615 B2 | 11/2013 | Tenney et al. |
| 8,585,753 B2 | 11/2013 | Scanlon et al. |
| 8,613,363 B2 | 12/2013 | Koslow |
| 8,652,229 B2 | 2/2014 | Ensor et al. |
| 8,684,189 B2 | 4/2014 | Chen et al. |
| 8,685,424 B2 | 4/2014 | Ballard et al. |
| 8,715,855 B2 | 5/2014 | Kawakami et al. |
| 8,721,923 B2 | 5/2014 | Wong et al. |
| 8,771,343 B2 | 7/2014 | Weber et al. |
| 8,815,273 B2 | 8/2014 | Atanasoska et al. |
| 8,815,275 B2 | 8/2014 | Zhou |
| 8,827,192 B2 | 9/2014 | Innerlohinger et al. |
| 8,840,863 B2 | 9/2014 | Yang et al. |
| 8,864,341 B2 | 10/2014 | Davis et al. |
| 8,884,507 B2 | 11/2014 | Davis et al. |
| 8,900,292 B2 | 12/2014 | Gregorich et al. |
| 8,900,610 B2 | 12/2014 | Wellinghoff |
| 8,906,814 B2 | 12/2014 | Lee et al. |
| 8,920,491 B2 | 12/2014 | Flanagan et al. |
| 8,921,473 B1 | 12/2014 | Hyman |
| 8,932,346 B2 | 1/2015 | Kuehling et al. |
| 8,940,244 B2 | 1/2015 | Chen et al. |
| 8,956,910 B2 | 2/2015 | Chao et al. |
| 11,038,184 B2 * | 6/2021 | Park .................. B01D 69/10 |
| 2008/0318046 A1 * | 12/2008 | Schulze-Isfort ....... B01J 21/063 423/613 |
| 2014/0083859 A1 * | 3/2014 | Baeumner .......... B81B 1/006 204/601 |

FOREIGN PATENT DOCUMENTS

| | | | |
|---|---|---|---|
| CN | 101306839 B | * | 6/2010 |
| KR | 20130023328 A | * | 3/2013 |

OTHER PUBLICATIONS

Photocatalyst-Graphenes-Carbon Nano-Fiber Composite and Filter Comprising the Same Document ID; KR 20130023328 A; Yang Kap Seung (Year: 2013).*
CN-101306839-B-Translation (Year: 2010).*
Band alignment of rutile of anatase TiO2 (Year: 2013).*
Ji, Byung Chul, et al. "Photocatalytic Activity of Electrospun PAN/TiO2 Nanofibers in Dye Photodecomposition." Textile Coloration and Finishing (J. of Korea Soc. Dyers and Finishers) 25.2 (2013): 94.
Lee, Sung-Hwan. Photocatalytic nanocomposites based on TiO2 and carbon nanotubes. Diss. University of Florida, 2004.
Kim, Chang Hyo, Bo-Hye Kim, and Kap Seung Yang. "TiO 2 nanoparticles loaded on graphene/carbon composite nanofibers by electrospinning for increased photocatalysis." Carbon 50.7 (2012): 2472-2481.
Song, Chan-Geun, Siva Kumar Koppala, and Jong-Won Yoon. "Characterization of electrospun TiO2 nanofibers and its enhanced photocatalytic property under solar light irradiation." Journal of Ceramic Processing Research 14.6 (2013): 653-657.
Zhu, Peining, et al. "Facile fabrication of TiO2-graphene composite with enhanced photovoltaic and photocatalytic properties by electrospinning." ACS applied materials & interfaces 4.2 (2012): 581-585.

(56) References Cited

OTHER PUBLICATIONS

Nakane, Koji, and Nobuo Ogata. Photocatalyst Nanofibers Obtained by Calcination of Organic-Inorganic Hybrids. INTECH Open Access Publisher, 2010.

Almeida, Nuno. "High efficient TiO2/Eu/graphene visible-light-responsive photocatalysts prepared by electrospinning." (2012).

Duchoslav, J., et al. "Electrospun TiO2 Fibers as a Material for Dye Sensitizied Solar Cells." Proc. of NSTI Nanotech Conference, Boston, MA. 2008.

Memarian, Farnaz, and Masoud Latifi. "Innovative Fabrication of TiO2 Nanofiber Yarns and Considering Their Photocatalytic Activity." Proc. 12th Asian Textile Conf. (2013).

Memarian, Farnaz, M. Amani Tehran, and Masoud Latifi. "Photocatalytic Activity of TiO2 Nanofibers Fabricated From Polyvinyl Acetate (PVAC)." The International Istanbul Textile Congress Istanbul, Turkey. 2013.

\* cited by examiner

UV-Vis analysis- Product of 24 hour photocatalysis of 2CEES $^{13}$C NMR- Hydrolysis of Dimethyl methyl phosphonate Photocatalysis: 100 μM DMMP solution with Pt nanoparticles supported on anatase TiO₂ nanofibers Photocatalysis of 100 µM solution of DMMP with P25 nanoparticles in a quartz vial

METAL OXIDE NANOFIBROUS MATERIALS FOR PHOTODEGRADATION OF ENVIRONMENTAL TOXINS

CROSS REFERENCE TO RELATED APPLICATIONS

This invention is Divisional of U.S. patent application Ser. No. 15/069,764, filed Mar. 14, 2016, now U.S. Pat. No. 10,661,261, issued May 26, 2020, which is a non-provisional of, and claims benefit of priority under 35 U.S.C. § 119(e) from U.S. Provisional Patent Application No. 62/132,611, filed Mar. 13, 2016, each of which is expressly incorporated herein by reference in its entirety.

GOVERNMENT LICENSE RIGHTS

This invention was made with government support under contract W911NF1310235 awarded by the US Army Research Office. The government has certain rights in the invention.

FIELD OF THE INVENTION

The present invention relates to the field of photocatalytic materials, and more particularly to photocatalytic systems and methods for degrading environmental toxins.

BACKGROUND OF THE INVENTION

The present invention describes subject matter that relates to nanotechnology systems and methods that provide rapid decontamination and protection.

Huge amounts of environmental toxins, such as toxic industrial chemicals (TICs), toxic organic dyes, bio-pharmaceuticals, and chemical warfare agents (CWAs), bio-accumulate causing chronic and aesthetic pollution to the surrounding environments and human beings. Nanotechnology can provide novel systems for rapid decontamination and protection through a self-cleaning mechanism. The basic principle of this self-cleaning system is the application of photocatalysis. Nanofibrous photocatalysts use incident irradiation in the UV or visible region of the spectrum to excite an electron from the valence band (leaving behind a hole) to the conduction band of a semiconductor. These photoinduced charge carriers then proceed to form reactive radicals, hydroxyl radicals and super oxide radicals that attack adsorbed chemicals on the surface of the material. Electromagnetic radiation in the form of visible light, ultraviolet light, or even sunlight can be used to achieve enhanced photodegradation that are both rapid and inexpensive compared to the current decomposition techniques that are costly and time consuming. Metal oxide nanofibrous materials represent an alternative approach to conventional composites used in photocatalytic degradation. Their one dimensional morphology is desired compared to traditional nanoparticles; owing to excellent mobility of charge carriers, high surface area to volume ratio, the existence of pores enhancing charge collection and transport.

Metal oxide photocatalysts have been regarded as one of the most active areas in heterogeneous catalysis due to their great catalytic abilities for removing environmental pollutants relating to waste water, polluted air, and chemical warfare agents. Compared with other photocatalytic materials, one-dimensional metal oxide nanofibrous materials are particularly attractive due to their high specific surface area, ease of fabrication and functionalization, and versatility in controlling the fiber diameters and morphologies.

The prior art has taught techniques for decontamination of toxic industrial chemicals and chemical warfare agents on building materials using chlorine dioxide fumigant and liquid oxidant technologies.

Many pharmaceutical and medical facility waste streams are considered hazardous and toxic. Hospitals, nursing homes, private clinics, and laboratories are a growing source of this type of environmental pollution [1-3]. Residual and waste drugs are discarded into environmental waters through sewers with human waste or direct disposal causing serious contamination. A number of conventional techniques, such as dilution and incineration [4], are widely used to minimize the impact, however they still cannot be removed from contaminated water efficiently. Advances in the field of chemistry have resulted in many improved methods for environmental cleanup. One main focus of study has been using photocatalysts to degrade environmental pollutants [5-9].

In 1972, Akira Fujishima and Kenichi Honda first reported that titanium dioxide had a photocatalytic activity [10]. Since the initial discovery, $TiO_2$ has become regarded as an efficient photocatalyst for degradation of organic pollutants from water due to its strong oxidative power, high stability, low cost and environmental friendliness [11-18]. The three polymorphs of $TiO_2$, anatase, rutile and brookite, show very different photocatalytic activities. The photocatalytic activity of $TiO_2$ is related to several different factors including degree of crystallinity, specific surface area, porosity, and crystal size [19-23]. The anatase phase of $TiO_2$ exhibits maximum photocatalytic activity due to its higher adsorption affinity for organic molecules [21] and lower electron-hole recombination rate [25-28].

The most commonly used commercial $TiO_2$ photocatalyst is a nanopowder, which consists of ~25 wt % rutile and 75 wt % anatase. This Degussa P25, shows improved photocatalytic activity over pure anatase or rutile nanopowder. The synergistic effect between the three different $TiO_2$ phases has been widely reported. Zachariah et al. [22] demonstrated that the photocatalytic activity of mixed-phase $TiO_2$ nanoparticles was a function of rutile content with the maximum photocatalytic activity observed for 40 wt % rutile. Su et al. [29] also investigated the influence of the anatase-to-rutile ratios on their photoreactivities. A $TiO_2$ film with ~60 wt % anatase and ~40 wt % rutile exhibited optimal performance and a 50% improved activity compared with pure anatase. However, Pal et al. [30] observed that $TiO_2$ microspheres prepared by spray drying and calcined at 400° C. with 52.2 wt % of rutile phase achieved the best photocatalytic efficiency for degradation of dyes. Boppella et al. [31] found that mixed-phase $TiO_2$ nanoparticles composing 83 wt % brookite and 17 wt % rutile exhibited superior photoactivity compared to Degussa P25 and phase-pure anatase nanocrystals. It is clear that the $TiO_2$ phase compositions and the ratios are the key factors in optimizing photodegradation.

Compared with $TiO_2$ nanoparticles, one dimensional $TiO_2$ nanofibers have attracted considerable attention in recent years for energy applications [32,33] due to their higher surface-to-volume ratio [34], faster electron diffusion to the surface [35, 36] and improved light absorption through the light scattering within the porous structure [34].

See, U.S. Pat. Nos. 8,956,910; 8,940,244; 8,932,346; 8,921,473; 8,920,491; 8,906,814; 8,900,610; 8,900,292; 8,884,507; 8,864,341; 8,840,863; 8,827,192; 8,815,275; 8,815,273; 8,771,343; 8,721,923; 8,715,855; 8,685,424;

8,684,189; 8,652,229; 8,613,363; 8,585,753; 8,574,615; 8,562,895; 8,540,826; 8,460,790; 8,460,547; 8,449,603; 8,431,149; 8,415,267; 8,414,806; 8,383,539; 8,353,949; 8,329,091; 8,318,126; 8,287,937; 8,263,029; 8,231,980; 8,225,641; 8,221,822; 8,216,961; 8,216,632; 8,197,890; 8,187,620; 8,080,335; 8,071,156; 8,070,797; 8,067,054; 8,066,763; 8,029,554; 8,002,823; 7,981,150; 7,976,915; 7,942,926; 7,938,855; 7,931,683; 7,789,930; 7,718,112; 7,709,597; 7,709,088; 7,655,112; 7,635,518; 7,575,707; each of which is expressly incorporated herein by reference in its entirety.

References (each of which is expressly incorporated herein by reference in their entirety):

[1] Fayez, Abdulla, Hani Abu Qdais, Atallah Rabi, "Site investigation on medical waste management practices in northern Jordan", *Waste Management,* 2008, 28, 450-458.

[2] Nemade, Rahul, A R Gajbhiiye, "Need of enhanced biomedical waste management", *International Journal of Research in Engineering and Applied Sciences* (IJREAS), 2014, 2, 15-18.

[3] Orias, Frederic, Perrodin, Yves, "Pharmaceuticals in hospital wastewater: Their ecotoxicity and contribution to the environmental hazard of the effluent", *Chemosphere,* 2014, 115, 31-39.

[4] Hilal, Hikmat S., Ghazi Y. M. Al-Nour, Ahed Zyoud, Muath H. Helal and Iyad Saadeddin, *Solid State Sciences,* 2010, 12, 578-586.

[5] Perez-Estrada, L. A., M. I. Maldonado, W. Gernjak, A. Aguera, A. R. Fernandez-Alba, M. M. Ballesteros, S. Malato, "Decomposition of diclofenac by solar driven photo-catalysis at pilot plant scale", *Catal. Today,* 2005, 101, 219-26.

[6] Boreen, A. L., W. A. Arnold, K. McNeill, "Photodegradation of pharmaceuticals in the aquatic environment: a review". *Aquat. Sci.* 2003, 65, 320-41.

[7] Chatzitakis, A., C. Berberidou, I. Paspaltsis, G. Kyriakou, T. Sklaviadis, I. Poulios, "Photocatalytic degradation and drug activity reduction of Chloramphenicol", *Water Res.* 2008, 42, 386-394.

[8] Kaniou, S., K. Pitarakis, I. Barlagianni, I. Poulios, "Photocatalytic oxidation of sulfamethazine", *Chemosphere,* 2005, 60, 372-80.

[9] Ledakowics, S., M. Soleca, R. Zylla, "Biodegradation, de-colorization and detoxification of textile waste water enhanced by advanced oxidation processes", *J. Biotechnol.* 2001, 89, 175-84.

[10] Fujishima, Akira, Honda Kenichi, "Electrochemical Photolysis of Water at a Semiconductor Electrode", *Nature,* 238, 5358, 37-8.

[11] Dai, K., H. Chen, T. Peng, D. Ke, H. Yi, "Photocatalytic degradation of methyl orange in aqueous suspension of mesoporous titania nanoparticles", *Chemosphere* 69, 2007, 1144-55.

[12] Herrmann, J. M., C. Duchamp, M. Karkmaz, B. T. Hoai, H. Lachheb, E. Puzenat, C. Guillard, "Environmental green chemistry as defined by photocatalysis", *J. of Hazard Mater.* 145, 2007, 624-9.

[13] Carp, O., C. L. Huisman, A. Reller, "Photoinduced reactivity of titanium dioxide", *Prog. Solid State Chem.* 32, 2004, 33-177.

[14] Bizani, E., K. Fytianos, I. Poulios, V. Tsiridis, "Photocatalytic decolorization and degradation of dye solution and wastewaters in the presence of titanium dioxide", *J. Hazard. Mater.* 2006, 136, 85-94.

[15] Hilal, H. S., L. Z. Majjad, N. Zaatar, A. El-Hamouz, "Dye-effect in $TiO_2$ catalyzed contaminant photo-degradation: sensitization vs. charge-transfer formalism", *Solid State Sci.* 2007, 9, 9-15.

[16] Dai, K., H. Chen, T. Peng, D. Ke, K. Yi, "Photo catalytic degradation of methyl orange in aqueous suspension of meso porous titania nanoparticles", *Chemosphere,* 2007, 69, 1361-67.

[17] Chen, C., Z. Wang, S. Ruan, B. Zou, M. Zhao, F. Wu, "Photo catalytic degradation of C. 1. Acid orange 52 in the presence of Zn-doped $TiO_2$ prepared by a stearic acid gel method", *Dyes Pigm.* 2008, 77, 204-209.

[18] Li, Y., X. Li, J. Li, J. Yin, "Photo catalytic degradation of methyl orange by $TiO_2$-coated activated carbon and kinetic study", *Water Res.* 2006, 40, 1119-26.

[19] Tayade, R. J.; Surolia, P. K.; Kulkarni, R. G.; Jasra, R. V. "Photocatalytic Degradation of Dyes and Organic Contaminants in Water Using Nanocrystalline Anatase and Rutile TiO2", *Sci. Technol. Adv. Mater.* 2007, 8, 455.

[20] Baiju, K. V.; Shukla, S.; Sandhya, K. S.; James, J.; Warrier, K. G. K. *J. Phys. Chem. C* 2007, 111, 7612.

[21] Zhang, Z.; Wang, C. C.; Zakaria, R.; Ying, J. Y. *J. Phys. Chem. B* 1998, 102, 10871.

[22] Zachariah, A.; Baiju, K. V.; Shukla, S.; Deepa, K. S.; James, J.; Warrier, K. G. K. *J. Phys. Chem. C* 2008, 112, 11345-11356.

[23] Ding, Z.; Lu, G. Q.; Greenfield, P. F. *J. Phys. Chem. B* 2000, 104, 4815-4820.

[24] Stafford, U.; Gray, K. A.; Kamat, P. V.; Varma, A. *Chem. Phys. Lett.* 1993, 205, 55-61.

[25] Hurum, D. C.; Agrios, A. G.; Gray, K. A.; Rajh, T.; Thurnauer, M. C. *J. Phys. Chem. B* 2003, 107, 4545-4549.

[26] Riegel G., and J. R. Bolton, "Photocatalytic Efficiency Variability in TiO2 Particles", *J. Phys. Chem.* 1995, 99, 12, 4215-24.

[27] Nagaveni, K.; Sivalingam, G.; Hedge, M. S.; Madras, G. *Appl. Catal. B Environ.* 2004, 48, 83-93.

[28] Kolar, M.; Mest Ankova, H.; Jirkovsky, J.; Heyrovsky, M.; Subrt, J. *Langmuir* 2006, 22, 598-604.

[29] Su, Ren, Ralf Bechstein, Lasse So, Ronnie T. Vang, Michael Sillassen, Bjorn Esbjornsson, Anders Palmqvist, and Flemming Besenbacher, *J. Phys. Chem. C* 2011, 115, 24287-92.

[30] Pal, Sudipto, Anna Maria Laera, Antonio Licciulli, Massimo Catalano, and Antonietta Taurino, *I&EC Research,* 2014, 53, 7931-38.

[31] Boppella, Ramireddy, Pratyay Basak, and Sunkara V. Manorama, *Appl. Mater. & Interfaces,* 2012, 4, 1239-46.

[32] Obuya, E. A., W. Harrigan, D. M. Andala, J. Lippens, T. C. Keane, W. E. Jones Jr, *Journal of Molecular Catalysis A: Chemical* 340 (2011) 89-98.

[33] Obuya, Emilly A., Prakash C. Joshi, Thomas A. Gray, Thomas C. Keane, Wayne E. Jones, Jr. *International Journal of Chemistry,* 2014, 6, 1-16.

[34] Mingxing Lu, Changlu Shao, Kexin Wang, Na Lu, Xin Zhang, Peng Zhang, Mingyi Zhang, Xinghua Li, and Yichun Liu, *Appl. Mater. & Interfaces,* 2014, 6, 9004-9012.

[35] Xiang Zhang, Velmurugan Thavasi, S. G. Mhaisalkar and Seeram Ramakrishna, Nanoscale, 2014, 4, 1707-16.

[36] Young-In Lee, Jong-Sik Lee, Eun-Sil Park, Dae-Hwan Jang, Jae-Eun Lee, Kahee Kim, Nosang V. Myung, and Yong-Ho Choa, 2014, 14, 8005-9.

[37] Çitak, M., S. Yilmaz, Y. Dilgin, G. Türker, S. Yagmur, H. Erdugan, N. Erdugan, Osteryoung "Square wave voltammetric determination of phenazopyridine hydrochloride in human urine and tablet dosage forms based on

[38] Yagmur, S., S. Yilmaz, M. Sadikoglu, G. Saglikoglu, M. Yildiz, C. Yengin and E. Kilinc, "Electrooxidation of phenazopyridine hydrochloride and its voltammetric and HPLC determination in human urine and tablet dosage form", Int. *J. Electrochem. Sci.*, 2013, 8, 6818-6828.

[39] David O. Scanlon, Charles W. Dunnill, John Buckeridge, Stephen A. Shevlin, Andrew J. Logsdail, Scott M. Woodley, et al, *Nature Materials*, 2013, 12, 798-801.

[40] Gibson, H.; Truong, Q.; Walker, J.; Owens, J.; Wander, J.; Jones Jr., W. E. "Chemical and Biological Protection and detection in Fabrics for Protective Clothing", *MRS Bull.* 2003, 28(8), 574-578.

[41] Fan, L. J.; Jones Jr., W. E. "A Highly Selective and Sensitive Inorganic/Organic Hybrid Polymer Fluorescence "Turn-on" Chemosensory System for Iron Cations", *J. Am. Chem. Soc.*, 2006, 128(21), 6784-5.

[42] Fegley, M. E. A.; Pinnock, S. S.; Malele, C. N.; Jones Jr., W. E. "Metal-containing conjugated polymers as fluorescent chemosensors in the detection of toxicants", *Inorg. Chem. Acta.* 2012, 381, 78-84.

[43] Rogers, C. W.; Zhang, Y.; Patrick, B. O.; Jones Jr., W. E.; Wolf, M. O. "Photophysical Effect of the Coordination of Water by Ruthenium(II) Bipyridyl Complexes Containing Hemilabile Phosphine-Ether Ligands", *Inorg. Chem.* 2002, 41, 1162-1169.

[44] Stengl, V.; Maoikova, M; Bakardjieva, S.; Subrt, J.; Oplustil, F.; Olsanska, M., "Reaction of sulfur mustard gas, soman and VX agent with nanosized anatase TiO2 and ferrihydrite," *J. Chem. Technolo. Biotechnol.* 2005, 18, 754-758.

[45] Uddin, M. J.; Cesano, F.; Scarano, D.; Bonino, F.; Agostini, G.; Spoto, G.; Bordiga, S.; Zecchina, A., "Cotton textile fibres coated by Au/TiO2 films: Synthesis, characterization and self cleaning properties", *J. Photochem. Photobiol., A: Chem.* 2008, 199 (1), 64-72.

[46] Zhao, X.; Zhao, Q.; Yu, J.; Liu, B., "Development of multifunctional photoactive self-cleaning glasses", *J. Non-Cryst. Solids*, 2008, 354, (12-13), 1424-1430.

[47] Madaeni, S. S.; Ghaemi, N., "Characterization of self-cleaning RO membranes coated with TiO2 particles under UV irradiation", *J. Membr. Sci.* 2007, 303, 221-233.

[48] Meilert, K.; Laub, D.; Kiwi, J., "Photocatalytic self-cleaning of modified textiles by TiO2 clusters attached by chemical spacers", *J. Mol. Catal., A: Chem.* 2005, 237, 101-108.

[49] Textor, T.; Schroter, F.; Schollmeyer, E., "Thin Coatings with Photo-Catalytic Activity Based on Inorganic-Organic Hybrid Polymers Modified with Anatase Nanoparticles", *Macromol. Symp.* 2007, 254, 196-202.

[50] Obuya, E.; Harrigan, W.; Andala, D.; Lippens, J.; Keane, T., Jones Jr. W., "Photodeposited Pd Nanoparticle Catalysts Supported on Photoactivated TiO2 Nanofibers" *Journal of Mol. Catal., A: Chem.*, 340, 2011, 89-98.

[51] Obuya, E.; Harrigan, W.; O'Brien, T.; Andala, D.; Mushibe, E.; Jones Jr. W., "Fabrication of Rh-doped TiO2 nanofibers for Visible Light Degradation of Rhodamine B" *Mat. Res. Soc. Proc.*, 2011, 1352.

[52] Liu, Zhaoyang, et al., "An efficient bicomponent TiO2/SnO2 nanofiber photocatalyst fabricated by electrospinning with a side-by-side dual spinneret method," *Nano letters* 7.4 (2007): 1081-1085.

[53] Zhan, Sihui, et al., "Long TiO2 hollow fibers with mesoporous walls: sol-gel combined electrospun fabrication and photocatalytic properties", *The Journal of Physical Chemistry B* 110.23 (2006): 11199-11204.

[54] Liu, Ruilai, et al., "Fabrication of TiO 2/ZnO composite nanofibers by electrospinning and their photocatalytic property", *Materials Chemistry and Physics* 121.3 (2010): 432-439.

[55] Choi, Sung Kyu, et al., "Photocatalytic comparison of $TiO_2$ nanoparticles and electrospun TiO2 nanofibers: effects of mesoporosity and interparticle charge transfer", *The Journal of Physical Chemistry C* 114.39 (2010): 16475-16480.

[56] Lee, Sung-Hwan, *"Photocatalytic nanocomposites based on $TiO_2$ and carbon nanotubes"* . . . Diss. University of Florida, 2004.

[57] Duchoslav, J., et al., "Electrospun TiO2 Fibers as a Material for Dye Sensitizied Solar Cells", *Proc. of NSTI Nanotech Conference*, Boston, MA. 2008.

[58] Wu, Ning, et al., "Preparation and characterization of Fe3+, La3+ Co-doped $TiO_2$ nanofibers and its photocatalytic activity", *J Eng Fibers Fabrics* 7 (2012): 16-20.

[59] Sundaramurthy, Jayaraman, et al., "Perspective of electrospun nanofibers in energy and environment", *Biofuel Research Journal* 1.2 (2014): 44-54.

[60] Nakane, Koji, and Nobuo Ogata, "Photocatalyst Nanofibers Obtained by Calcination. of Organic-Inorganic Hybrids", *INTECH Open Access Publisher,* 2010.

[61] Lia, Yue, et al., "High Photocatalytic Activity of CdS modified $TiO_2$ Nanofiber Heteroarchitectures via an Electrospinning Method."

[62] Memarian, F., and M. Latifi, "Photocatalytic Activity Of $TiO_2$ Nanofibers Fabricated From Polyvinyl Acetate (PVAC)."

[63] Wu, Ning, et al., "Characterization of PVAc/TiO2 hybrid nanofibers: from fibrous morphologies to molecular structures", *Journal of Applied Polymer Science* 112.3 (2009): 1481-1485.

[64] Lee, J. S., et al., "Photocatalytic Activity via Synthesis of $TiO_2$ Nanowires Controlled Microstructure and Surface Area by Electrospinning Method."

[65] Ji, Byung Chul, et al., "Photocatalytic Activity of Electrospun PAN/$TiO_2$ Nanofibers in Dye Photodecomposition."

[66] Memarian, Farnaz, and Masoud Latifi, "Innovative Fabrication of $TiO_2$ Nanofiber Yarns and Considering Their Photocatalytic Activity."

[67] Almeida, Nuno, "High efficient TiO2/Eu/graphene visible-light-responsive photocatalysts prepared by electro-spinning."

[68] Ding, Rui, et al., "High sensitive sensor fabricated by reduced graphene oxide/polyvinylbulyral nanofibers for detecting Cu (II) in water."

[69] Thirugnanam, Lavanya, et al., "A simple and facile route to synthesize anatase/rutile mixed phase $TiO_2$ nanofibers with superior photocatalytic performance", *International Journal of ChemTech Research* 6.3 (2014).

SUMMARY OF THE INVENTION

The present technology relates to the application of photocatalysis and an electrospinning process to achieve enhanced photodegradation and decontamination of environmental toxins, such as toxic industrial chemicals (TICs), toxic organic dyes, bio-pharmaceuticals, and chemical warfare agents (CWAs). The present invention and materials have the potential to be utilized in environmental decontamination from chemical and biological contaminants, tissue engineering, drug delivery and clothing/textile self-cleaning applications.

The present technology comprises a composition of one-dimensional nanomaterial electrospun nanofibers. The invention employs the application of photocatalysis and irradiation in the UV or visible region of the spectrum to excite an electron from the valence band (leaving behind a hole) to the conduction band of a semiconductor. These photoinduced charge carriers then proceed to form reactive radicals, e.g., hydroxyl radicals, super oxide, carboxylic acid anion radical, benzyl radical, benzonitrile radical, chalcogenide radical, nitrous oxide radical, sulfoxide radical, etc. that attacks proximate chemicals. Electromagnetic radiation in the form of visible light, ultra-violet light, or even sunlight can be used to achieve enhanced photodegradation that are both rapid and inexpensive compared to the current decomposition techniques that are costly and time consuming. Compared with other photocatalytic materials, one-dimensional nanomaterial electrospun nanofibers have attracted considerable attention due to their high specific surface area to volume ratio, ease of fabrication and functionalization, and versatility in controlling the fiber diameter, morphology, and reactivity. Electrospun nanofibers from stable polymers are ideal candidates for catalytic supports as they can provide a large surface area and a high porosity for catalytic applications. Due to the high surface area to volume ratio, electrospun nanofibers can provide many active anchor sites for doping and bonding with other materials such as graphene and metal-organic frameworks (MOFs).

Nanotechnology can provide novel systems for rapid decontamination and protection through a self-cleaning mechanism. The basic principle of this self-cleaning system is the application of photocatalysis. Nanofibrous photocatalysts use incident irradiation in the UV or visible region of the spectrum to excite an electron from the valence band (leaving behind a hole) to the conduction band of a semiconductor. These photoinduced charge carriers then proceed to form reactive radicals, hydroxyl radicals and super oxide radicals that attack adsorbed chemicals on the surface of the material. Electromagnetic radiation in the form of visible light, ultra-violet light, or even sunlight can be used to achieve enhanced photodegradation that are both rapid and inexpensive compared to the current decomposition techniques that are costly and time consuming. Metal oxide nanofibrous materials represent an alternative approach to conventional composites used in photocatalytic degradation. Their one dimensional morphology is desired compared to traditional nanoparticles; owing to excellent mobility of charge carriers, high surface area to volume ratio, the existence of pores enhancing charge collection and transport. One-dimensional metal oxide nanofibrous materials have attracted considerable attention due to their high specific surface area, ease of fabrication and functionalization, and versatility in controlling the fiber diameter and morphology.

Electrospun nanofibers from stable polymers are ideal candidates for catalytic supports as they can provide a large surface area and a high porosity for catalytic applications. In order to develop novel self-cleaning surfaces and substrates for photodegradation of environmental toxins, some fundamental studies have been investigated on the electrospinning technique, calcination temperature influence on $TiO_2$ phase changes and phase transformation rates of pre-calcined polymer fibers with different diameters. Prepared are a variety of electrospun nanofibrous materials such as, anatase $TiO_2$, rutile $TiO_2$, reduced graphene oxide $TiO_2$, $BaTiO_3$, platinum nanoparticles supported on anatase $TiO_2$, ZnO, photoactive dye supported anatase $TiO_2$. These fibers have been characterized by X-Ray diffraction, Scanning Electron Microscopy, Transmittance Electron Microscopy, Raman Microscopy and Energy-Dispersive X-Ray Spectroscopy. Also, electrospun $TiO_2$ nanofibers show excellent UV degradation results on rhodamine B (Rh.B.), phenazopyridine (PAP) and dimethyl methylphosphonate (DMMP). The photocatalytic activity of pure $TiO_2$ fibers is limited by fast electron-hole pairs' recombination and a relative high energy band gap. Some multifunctional $TiO_2$ fibers have been also fabricated to solve these problems. These novel multifunctional materials offer excellent mobility of charge carriers for faster degradation and the possibility to exploit catalytic processes in decontamination.

The preferred fabrication process takes advantage of an electrospinning process, a non-mechanical, electrostatic process that can produce fibers in the nanometer to micrometer range using electrically driven jets of polymer solution or melts. In this process, a high electric field is created between the polymer fluid and an electrically conducting collector screen. At a critical electrical potential which overcomes surface viscosity, a thin jet is produced from the charged polymer fluid at the tip of a pipette or syringe needle. The solvent evaporates rapidly as the jet is drawn through the air to the collector screen where dry fibers accumulate to produce a mat of nanofibers. The obtained polymer fibers are often allowed time to undergo hydrolysis and polycondensation reactions, followed by thermal treatment in order to favor structural stability via sintering, densification, grain growth and phase transformation. Some fundamental studies have been investigated on the electrospinning technique, calcination temperature influence on $TiO_2$ phase changes and phase transformation rates of pre-calcined polymer fibers with different diameters. Some multifunctional $TiO_2$ nanofibers have been also fabricated to improve the photodegradation performance in visible light irradiation. This technology can be used for treatment of polluted waste water, for the improvement of gas masks, for integration with conventional textiles for self-decontaminating garments, and for spray treatments of combat vehicles.

For synthesis procedure, sol-gel method may be used to get the pre-electrospinning solution. A 1:2 weight ratio of polymethylmethacrylate (PMMA): titanium isopropoxide (TIP) was prepared by completely dissolving PMMA in chloroform followed by drop wise addition of TIP with continuous stirring of the reaction mixture for complete dissolution. Small amount of dimethylformamide (DMF) was added to increase the dielectric constant of the composite solution and hence enable the electrospinning process at a high voltage. For example the range of ratios between preformed polymer and nanoparticle precursor is about 1:1 to 1:10. The hydrophobic nature of both PMMA and TIP enabled the formation of a homogeneous solution of the polymer blend. Electrospinning is a non-mechanical, electrostatic process that produces fibers in the nanometer to micrometer range using electrically driven jets of polymer solution. 15-40 kV (~1 kV/cm, acceptable range 0.5 kV/cm to 5 kV/cm) was applied across the syringe needle and the collector screen where the PMMA/TIP solution was spun into composite nanofibers and deposited as a randomly oriented non-woven mat on the collector screen. These polymer fibers were left overnight to undergo hydrolysis reactions, followed by thermal treatment in order to favor structural stability via sintering, densification, grain growth and phase transformation.

During the calcination process, the calcination temperatures are high enough to form $TiO_2$ nanofibers, but are low enough to keep the metal-organic frameworks (MOFs) from degradation. The calcination temperatures typically range from 275° C.-325° C., with a target temperature of 300° C. Based on these calcination temperatures, $TiO_2$ nanofibers show different phase combination, pure anatase, pure rutile or their mixture. The X-ray diffraction (XRD) shows that pure anatase phase of $TiO_2$ shows up at relative lower temperature and it begins to transfer to rutile phase as the temperature increases. It is shown under the same calcination condition polymer fibers with larger diameters have a faster anatase to rutile transformation rates and larger grain sizes.

PMMA/TIP polymer fibers with different diameters can be fabricated by altering the parameters used in sol-gel preparation and electrospinning process.

Novel multifunctional $TiO_2$ fibers include the incorporation of UV, Visible and near IR dyes, such as the N3 dye, to form dye sensitized $TiO_2$ nanofibers for photodegradation of PAP under visible light. N3-dye, for example, can absorb visible light and can get excited to generate free electrons to transfer $TiO_2$, which enlarge the application of $TiO_2$-based photocatalyst. Alternate dyes may include e.g., coumarins, poryphyrins, anthracene, other metal-to-ligand charge transfer dyes (MLCT), thphalacyanines, perylenes.

It is therefore an object to provide a metal oxide nanofiber comprising a crystalline material comprising titanium dioxide having a relative ratio of rutile to anatase of at least 3:97, calcined from small molecule precursors, wherein photoexcitation of electron-hole pairs results in an ability to form reactive radical species of proximate molecules from both the conduction band and the valence band.

It is also an object to provide a method of forming a photocatalyst fiber, comprising: forming a polymeric syspension of titanium oxide precursor; electrospinning the polyol suspension to form a fibrous layer; and calcining the fibrous layer, to produce photocatalytic titanium oxide fibers having a ratio of rutile to anatase of at least 3:97, wherein the photocatalyst fiber is photoexcitable to produce electron-hole pairs with an ability to form reactive radical species of proximate molecules from both the conduction band and the valence band.

It is a still further object to provide a photocatalytic method, comprising: providing nanofibers calcined from small molecule titanium oxide precursors to form a crystalline material comprising titanium dioxide having a relative ratio of rutile to anatase of at least 3:97; photoexciting the nanofibers to form electron-hole pairs; and forming free radicals from surface adsorbed molecules from both the conduction band and the valence band of the photoexcited nanofibers.

The nanofibers may be formed by a process of electrospinning.

The nanofibers may further comprise a catalytic metal, graphene, a dopant, such as to induce semiconductivity in the titanium dioxide, a metal-organic framework (MOF), a UV, visible or infrared dye, especially a chemically reactive dye which either is photoexcitable to transfer an electron to the conduction band of the titanium dioxide, or to transfer a hole (receive an electron) from the valence band of the titanium dioxide.

The nanofibers may comprise a rutile phase and an anatase phase, wherein the rutile phase is adapted to absorb photons, form hydroxyl radicals and hydrogen anions from surface absorbed hydroxyl, and to transfer electrons to the anatase phase; and the anatase phase is adapted to absorb photons, form superoxide radicals from surface absorbed oxygen, and receive electrons from the rutile phase.

The nanofibers may be formed from a polymeric syspension of titanium oxide precursor.

The nanofibers are preferably calcined under such conditions that result in a crystalline substantially inorganic solid having a predetermined ratio of anatase to rutile. For example, the rutile to anatase ratio may be about 38:72. It is particularly noted that, by providing mixed species of titanium dioxide crystalline domains, the separate effects of conduction band excitation and reaction with oxygen to form superoxide, and valence band interaction of water or hydroxyl to form hydroxyl radical or carboxy radical, with electron transfer between the two domains, the photocatalytic activity may be optimized, and generally increased, over a pure anatase or pure rutile nanofiber. The ratio of crystalline forms is controlled by the calcination conditions, such as temperature, humidity, etc.

The nanofibers may be used for breakdown or modification of various chemicals and pollutants. One embodiment provides a gasmask employing a filter comprising the nanofibrous sheet, which is moistened and illuminated with ultraviolet light during use. Volatile organic compounds in the air interact with free radicals generated from oxygen and moisture adsorbed to the nanofibers, which are then broken down. Similarly, a photocatalytic air filter for an HVAC system can also be provided. The nanofibers may also be used within a water processing system to treat/disinfect water, such as tapwater, to degrade pollutants and kill microorganisms. The nanofibers may also used in a system to activate a stream of water, such as for clothes and dishwashing machines, to reduce reliance on chlorine bleach and reduce detergent consumption. The nanofibers may also be used as photoinitiators in processes that require free radical species. Further, the nanofibers may be used in medical applications to provide targeted toxic therapies, such as skin lesions, neoplasia and tumors, and the like, as well as in certain cosmetic procedures. The UV light may come from sunlight, fluorescent/gas discharge lamps, ultraviolet light emitting diodes, or other known sources. In doped or dye linked embodiments, the photoexcitation may be visible or infrared illumination, and for example this is advantageous in medical and cosmetic environments where the ultraviolet illumination is to be avoided. On the other hand, in broadband illumination such as sunlight, one or more photoexcitable dyes may be used to increase efficiency of use of available energy.

The nanofibers may be used in a process to treat an effluent stream, such as an aqueous environmental runoff or industrial waste steam, having a degradable contaminant molecule (e.g., an organic molecule). Illumination of the nanofibers, such as with sunlight, results in generation of hydroxyl radicals and superoxide radicals from water, which degrade the contaminant(s).

These and other objects will become apparent.

BRIEF DESCRIPTION OF THE DRAWINGS

These and other features and advantages of the present invention will become more readily appreciated as the same becomes better understood by reference to the following detailed description when considered in connection with the accompanying drawings, wherein.

DETAILED DESCRIPTION OF THE PREFERRED EMBODIMENTS

Figure 1:
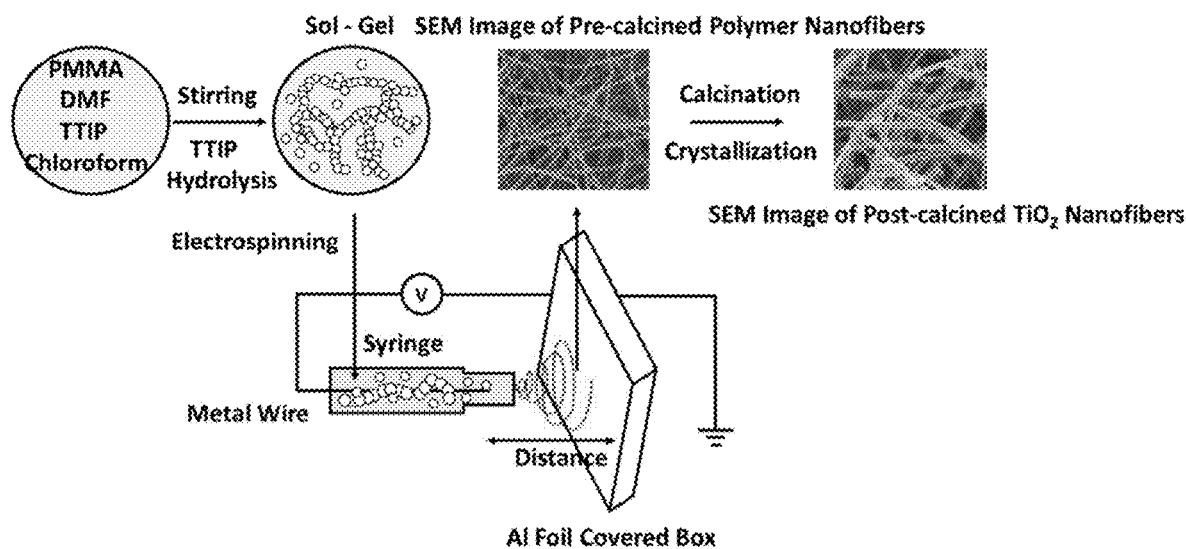
FIG. 1 shows a schematic figure showing three typical processes of fabricating $TiO_2$ nanofibers including sol-gel method, electrospinning technique and calcination treatment.

Certain exemplary embodiments of the present invention will now be described in greater detail with reference to the accompanying drawings.

TiO$_2$ nanofibers were prepared with different rutile fractions ranging from 3 wt % to 97 wt % by adjusting their calcination temperature.

These materials were applied to the photocatalytic degradation of a model pharmaceutical agent, phenazopyridine [2,6-diamino-3-(phenylazo)pyridine hydrochloride, (PAP)], which is used commercially as an analgesic for urinary tract infections [37,38]. Physical characterization combined with determination of initial degradation rate constants provided insight to the mechanism and optimization of these new materials for decontaminating toxic pharmaceutical agents in water.

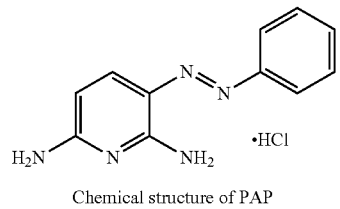 [SMILES: Nc1ccc(/N=N/c2ccccc2)c(N)n1 ; Cl]

Chemical structure of PAP

Example 1

Polymethylmethacrylate (PMMA) (M$_w$ 960,000), titanium isopropoxide (TTIP), N,N-dimethylformamide (DMF), chloroform and phenazopyridine hydrochloride (PAP) (M$_w$ 249.70) were all acquired from Sigma Aldrich and used as received.

1 2 mL of PAP solution with concentration of 144 μM was prepared using DI water as solvent. The solution was transferred into a 16 mL cylindrical quartz container and placed in a fume hood with the lights off. After blanking the UV-Vis Spectrophotometer with DI water in a small quartz cell, an initial reading (marked as T=−60) was taken by diluting 0.5 mL of the PAP solution with 2.0 mL of DI water. Next, 12.0 mg of the catalyst TiO$_2$ nanofibers were added into the 12 mL PAP solution with constant stirring. After 30 and 60 minutes stirring, a 1.0 mL aliquot of the sample was taken and centrifuged for two minutes, which are recoded as sample T=−30 and T=0. Once the sample of T=0 was taken, a UV lamp was turned on at a fixed distance of 9 cm from the center of the quartz cell and 1.0 mL aliquot of the sample was took every 10 minutes and centrifuged for two minutes. Once the centrifuging was complete, 0.5 mL of the upper solution from th e mixture was taken off from the top of the sample and diluted with 2 mL of DI water. The diluted sample was run through the UV-Vis Spectrophotometer and an absorbance spectrum was obtained at T=10, 20, 30, 45, 60.

The electrospun pre-calcined polymer fibers were fabricated using a high voltage Spellman SL 30 generator, where a high electrical potential was applied across the syringe needle attached to a copper wire and the collector screen. The photodegradation experiments were performed using an Oriel 66001 UV lamp with Oriel 68805 40-200 Watt universal Arc lamp power supply, which covered all the UV ranges. The distance between the center of the solution container and the UV lamp was controlled at 9 cm. UV-Visible analysis of the aliquots was performed on an 8452A Hewlett Packard Diode Array spectrophotometer instrument with wavelength from 190 nm to 820 nm to characterize the absorption spectra of the aliquots to determine the phenazopyridine concentration changes and also to identify the degradation products. Sample analyses were performed in distilled water unless otherwise noted. The morphological and structural characteristics of the pre-calcined polymer and after-calcined TiO$_2$ nanofibers were measured by field emission scanning electron microscopy (FESEM, Supra 55 VP from Zeiss equipped with an EDAX energy dispersive X-ray spectroscopy detector), and X-ray diffraction (XRD, PANalytical's X'Pert PRO Materials Research Diffractometer with Cu Kα radiation (λ=1.5418 Å)) respectively. Specific surface area of the samples was measured by Brunauer-Emmett-Teller (BET) method using a surface analyzer.

TiO$_2$ nanofibers were prepared by a typical sol-gel synthesis followed by electrospinning technique and calcination treatment shown in the schematic FIG. 1. A polymeric sol-gel was generated by stirring and hydrolysis of TTIP using 1:2 mass ratio of PMMA:TTIP, where 320 mg of PMMA was dissolved in 2 mL chloroform followed by drop wise addition of 640 mg of TTIP with continuous stirring. 2 mL DMF was then added to increase the dielectric constant of the composite solution required for the electrospinning. The high voltage would pull the precursor sol-gel from the syringe onto the conductive collector forming polymer nanofibers. The resulting polymer fibers were left overnight to allow for complete hydrolysis of TTIP to TiO$_2$ followed by heat calcination for transformation from amorphous phase to crystal phases. By adjusting the calcination temperatures from 285° C. to 600° C., TiO$_2$ nanofibers with different composition fractions of anatase phase and rutile phase can be fabricated under ambient atmosphere for 4 hours.

Figure 2:
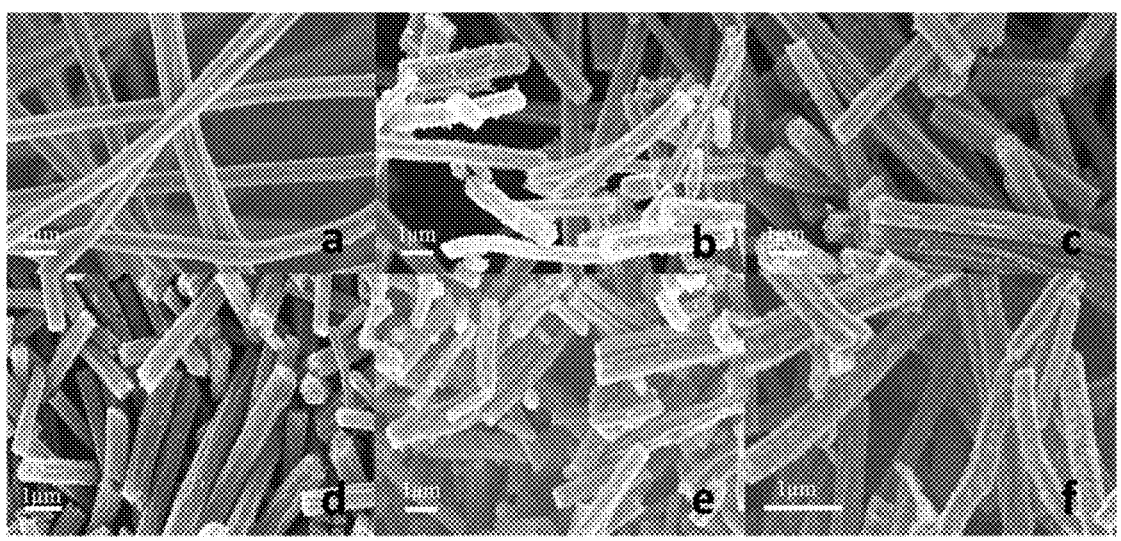
FIG. 2 shows scanning Electron Microscopy images of (a) pre-calcined polymer nanofibers; post-calcined $TiO_2$ nanofibers at (b) 285° C., (c) 320° C., (d) 360° C., (e) 400° C., (f) 600° C. for 4 hours under ambient atmosphere.

FIG. 2 presents six SEM images of pre-calcined polymer fibers and the post-calcined TiO$_2$ fibers followed by calcination after 285° C., 320° C., 360° C., 400° C. and 600° C. for 4 hours under ambient atmosphere. As shown, TiO$_2$ nanofibers after calcination at 285° C., 320° C., 360° C. and 400° C. all had folded surface morphology. And their average diameters didn't change much compared with the pre-calcined polymer fibers shown in table 1. When the temperature increased to 600° C., the morphology of the fibers was obviously different and the diameter shrank a lot. It also showed much smoother surface with a larger grain size from the surface observation.

TABLE 1

Samples prepared under different temperature calcination showing different diameters, rutile fractions and grain sizes.

| Sample in SEM image | Calcination temperature (° C.) | Diameter (nm) | Rutile Fraction (%) | Anatase Phase Grain Size (nm) | Rutile Phase Grain Size (nm) |
|---|---|---|---|---|---|
| A | N/A | 761.6 ± 40.3 | N/A | N/A | N/A |
| B | 285 | 666.0 ± 43.8 | 8 | 16.77 | 33.68 |
| C | 320 | 720.5 ± 40.3 | 16 | 11.18 | 15.55 |
| D | 360 | 676.5 ± 60.0 | 38 | 13.41 | 22.45 |
| E | 400 | 685.3 ± 42.4 | 67 | 16.77 | 25.26 |
| F | 600 | 441.2 ± 41.4 | 97 | 50.25 | 33.68 |

Figure 3:
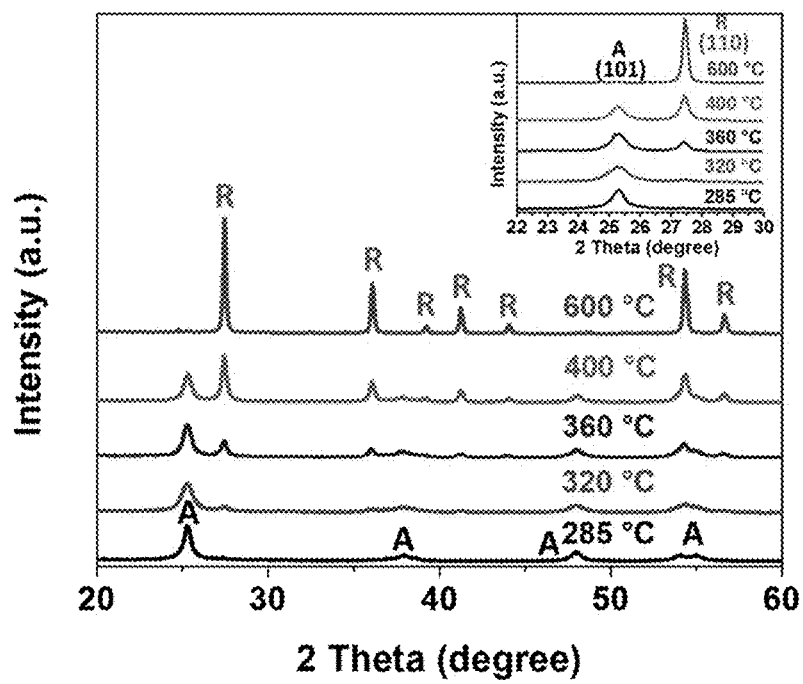
FIG. 3 shows X-ray diffraction patterns of post-calcined $TiO_2$ nanofibers after 285° C., 320° C., 360° C., 400° C. & 600° C. calcinations for 4 hours under ambient atmosphere, where the "A" and "R" in the figure denote the anatase and rutile phases of $TiO_2$, respectively.

The XRD patterns of post-calcined $TiO_2$ nanofibers at 285° C., 320° C., 360° C., 400° C. and 600° C. with 4 hours holding times under ambient atmosphere are shown in FIG. 3. The "A" and "R" in the figure denoted the anatase and rutile phases, respectively. Well defined diffraction peaks for the post-calcined $TiO_2$ nanofibers suggested the presence of both anatase and rutile phases. For anatase phase, the major peaks were obtained at 2 theta values of 25.5°, 37.9°, 48.2°, 53.8°, and 55.0° representing the Miller indices of (101), (004), (200), (105), and (211) planes, while for rutile peaks were observed at 27.6°, 36.1°, 41.2°, and 54.3°, which correspond to the Miller indices of (110), (101), (111), and (211) planes. It was clearly seen that with increasing calcination temperature, the intensities ratio between the rutile phase and the anatase phase increased simultaneously. The weight fraction of anatase-to-rutile transformation in the post-calcined $TiO_2$ nanofibers can be calculated from the equation $W_R=1/[1+0.8(I_A/I_R)]$ [19,26,27], where $I_A$ is the X-ray integrated intensities of the (101) reflection of anatase around 25.5° and $I_R$ is that of the (110) reflection of rutile around 27.6°. The fraction of rutile phase in $TiO_2$ nanofibers was found to increase with increasing calcination temperature from 8% to 97% shown in table 1. Almost pure rutile nanofibers can be prepared around 600° C. calcination for 4 hours under ambient atmosphere.

According to Scherrer Equation based on XRD pattern in FIG. 3, the grain sizes of anatase and rutile phase can be calculated and are listed in Table 1. When calcination temperature increased, the size of anatase and rutile grains increased as well as the rutile fractions. It suggested that the transformation from anatase to rutile phase and the grains growth happened at the same time.

In order to study the influence of rutile fraction in $TiO_2$ nanofiber on the photodegradation activities, six degradation experiments with and without using nanofibers with different rutile fractions were performed under the same condition. 144 μM of PAP solution was used as the initial pollutant for photodegradation. Based on the UV-Vis absorbance peak changes at 428 nm, the PAP concentration changes both in the dark and under UV irradiation were plotted as a function of time shown in FIG. 4. Pure PAP solution without any catalysts was very stable regardless of whether it is maintained in the dark or subjected to UV irradiation. As the weight fraction of rutile phase increased from 8% to 38%, the photodegradation activity of the $TiO_2$ nanofibers improved. However, further increase of the rutile fraction led to a slower degradation activity. All PAP solution could be completely degraded in 45 minutes by using the $TiO_2$ nanofibers with 38 wt % of rutile.

Figure 5:
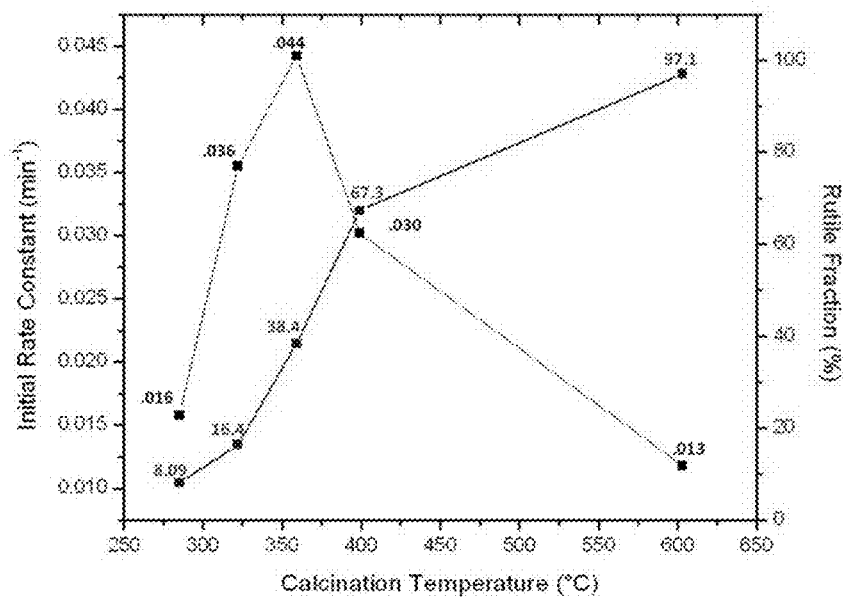
FIG. 5 shows first 30-min initial rate constants for photodegradations under UV irradiation using post-calcined $TiO_2$ nanofibers after 285° C., 320° C., 360° C., 400° C., 600° C. calcination for 4 hours under ambient atmosphere.

FIG. 5 shows first 30-min initial rate constants for photodegradations under UV irradiation using post-calcined $TiO_2$ nanofibers after 285° C., 320° C., 360° C., 400° C., 600° C. calcination for 4 hours under ambient atmosphere.

Figure 4:
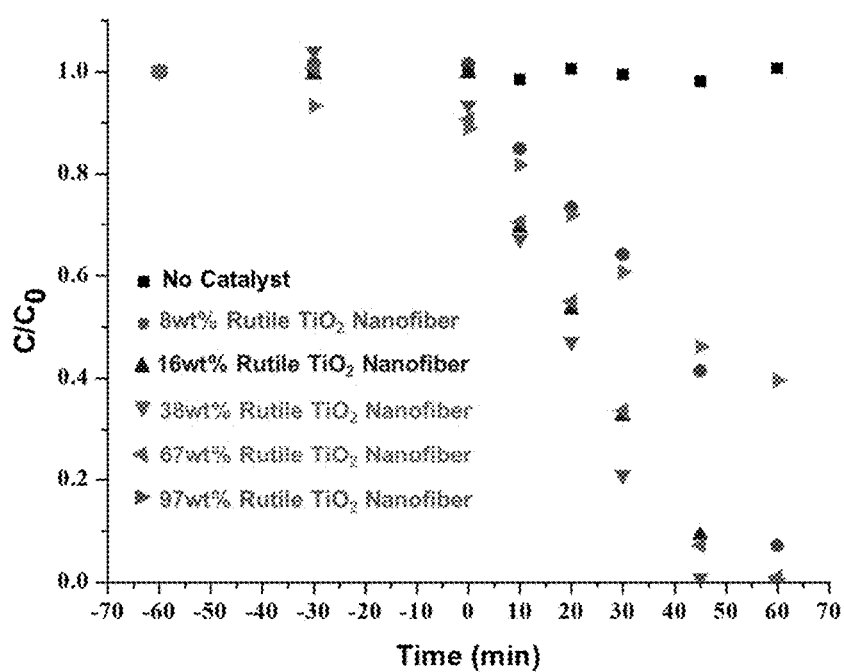
FIG. 4 shows PAP concentration changes based on liquid UV-Vis spectroscopy on aliquots picked up at T=−60, −30, 0, 10, 20, 30, 45, 60 using $TiO_2$ nanofibers with different rutile fractions.

Based on FIG. 4, the data were best fit under pseudo-first-order reaction. The rate constant and the kinetic equation can be expressed as $C=C_0 e^{-kt}$, where t is the reaction time; k is the rate constant; $C_0$ and C are the PAP initial concentration and concentration at reaction time of t, respectively. The initial rate constant k during the first 30-min degradation period using five $TiO_2$ nanofibers with different rutile fractions were calculated and plotted with the rutile fractions together as a function of calcination temperature shown in FIG. 5. It was clear that the initial rate constant of $TiO_2$ nanofibers strongly depends on the rutile fraction in the nanofibers, which could be tuned through the calcination temperature. The optimal initial rate constant was 0.044 $min^{-1}$ using $TiO_2$ nanofibers with 38 wt % of rutile after calcination at 360° C. for 4 hours under ambient atmosphere.

Figure 6:
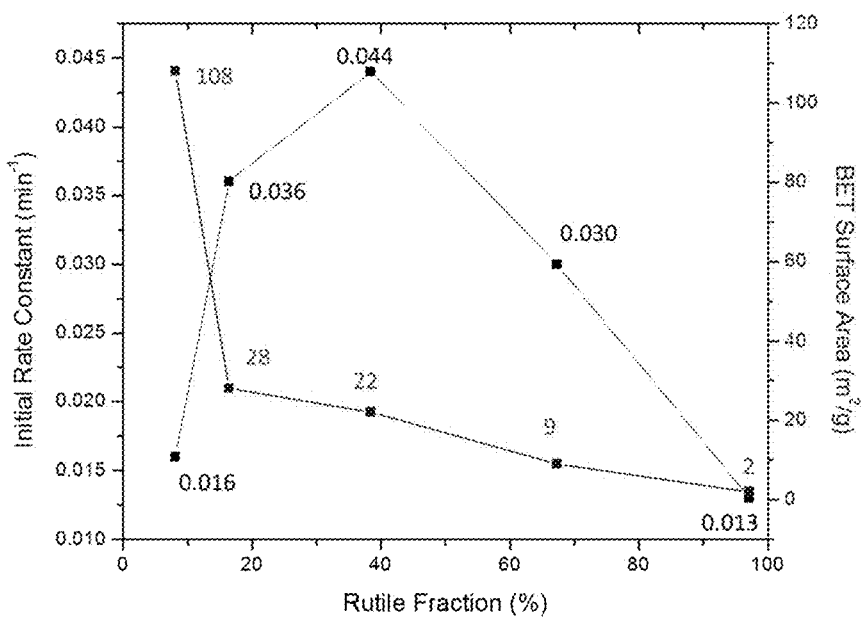
FIG. 6 shows specific surface area measurement of five $TiO_2$ nanofibers with different rutile fraction using Brunauer-Emmett-Teller (BET) method plotted with their initial rate constants during the degradation process as a function of calcination temperature.

FIG. 6 shows specific surface area measurement of five $TiO_2$ nanofibers with different rutile fraction using Brunauer-Emmett-Teller (BET) method plotted with their initial rate constants during the degradation process as a function of calcination temperature.

$TiO_2$ nanofibers with 38 wt % of rutile phase exhibited the best initial rate constant during the PAP degradation process. Specific surface area of the five $TiO_2$ nanofibers was measured by Brunauer-Emmett-Teller (BET) method. The result showed us that, as the rutile fraction increased, the surface area of the $TiO_2$ nanofibers decreased, which suggested that the $TiO_2$ nanofibers with higher fraction of rutile phase had a lower surface area. If other factors are not considered, higher surface area would leave more active sites for $H_2O$ and $O_2$ adsorbed on the surface for the generation of more active radicals to get a better degradation initial rate constant. $TiO_2$ nanofibers with higher surface area have a better initial rate constant. FIG. 6 shows that the $TiO_2$ nanofibers with 38 wt % of rutile and surface area of 22 $m^2/g$ had the best initial rate constant of 0.044 $min^{-1}$ rather than 8 wt % rutile nanofibers with higher surface area of 108 $m^2/g$ got the best initial rate constant. Therefore, it appears that surface area is not the only factor determining the photoactivity efficiency.

Figure 7:
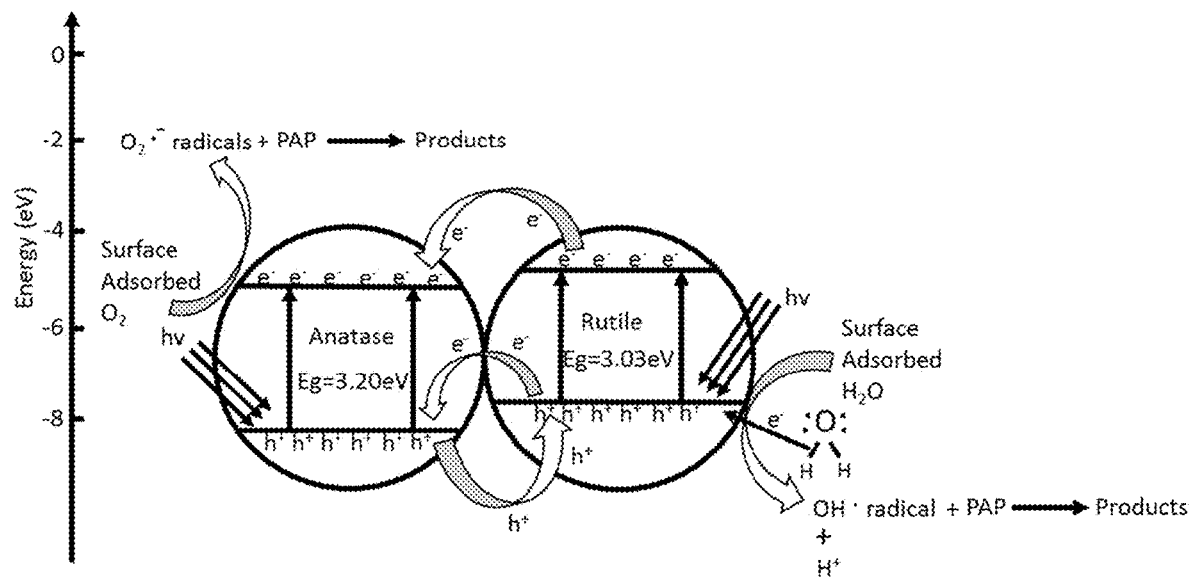
FIG. 7 shows a proposed schematic representation of possible electron-hole separation pathway mechanism for anatase and rutile mixed-phase TiO2 nanofibers during the photocatalysis process of PAP.

FIG. 7 shows a proposed schematic representation of possible electron-hole separation pathway mechanism for anatase and rutile mixed-phase $TiO_2$ nanofibers during the photocatalysis process of PAP.

Rutile fraction difference is believed to be another factor leading to the different initial rate constants. During the calcination process, amorphous phase $TiO_2$ was firstly going to transfer to anatase phase at a relative lower temperature. As the calcination kept going, small anatase crystal would like to grow to a bigger one. The photocatalytic activity principle of anatase and rutile mix-phase $TiO_2$ nanofibers is hypothesized as shown in FIG. 7. Recently a new understanding of the band alignment between rutile and anatase showed that the electron affinity of anatase was higher than rutile and the conduction electrons would flow from rutile to anatase [39], which helped to explain the electron-hole separation during the photodegradation process of PAP. As shown in FIG. 7, between anatase and rutile phases, the photoexcited electrons would migrate from conduction band of rutile to conduction band of anatase. Meanwhile, the electrons in the valence band of rutile also tended to migrate into valence band of anatase. This electron transfer process could also be regarded as the holes transportation from anatase to rutile. This whole process made the excited electron-hole pairs exist separately in the conduction band of anatase and valence band of rutile. This would effectively increase the charge separation, decrease the electron-hole pair recombination and consequently improve the photocatalytic efficiency of the post-calcined $TiO_2$ nanofibers. The electrons and holes were going to separately react with surface adsorbed $H_2O$ and $O_2$ to generate active hydroxyl radicals and superoxide radical anions. These oxidizing radicals would consequently react with PAP and decompose it into some other smaller molecules. During this process, oxygen-hydrogen bond in $H_2O$ was going to break and electrons would migrate into valence band of rutile to replenish the excited missing electrons making the nanofibers reusable.

As the calcination temperature increased, more rutile phase showed up in the post-calcined $TiO_2$ nanofibers. This change made the surface area of post-calcined $TiO_2$ nanofibers decrease. Theoretically, the initial rate constant would decrease as a result of decreased specific surface area. However, more rutile phase in the post-calcined $TiO_2$ nanofibers would help to improve the electron-hole pair separation to increase the initial rate constant. These two factors competed with each other making the 38 wt % of rutile fraction $TiO_2$ nanofibers have the best initial rate constant.

$TiO_2$ nanofibers with different rutile fractions ranging from 3 wt % to 97 wt % were successfully synthesized by sol-gel method followed by electrospinning and calcination at different temperatures under ambient atmosphere. As the calcination temperature increased, the rutile fraction in $TiO_2$ nanofibers increased as well, however the surface area showed an opposite trend. The photocatalytic activity showed that post-calcined $TiO_2$ nanofiber calcined at 360° C. containing 38 wt % of rutile got the highest initial rate constant and the fastest degradation efficiency. 144 μM PAP could be completely removed in 45 mins The existence of an optimum rutile fraction in $TiO_2$ nanofiber can be explained by the competition between less surface area decreasing the generation of radicals and appropriate amount of rutile phase leading to more efficient electron-hole separation and more generation of radicals. 38 wt % rutile $TiO_2$ nanofibers provided a new type of material for the future application in the pharmaceutical waste treatment and other environmental remediation.

Example 2

Figure 8:
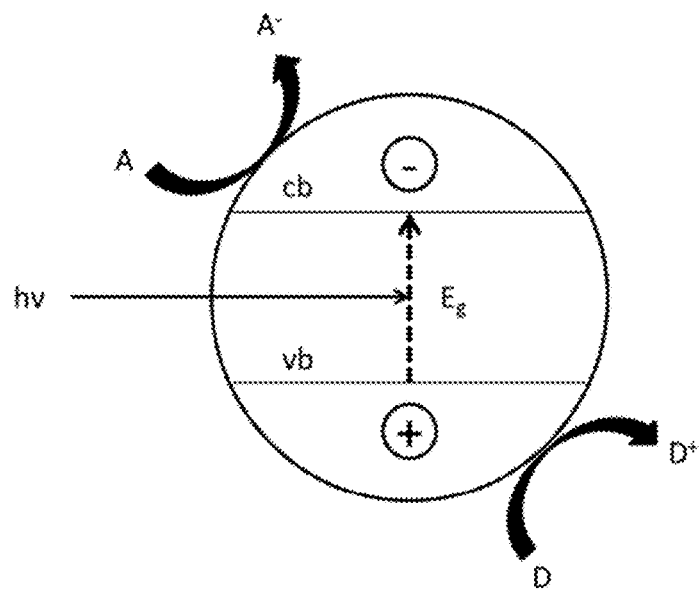
FIG. 8 shows a schematic image of the photodegradation process on the surface of $TiO_2$.

Nanotechnology can provide new approaches to the real time decontamination of liquids and solid surfaces. For example, photocatalytic and self-cleaning ability on the hydrophilic surface of $TiO_2$ have found multiple uses in health, environmental and military applications. Specifically, $TiO_2$-based electrospun fibers have great potential for use in chemical and biological decomposition [44], protective/self-cleaning clothing [40,45], self-cleaning glass [46], and self-cleaning membranes. [47] The basic principle of photocatalytic activity is the use of incident light to excite an electron from the valence band (leaving behind a hole) to the conduction band of a semiconductor. These photoinduced charge carriers then proceed to form reactive radicals, hydroxyl radicals (A−) and super oxide radicals (D+) that attack adsorbed chemicals on the surface of the material, as shown in FIG. 8, which shows a schematic image of the photodegradation process on the surface of $TiO_2$. Previous research on titania modified textiles has concentrated on increasing the number of hydroxyl and carboxyl radicals on the surface of the fiber. [48-49].

Major setbacks in this area of research are the low surface-volume ratios, limiting adsorption capability and photocatalytic activity, and the use of UV light for photoexcitation, which prevents the use of low intensity of typical indoor working conditions. Our objective is to use the electrospinning technique to fabricate $TiO_2$ fibers with large surface area for heterogeneous catalysis. [50,51]

Figure 9A:
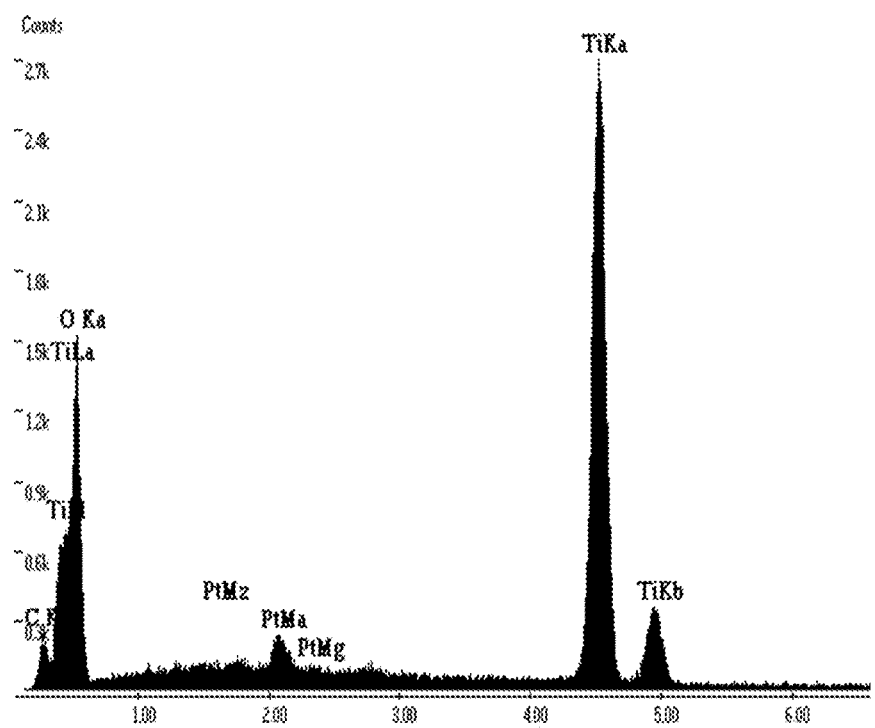
FIGS. 9A, 9B and 9C show an EDS spectrum of 5 wt % Pt—$TiO_2$, showing elemental composition and distribution; a TEM image of $TiO_2$ nanofiber surface decorated with ~4 nm Pt nanoparticles, and an SEM image of $TiO_2$ nanofibers showing the presence of numerous pores on the titania surface.
Figure 9B:
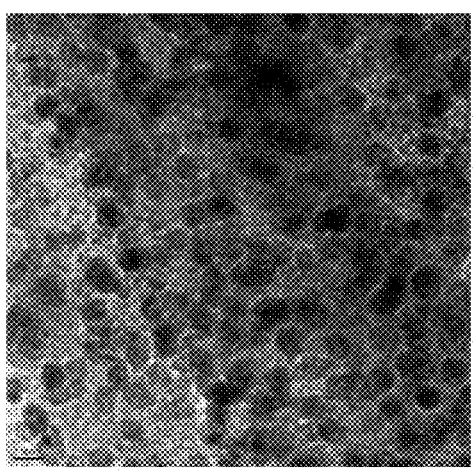
Figure 9C:
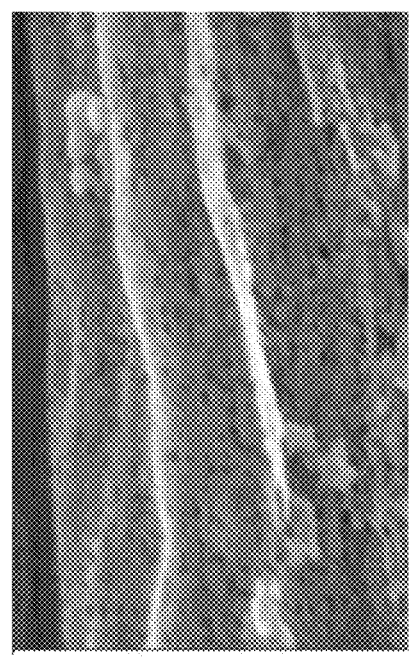

FIGS. 9A-9C shows FIG. 9A: EDS spectrum of 5 wt % Pt—$TiO_2$, showing elemental composition and distribution. FIG. 9B: TEM image of $TiO_2$ nanofiber surface decorated with ~4 nm Pt nanoparticles. FIG. 9C: SEM image of $TiO_2$ nanofibers showing the presence of numerous pores on the titania surface.

Figure 10:
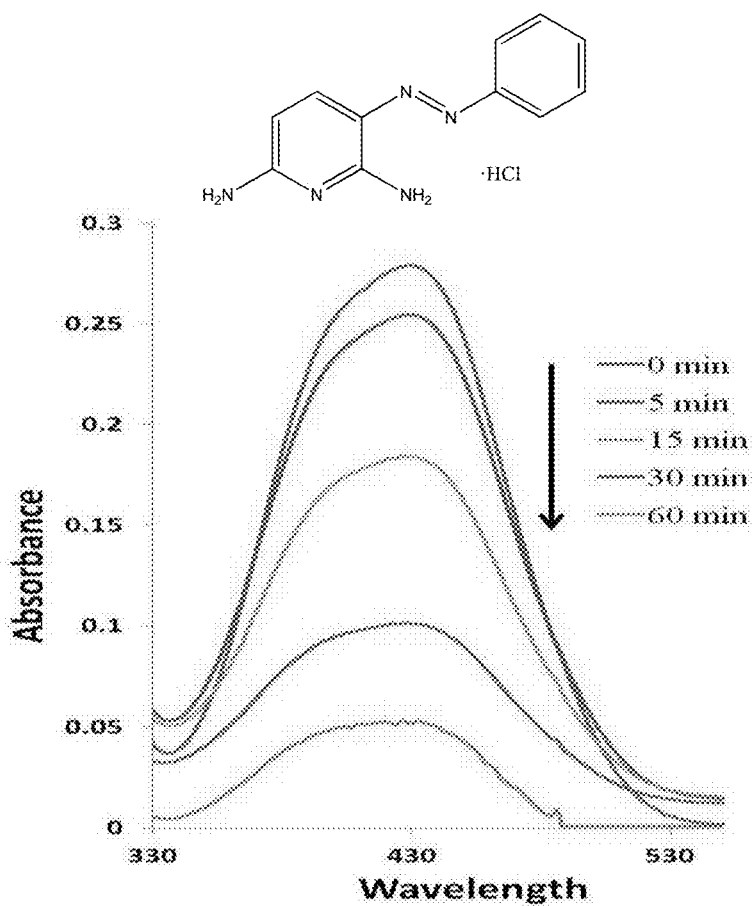
FIG. 10 shows a phenazopyridine structure and UV-Vis absorption spectrum showing the progress of phenazopyridine photodegradation with reaction time.

FIG. 10 shows a UV-Vis absorption spectrum showing the progress of phenazopyridine photodegradation with reaction time.

In addition to metal nanoparticles supported on $TiO_2$ nanoparticles, high surface area graphene nanoparticles may be incorporated into the $TiO_2$ anatase crystallites for increased absorption and diffusion of reactants within the $TiO_2$ surface. Graphene's increased electron conductivity is expected to modify $TiO_2$'s electronic, crystal and surface structures to allow the application of low intensity room lighting for the decontamination of organic pollutants. Preliminary studies have shown successful degradation of phenazopyridine, a pharmaceutical drug, using low intensity room lighting.

Figure 11:
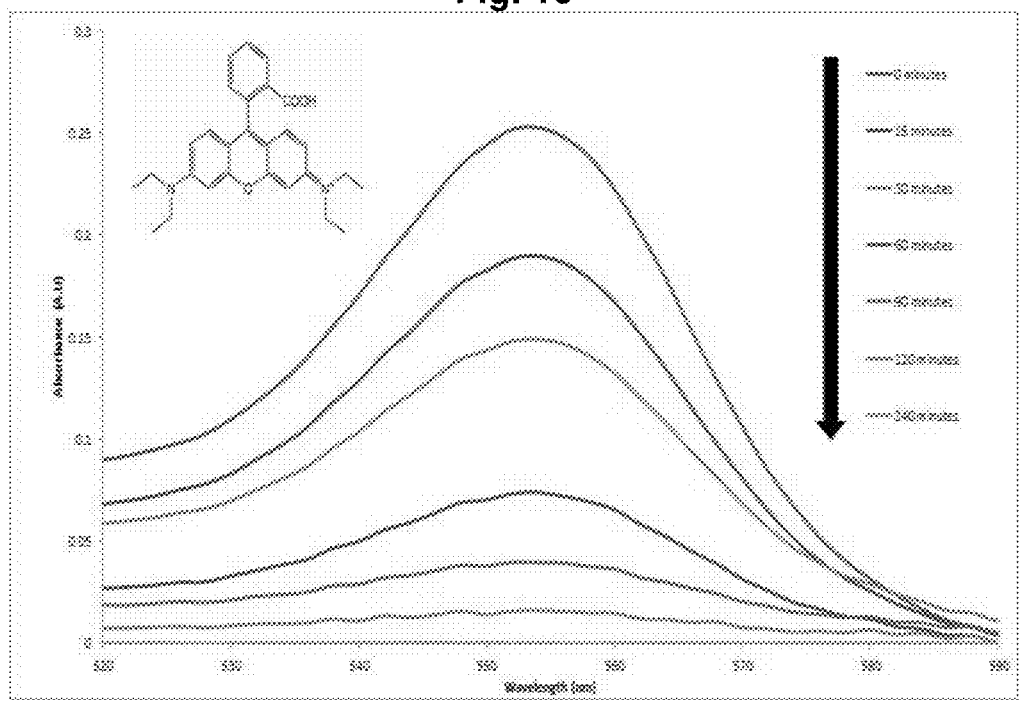
FIG. 11 shows Rhodamine B structure and UV-Vis absorption spectrum showing the progress of Rhodamine B. photodegradation with reaction time.

FIG. 11 shows Rhodamine B Structure, and UV-Vis absorption spectrum showing the progress of Rhodamine B. photodegradation with reaction time. Further investigation into the varying forms of carbon such as amorphous carbon can potentially be said to have an improvement on decontamination of organic pollutants. The presence of amorphous carbon in and throughout the surface of titania will not only increase the surface area but expand the pore size allowing for functionalization. Initial studies have shown promising initial rates of degradation of Rhodamine B. in ultra-violet irradiation. Using the polyol synthesis to deposit noble metals [51] on the surface of $TiO_2$-AC (Amorphous Carbon) metals such as platinum can be used as an anchor for metal organic frameworks for degradation. If successful, the technology and materials developed in this work have the potential to be utilized in environmental decontamination from chemical and biological contaminants, tissue engineering, drug delivery and clothing/textile self-cleaning applications.

Huge amounts of environmental toxins, such as toxic industrial chemicals (TICs), toxic organic dyes, bio-pharmaceuticals, and chemical warfare agents (CWAs), bioaccumulate causing chronic and aesthetic pollution to the surrounding environments and human beings. Systems must therefore be put in place for treatment methods that ensure complete degradation (with no secondary pollution) before being released into the environment. Compared with other photocatalytic materials, one-dimensional metal oxide nanofibrous materials have attracted considerable attention due to their high specific surface area, ease of fabrication and functionalization, and versatility in controlling the fiber diameter and morphology. Electrospun nanofibers from stable polymers are ideal candidates for catalytic supports as they can provide a large surface area and a high porosity for catalytic applications. In order to develop novel self-cleaning surfaces and substrates for photodegradation of environmental toxins, some fundamental studies have been investigated on the electrospinning technique, calcination temperature influence on $TiO_2$ phase changes and phase transformation rates of pre-calcined polymer fibers with different diameters. We have prepared a variety of electrospun nanofibrous materials such as, anatase $TiO_2$, rutile $TiO_2$, reduced graphene oxide $TiO_2$, $BaTiO_3$, platinum nanoparticles supported on anatase $TiO_2$, ZnO, photoactive dye supported anatase $TiO_2$. These fibers have been characterized by X-Ray diffraction, Scanning Electron Microscopy, Transmittance Electron Microscopy, Raman Microscopy and Energy-Dispersive X-Ray Spectroscopy. Also, electrospun $TiO_2$ nanofibers show excellent UV degradation results on Rhodamine B (Rh.B.), phenazopyridine (PAP) and dimethyl methylphosphonate (DMMP). The photocatalytic activity of pure $TiO_2$ fibers is limited by fast electron-hole pairs' recombination and a relative high energy band gap. Some multifunctional $TiO_2$ fibers have been also fabricated to solve these problems. These novel multifunctional materials offer excellent mobility of charge carriers for faster degradation and the possibility to exploit catalytic processes in decontamination.

For synthesis procedure, sol-gel method is used to get the pre-electrospinning solution. A 1:2 weight ratio of polymethylmethacrylate (PMMA): titanium isopropoxide (TIP) was prepared by completely dissolving PMMA in chloroform followed by drop wise addition of TIP with continuous stirring of the reaction mixture for complete dissolution. Small amount of dimethylformamide (DMF) was added to increase the dielectric constant of the composite solution and hence enable the electrospinning process at a high voltage. The hydrophobic nature of both PMMA and TIP enabled the formation of a homogeneous solution of the polymer blend. Electrospinning is a non-mechanical, electrostatic process that produces fibers in the nanometer to micrometer range using electrically driven jets of polymer solution. 15-40 kV was applied across the syringe needle and the collector screen where the PMMA/TIP solution was spun into composite nanofibers and deposited as a randomly oriented non-woven mat on the collector screen. These polymer fibers were left overnight to undergo hydrolysis reactions, followed by thermal treatment in order to favor structural stability via sintering, densification, grain growth and phase transformation.

Example 3

Figure 12:
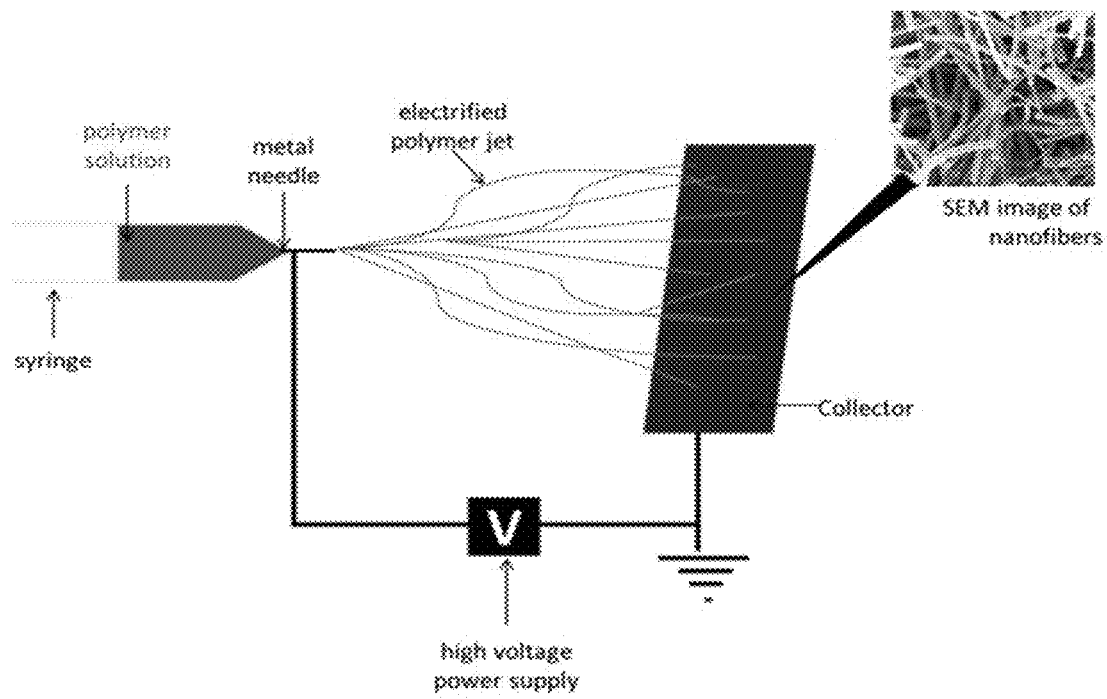
FIG. 12 shows a schematic representation of the electrospinning process.

FIG. 12 shows a schematic representation of the electrospinning process Calcination temperature influence on $TiO_2$ phase changes. Based on the calcination temperatures, $TiO_2$ nanofibers show different phase combination, pure anatase, pure rutile or their mixture. The X-ray diffraction (XRD) in FIG. 13 clearly shows that pure anatase phase of $TiO_2$ shows up at relative lower temperature and it begins to transfer to rutile phase as the temperature increases. The ratios of anatase phase and rutile phase under different temperature are shown in table 1.

TABLE 2

Polymer nanofibers with different diameters prepared under different electrospinning parameters

| PMMA/TIP Polymer Fiber | Diameter (nm) | PMMA:TTIP (mg) | PMMA Molecular Weight | Distance between Tip to Collector (cm) | Voltage (kV) | Humidity |
|---|---|---|---|---|---|---|
| A | 638.4 ± 26.3 | 320:640 | 996,000 | 18 | 25 | 43% |
| B | 761.6 ± 40.3 | 320:640 | 996,000 | 11 | 25 | 85% |
| C | 972.8 ± 134.8 | 320:640 | 996,000 | 11 | 25 | 43% |

PMMA/TIP polymer fibers with different diameters can be fabricated by altering the parameters used in sol-gel preparation and electrospinning process as shown below in Table 2. As shown in Table 2, humidity is and tip distance both influence fiber diameter.

Figure 13:
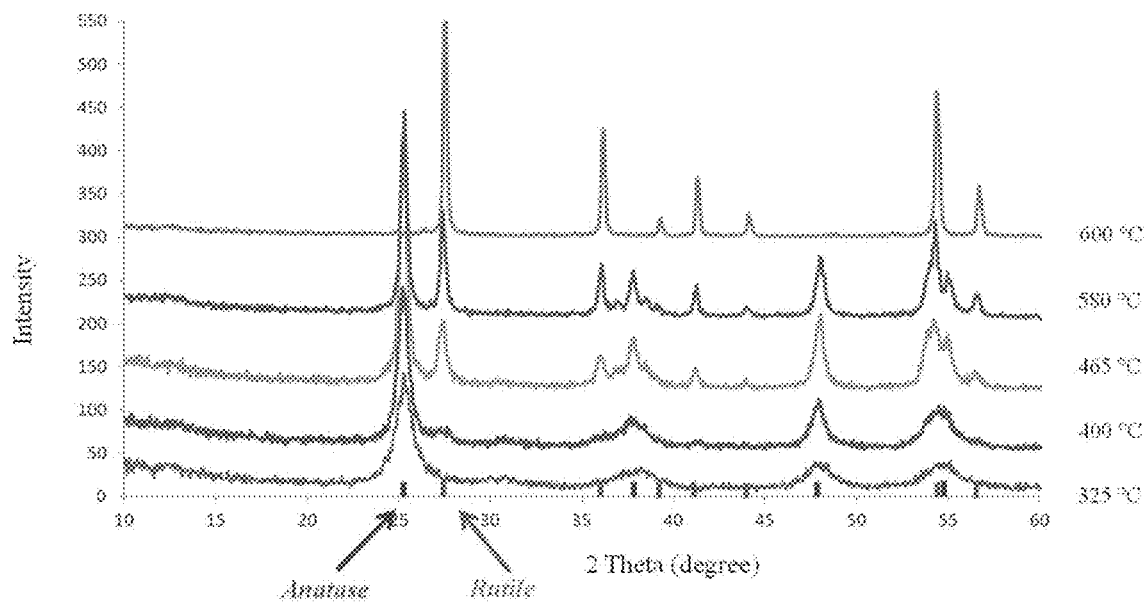
FIG. 13 shows an X-ray diffraction profile of $TiO_2$ nanofibers under different temperature calcination for 4 hrs in air.

FIG. 13 shows X-ray diffraction profile of $TiO_2$ nanofibers under different temperature calcination for 4 hrs in air.

Figure 14:
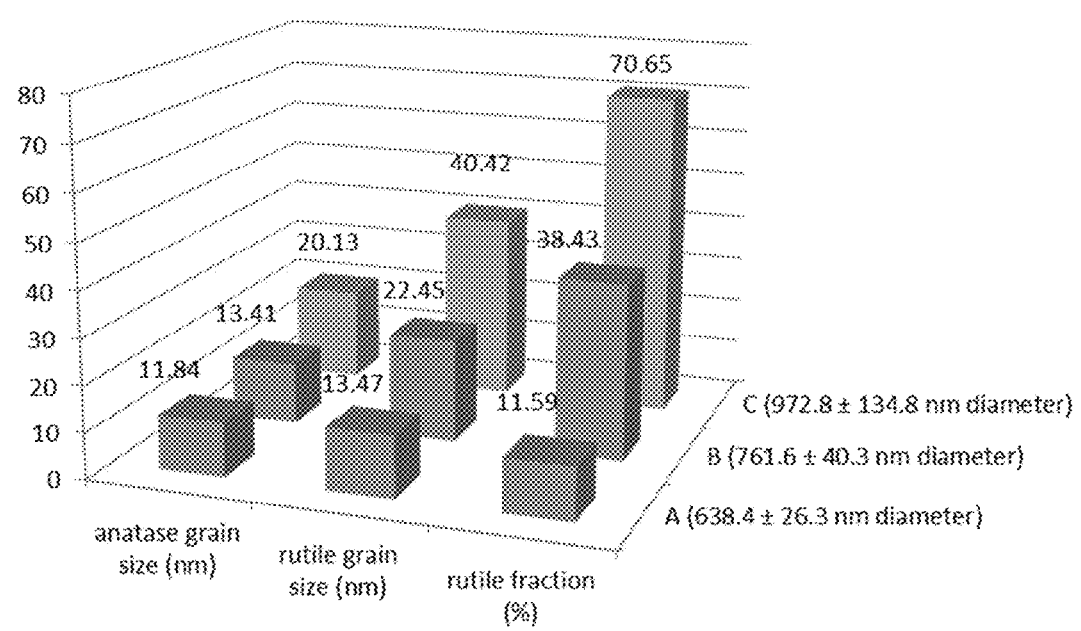
FIG. 14 shows PMMA/TIP polymer fibers with different diameters under calcination at 359° C. for 4 hrs in air.

As shown in FIG. 14, under the same calcination condition polymer fibers with larger diameters have a faster anatase to rutile transformation rates and larger grain sizes.

TABLE 3

Calcination temperature vs. anatase/Rutile phase fraction

| Calcination Temperature (° C.) | Anatase Phase Fraction (%) | Rutile Phase Fraction (%) |
| --- | --- | --- |
| 325 | 100 | 0 |
| 400 | 85 | 15 |
| 465 | 74 | 26 |
| 580 | 61 | 39 |
| 600 | 0 | 100 |

Table 3 shows the phase fraction of anatase and rutile in $TiO_2$ nanofibers under different temperature calcination.

Figure 15:
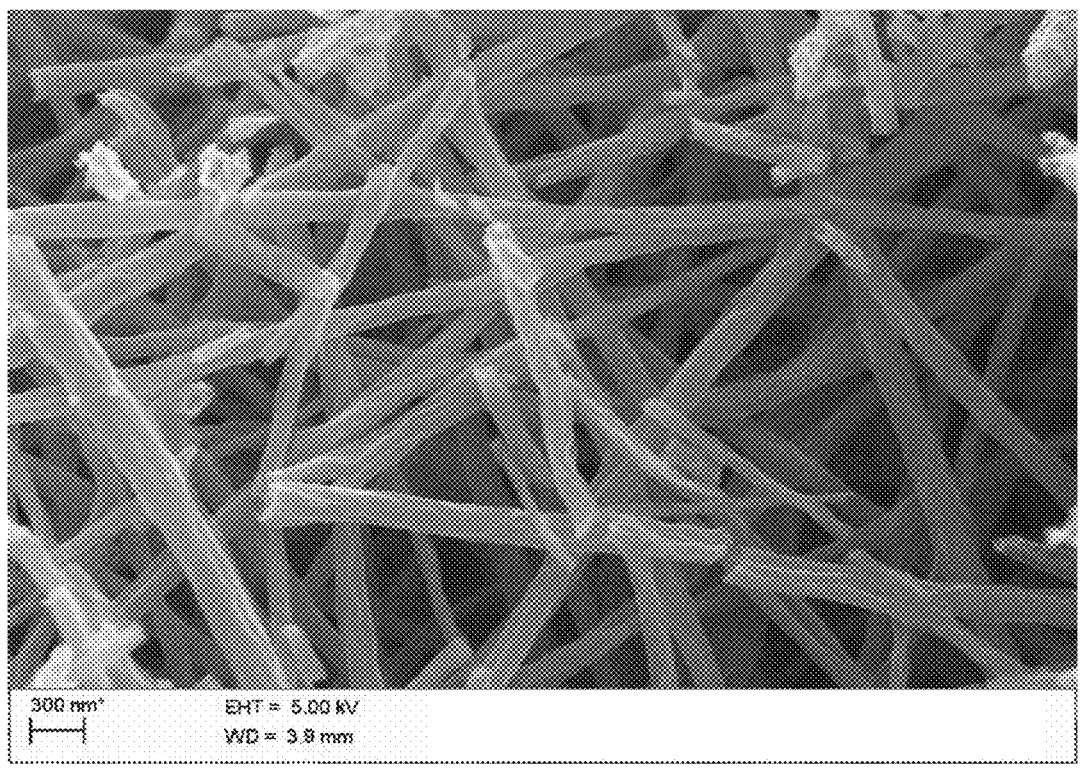
FIG. 15 shows a scanning electron microscopy image of calcined $TiO_2$ nanofibers with diameters of 192.4±10.42 nm.
Figure 16:
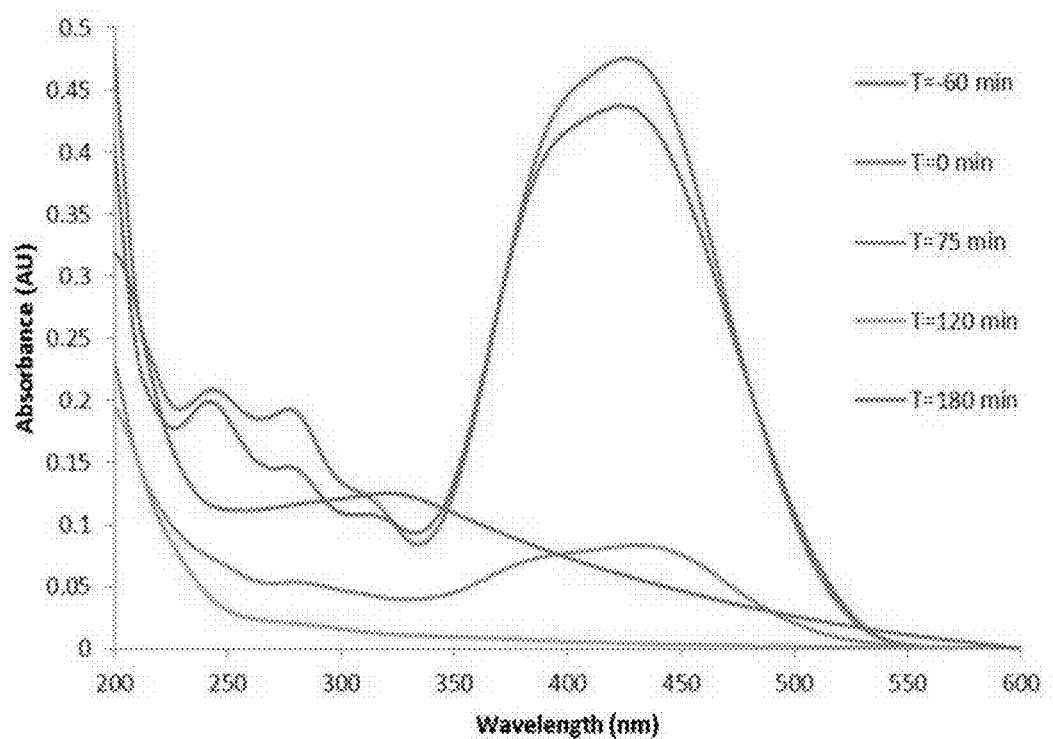
FIG. 16 shows a UV-Vis spectra of PAP solution at T=−60, 0, 75, 120, 180 minutes.

FIG. 14 shows PMMA/TIP polymer fibers with different diameters under calcination at 359° C. for 4 hrs in air Photodegradation of PAP using electrospun $TiO_2$ nanofibers under UV light. $TiO_2$ nanofibers with diameter of 192.4±10.42 nm were fabricated and utilized as the photocatalyst in degradation of PAP solution, as shown in the scanning electron microscopy image in FIG. 15. Firstly, stir PAP solution with catalyst in the dark for 60 mins to ensure adsorption/desorption equilibrium, extract 0.5 ml upper solution and dilute in 3 ml DI water to run UV-Vis analysis (T=−60, 0). Then turn on UV lamp, continue stirring the solution and pick up mixture solution, centrifuge, extract upper solution and dilute after 75 mins, 120 mins and 180 mins irradiations. FIG. 16 shows a UV-Vis spectra of PAP solution at T=−60, 0, 75, 120, 180 minutes. Photodegradation of DMMP using electrospun $TiO_2$ nanofibers under UV light. From UV-Vis spectra in FIG. 16, it can be concluded that the concentration of PAP solution start to decrease after turning on the light. After 120 mins irradiation, almost all the PAP are degraded. At T=180 mins, new product peak is generated.

Figure 17:
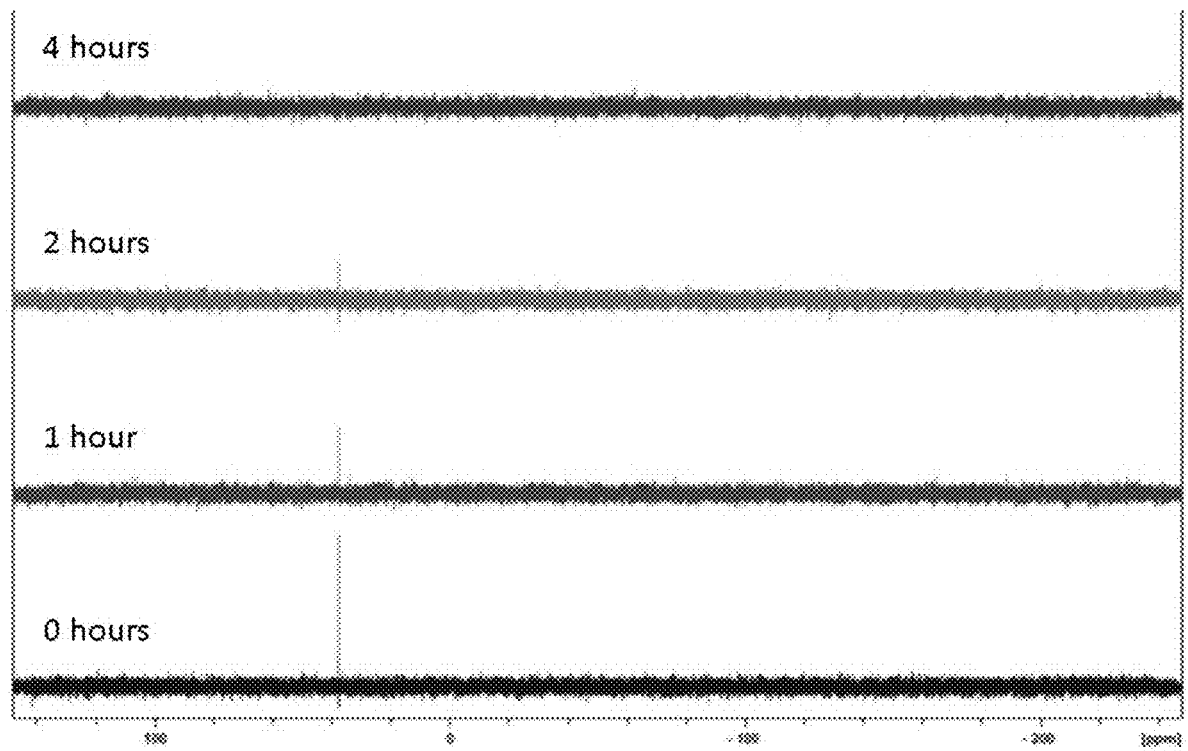
FIG. 17 shows nuclear magnetic resonance of photocatalysis of 100 µM solution of DMMP with P25 nanoparticles in a quartz vial.
Figure 18:
FIG. 18 shows nuclear magnetic resonance of photocatalysis of 100 µM solution of DMMP with anatase $TiO_2$ nanofibers in a quartz vial.

FIG. 17 shows nuclear magnetic resonance of photocatalysis of 100 μM solution of DMMP with P25 nanoparticles in a quartz vial. FIG. 18 shows nuclear magnetic resonance of photocatalysis of 100 μM solution of DMMP with anatase $TiO_2$ nanofibers in a quartz vial. The multifunctional $TiO_2$ fibers-$TiO_2$/Reduced Graphene Oxide (RGO) Nanofibers result in photodegradation of Rh.B under visible light. As shown below in FIGS. 17 and 18, the degradation of DMMP using $TiO_2$ nanofibers is much faster than using P25 nanoparticles that the DMMP peak disappears in 2 hrs using $TiO_2$ nanofibers while it took 4 hrs using P25 nanoparticles.

Figure 19:
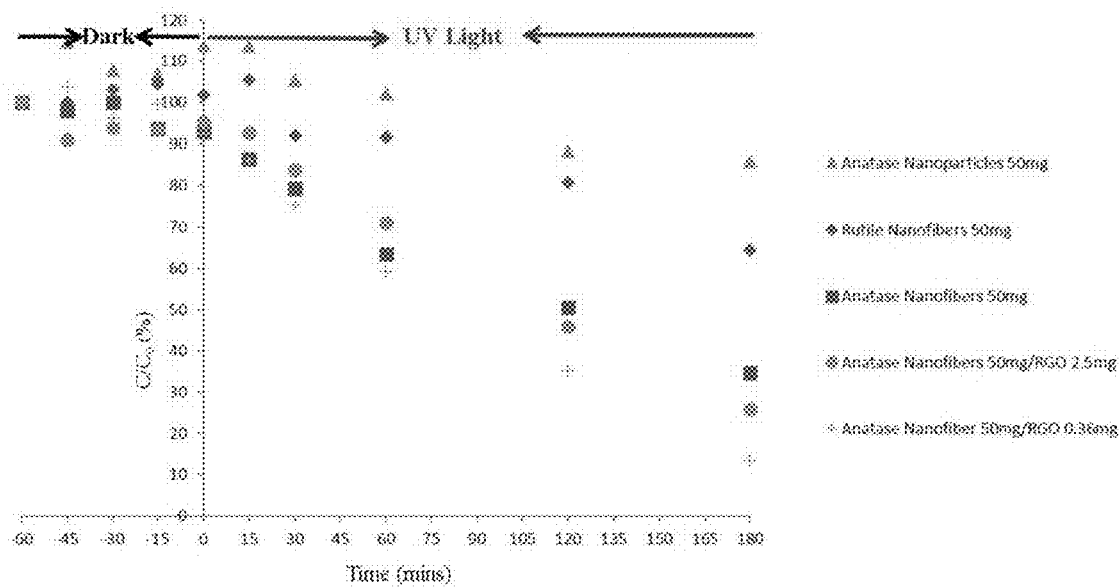
FIG. 19 shows the relationship between time and Rh.B concentration percentage.

FIG. 19 shows that $TiO_2$/RGO nanofibers have a faster degradation rate than any other catalyst for photodegradation of Rh.B. under visible light. The best mass ratio between $TiO_2$ and RGO is still under study.

Figures 20A, 20B, 20C:
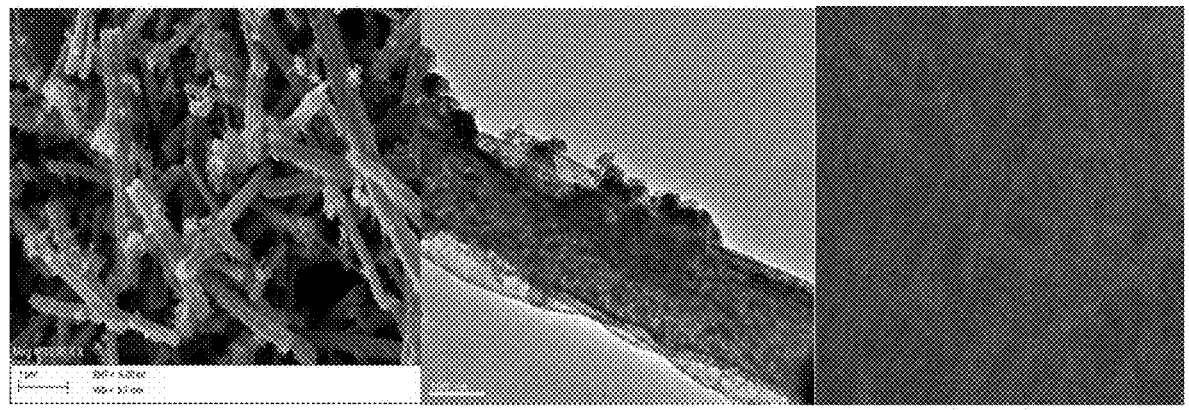
FIGS. 20A, 20B and 20C show, an SEM image of N3-dye sensitized $TiO_2$ nanofibers (FIG. 20A); a TEM image of N3-dye sensitized $TiO_2$ nanofibers (FIG. 20B); and EDX mapping image of N3-dye sensitized $TiO_2$ nanofibers with purple spots of $Ru^{2+}$ (FIG. 20C).

FIG. 20 shows, Left to right: SEM image of N3-dye sensitized $TiO_2$ nanofibers; TEM image of N3-dye sensitized $TiO_2$ nanofibers; EDX mapping image of N3-dye sensitized $TiO_2$ nanofibers with purple spots of $Ru^{2+}$. As seen in SEM image in FIG. 20, N3 dyes are attached on the surface of $TiO_2$ nanofibers. After soaking $TiO_2$ and N3 dye together in NaOH solution, the N3 dye was able to bond to the $TiO_2$ nanofibers. N3-sensitized $TiO_2$ nanofibers were confirmed by using SEM, TEM and EDX mapping techniques.

Figure 21:
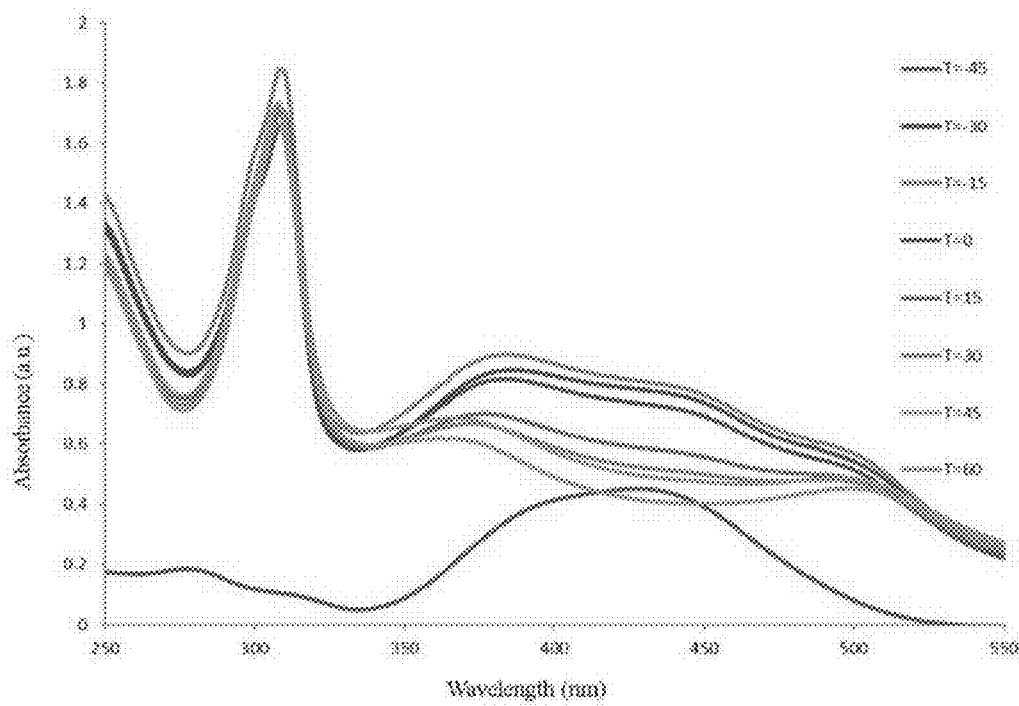
FIG. 21 shows UV-Vis spectra of PAP solution at T=−45, −30, −15, 0, 15, 30, 45 and 60 minutes.
Figure 22:
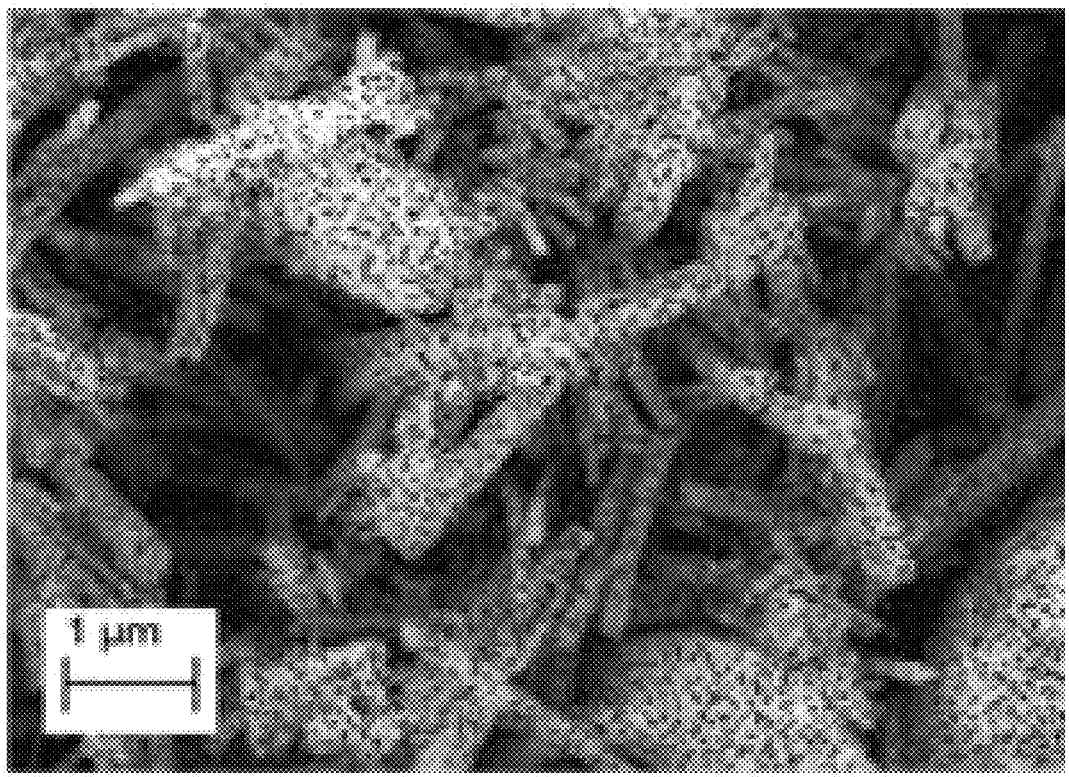
FIG. 22 shows scanning electron microscopy image of platinum nanoparticles supported on electrospun $TiO_2$ nanofibers.

FIG. 21 shows UV-Vis spectra of PAP solution at T=−45, −30, −15, 0, 15, 30, 45 and 60 Novel multifunctional $TiO_2$ fibers—platinum nanoparticles supported on electrospun $TiO_2$ nanofibers. In FIG. 21, it shows that there is no PAP solution UV-Vis absorbance change when stirring in dark. After turning on the lamp, PAP absorbance peak starts to decrease, which shows the degradation process happens. FIG. 22 shows a scanning electron microscopy image of platinum nanoparticles supported on electrospun $TiO_2$ nanofibers. Platinum nanoparticles supported on electrospun $TiO_2$ nanofibers have faster electron-hole pairs separation and an improved degradation efficiency as compared to electrospun $TiO_2$ nanofibers.

TABLE 6

Potential Target Pollutants.

| Toxic Industrial Chemicals (TICS) | Abbreviation | Simulated Chemical Warfare Agents (SCWAs) | Abbreviation |
| --- | --- | --- | --- |
| Ammonia | $NH_3$ | 2-Chloro ethyl ethyl sulfide | CEES |
| Arsine | $AsH_3$ | Dimethyl methylphosphonate | DMMP |
| Boron trifluoride | $BF_3$ | Dimethyl chlorophosphate | DMCP |
| Carbon disulfide | $CS_2$ | Diisopropyl fluorophosphates | DIFP |
| Formaldehyde | $CH_2O$ | O,O-Dimethyl O-(4-nitrophenyl) phosphate | Methyl Paraoxon |
| Hydrogen cyanide | HCN | | |
| Hydrogen sulfide | $H_2S$ | | |
| Phosgene | $COCl_2$ | | |
| Sulfur dioxide | $SO_2$ | | |
| Carbon monoxide | CO | | |
| Methyl bromide | $CH_3Br$ | | |
| Nitrogen dioxide | $NO_2$ | | |
| Phosphine | $PH_3$ | | |
| Cyanogen chloride | ClCN | | |

The following types of agents may be degraded by the catalytic fiber:

Toxic organic dyes: Rhodamine B, Methyl Yellow, Methyl Red, etc.

Bio-pharmaceuticals: Phenazopyridine, etc.

Chemical warfare agents (CWAs): O-Pinacolyl methyl phosphonofluoridate (GD), (RS)-Propan-2-yl methylphosphonofluoridate (GB), (RS)-Ethyl N,N-Dimethylphosphoramidocyanidate (GA), Ethyl ({2-[bis(propan-2-yl)amino]ethyl}sulfanyl)(methyl)phosphinate (VX), bis(2-chloroethyl) sulfide (HD), 2-Chloroethyl Ethyl Sulfide, etc.

The photocatalytic fibers may be used for the following purposes:

Nanofibrous membranes for water purification treatment. Functionalized nanofibrous membranes can be used for remediation of wastewaters under visible light atmosphere Air or gas filtration used in gas mask. Air filtration is conventionally performed by fibrous filters primarily due to their high collection efficiency also durability. The very high surface area facilitates adsorption and degradation of contaminants from air.

Protective clothing for chemical warfare agents. Chemical warfare agents in the battlefields are usually in the form of aerosol or vapors. Hence, protective systems such as clothing and face masks are highly needed to safeguard the people from an eventual chemical or biological hazard.

Metal oxide nanofibrous mats can be applied into suitable protective clothing which is adaptability with the physiological conditions of the human body acting as a barrier against toxic and unwanted materials, such as aerosol particles, harmful vapors, and liquids.

One important discovery was found that for pre-calcined polymer fibers with different diameters, different rutile fractional crystal phase titanium fibers can be fabricated after the same calcination condition treatment and results in modification of the photocatalytic activity.

Over the past few years, it has been demonstrated that the electrospun titania nanofibers provide a faster photodegradation rates of Rhodamine B (Rh.B.), phenanzopyridine (PAP) and dimethyl methylphosphonate (DMMP) compared to conventional $TiO_2$ nanoparticles. Besides that, many strategies have been also developed to fabricate several multifunctional nanofibrous materials to enhance their photocatalytic performance, among which photoactive dye supported anatase $TiO_2$ and reduced graphene oxide $TiO_2$ shows an excellent performance of degradation of Rh.B. and PAP under visible irradiation. These novel multifunctional materials offer excellent mobility of charge carriers for faster degradation and the possibility to exploit catalytic processes in real time decontamination.

Poly(3,4-ethylenedioxythiophene) or PEDOT is a conducting polymer based on 3,4-ethylenedioxythiophene (EDOT) monomer. It is transparent, and generally has high stability, a moderate band gap and low redox potential. PEDOT can be electrogenerated directly on a conductive support (Pt, Au, glassy carbon, indium tin oxide, . . . ) in organic solvents or in aqueous solution. In one study [Zhang, Xinyu; MacDiarmid, Alan G.; Manohar, Sanjeev K. (2005). "Chemical synthesis of PEDOT nanofibers". Chemical Communications (42): 5328-30. doi:10.1039/b511290g. PMID 16244744] PEDOT nanofibers are produced from vanadium pentoxide nanofibers by a nanofiber seeding method. In this procedure EDOT is dissolved in an aqueous solution of camphorsulfonic acid (CSA) and a vanadium pentoxide nanofiber sol-gel and radical cationic polymerization is initiated by addition of ammonium persulfate. The resulting polymer precipitates from solution and has a general composition (PEDOT)(CSA)0.11-(HSO4)0.12(Cl) 0.11(H2O)0.19. Washing with dilute hydrochloric acid removes the vanadium compound. The presence of the vanadium pentoxide seeds are believed to make the difference between the formation of PEDOT nanofibers (100 to 180 nanometer diameter and one to several micrometres long) and the formation of a more conventional granular morphology.

TABLE 7

| Initial Metal Oxide Materials | Phase Composition (Rutile Fraction with the balance of Anatase) | Materials Compositions |
|---|---|---|
| $TiO_2$ Nanofibers | 8% | $TiO_2$-MOF Nanofibers |
| ZnO Nanofibers | 16% | $TiO_2$-PEDOT Nanofibers |
| | 38% | $TiO_2$—$N_3$ dye Nanofibers |
| | 67% | $TiO_2$-Reduced Graphene Oxide Nanofibers |
| | 97% | $TiO_2$—Pt Nanofibers<br>$TiO_2$—Pd Nanofibers |

Example 4

The protection of the warfighter against chemical warfare agents (CWAs) and other biological and environmental toxins is essential on the modern battlefield. Nanotechnology can provide novel systems for rapid decontamination and protection through a self-cleaning mechanism.

Electromagnetic radiation in the form of visible light, ultra-violet light, or even sunlight can be used to achieve enhanced photodegradation of CWAs that are both rapid and inexpensive compared to the current decomposition techniques that are costly and time consuming. This technology takes advantage of advances in the fabrication of nanofibers activated by visible irradiation for targeted decontamination of CWAs—technology which can be used for the improvement of gas masks, for integration with conventional textiles for self-decontaminating garments, and for spray treatments of combat vehicles.

The protection of the warfighter against chemical warfare agents (CWAs) and other biological and environmental toxins is essential on the modern battlefield. Nanotechnology can provide novel systems for rapid decontamination and protection through a self-cleaning mechanism. Electromagnetic radiation in the form of visible light, ultra-violet light, or even sunlight can be used to achieve enhanced photodegradation of CWAs that are both rapid and inexpensive compared to the current decomposition techniques that are costly and time consuming. This technology takes advantage of nanofibers activated by visible irradiation for targeted decontamination of CWAs, technology which can be used for the improvement of gas masks, for integration with conventional textiles for self-decontaminating garments, and for spray treatments of combat vehicles.

The production of electrospun titania nanofibers provides an increase in surface area that elicits faster decomposition compared to conventional $TiO_2$ nanoparticles. Self-assembled Metal Organic Frameworks (MOFs) may be combined with doped catalysts onto the titania, such as platinum, and used to further increase the rate of degradation. Introduction of noble metals to semiconductors permits creation of a rapid exchange of electrons to the electrolyte, improving the electronic properties of the catalyst. In addition, new tubular structures will be explored. A related but alternate approach is the production of structures such as zirconia and zinc oxide as approaches to increase the overall efficiency of decontamination.

$TiO_2$ nanofibers represent an alternative approach to conventional composites for use in photocatalytic degradation. The one dimensional morphology of $TiO_2$ is desired compared to spherical $TiO_2$ nanoparticles; owing to excellent mobility of charge carriers, high surface area, the existence of pores enhancing the accessibility of electrodes to the hole transporting materials and hence enhanced charge collection and transport.

The nanofibrous materials were synthesized via a polyol synthesis, where platinum nanoparticles were deposited on $TiO_2$ nanofibers, or with carbonaceous or graphitic materials. These were confirmed by EDX analysis, See FIG. 9A. The purpose of the modified catalyst was to affect the band gap energy of the $TiO_2$, a lower energy would result in visible light exciting an electron from the conduction band to the valence band rather than ultraviolet irradiation.

Preliminary photocatalysis and degradation using the new materials was achieved utilizing in aqueous and non-aqueous solutions. Due to the toxicity and availability of chemical warfare agents, chemical analogs were used as an alternative. One common simulated chemical warfare agent (SCWA) of interest, 2-Chloroethyl ethyl sulfide, an analog for mustard gas, undergoes a hydrolysis mechanism in the presence of water. Therefore, it became difficult to determine if the degradation was occurring due to the radicals present in solution from the catalyst or the hydrolysis from the water, see FIGS. 24-27.

Photocatalysis experiments were modified to accommodate the necessary UV irradiation by performing the experiments in a quartz reaction vial. In previous experiments glass vials were being used as a reaction vessel however, for $TiO_2$ to be a catalyst in photodegradation, electron-hole pairs must be formed. Without the energy of UV irradiation this becomes nearly impossible and therefore, no degradation will occur.

Dimethyl methyl phosphonate, a simulated chemical warfare agent for Sarin is being studied as a toxic pollutant. Preliminary studies showed DMMP was not susceptible to hydrolysis and therefore would be a better candidate for photocatalysis studies with $TiO_2$ nanofibers. Results of the photocatalysis of DMMP with $TiO_2$ nanofibers showed degradation of the pollutant in a one hour time span where $TiO_2$ nanoparticles resulted in a 4 hour degradation time span, FIGS. 45 and 49. This also proved that nanofibers were better than nanoparticles and that surface to volume ratio plays a larger role in the photocatalytic degradation process than the surface area of nanoparticles.

All photocatalysts use incident irradiation in the UV or visible region of the spectrum to excite an electron from the valence band (leaving behind a hole) to the conduction band of a semiconductor. These photoinduced charge carriers then proceed to form reactive radicals, hydroxyl radicals (A−) and super oxide radicals (D+) that attack adsorbed chemicals on the surface of the material, FIG. 8.

Figure 23:
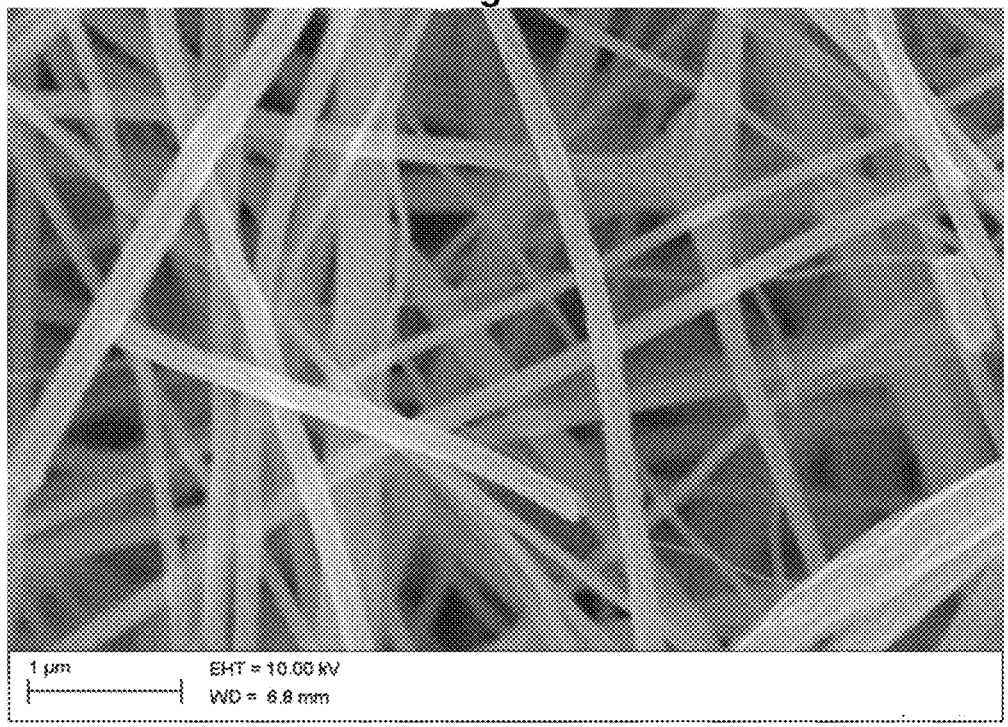
FIG. 23 shows Anatase $TiO_2$ nanofibers, diameter ~300±50 nm.

The electro spinning procedure may employ a sol gel solution in a 1:2 ratio of polymer to inorganic precursor, polymethylmethacrylate to titanium isopropoxide. A high voltage (25 kV/cm) is applied to the sol gel polymer solution. The sol gel is pulled through a metal needle as an electrified jet which collected on the counter electrode. The solvent evaporates as the fiber mat is deposited. Upon hydrolysis of the fiber mat will undergo a calcination process under thermally controlled atmospheric conditions producing the desired crystal structure of $TiO_2$. At 400 centigrade for 4 hours anatase $TiO_2$ nanofibers were produced, as shown in FIG. 23, which shows Anatase $TiO_2$ nanofibers, diameter ~300±50 nm.

Due to the toxicity and availability of chemical warfare agents, chemical analogs will be used as an alternative. One common simulated chemical warfare agent (SCWA) of interest, 2-Chloroethyl ethyl sulfide, an analog for mustard gas, undergoes a hydrolysis mechanism in the presence of water. Preliminary studies have led to degradation experiments utilizing the fabricated catalyst in aqueous and non-aqueous solutions. $^{13}C$ NMR was used to examine the results of the degradation.

Figure 24:
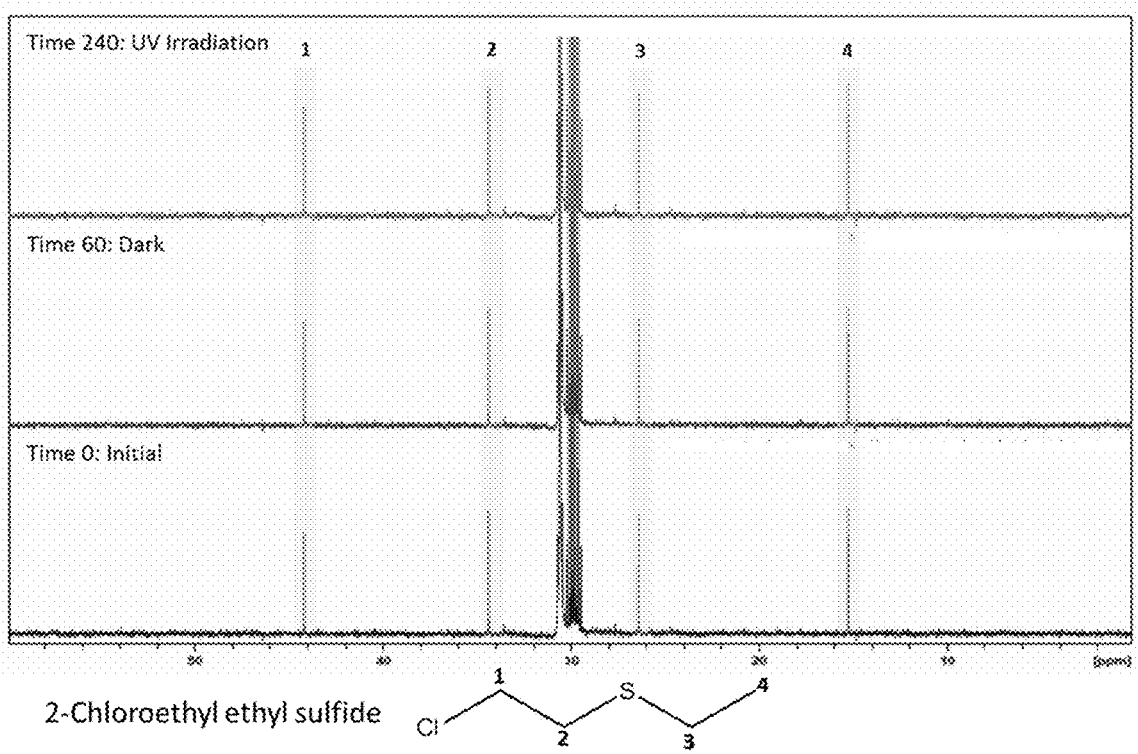
FIG. 24 shows $^{13}C$ NMR-Photocatalysis of 2CEES in a nucleophilic solvent with anatase $TiO_2$ nanofibers.

FIG. 24 shows $^{13}C$ NMR-Photocatalysis of 2CEES in a nucleophilic solvent with anatase $TiO_2$ nanofibers. In the presence of catalyst and a non-nucleophilic solvent such as acetone the 4 characteristic peaks of 2-CEES were unaffected by the catalyst and UV irradiation. Resulting data was conducive with our knowledge and hypothesis that water will play a role in the degradation mechanism. Upon completion of degradation studies of varying non-nucleophilic solvents the experiments led to a 50:50 solution of water and acetone. 2-CEES may have some interaction with the water in the form of hydrolysis as well as the $TiO_2$ acting as a catalyst for further degradation.

Figure 25:
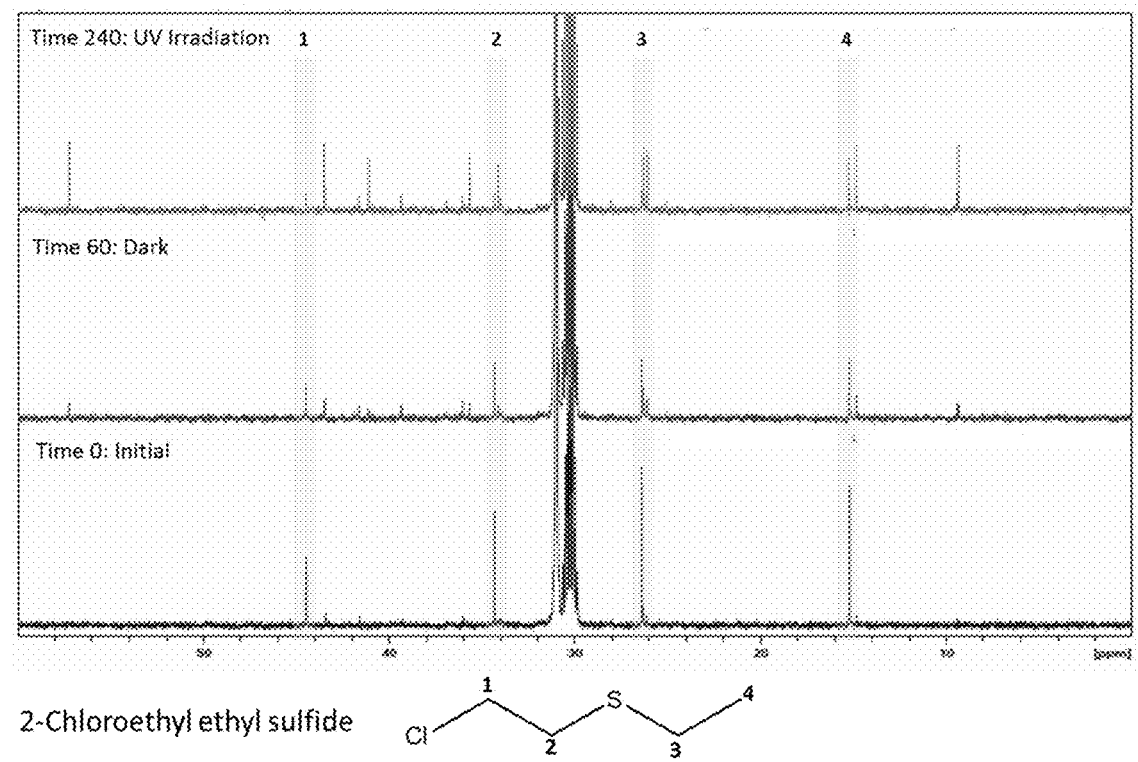
FIG. 25 shows $^{13}C$ NMR-Photocatalysis of 2CEES in an acetone/water solution with anatase $TiO_2$ nanofibers.

FIG. 25 shows $^{13}C$ NMR-Photocatalysis of 2CEES in an acetone/water solution with anatase $TiO_2$ nanofibers. After standard experiments were done catalyst was added to the solution and the experiment was repeated. Minimal changes to degradation were seen in the presence of anatase $TiO_2$ nanofibers. The presence of absorbed water is detrimental for the efficient use of $TiO_2$ nanofibers as a catalyst.

After studying 2-Chloroethethyl sulfide in a variety or nucleophilic and non-nucleophilic solvents the experimental procedure was altered to a solvent-less system, where extractions in acetonitrile-d3 were done for $^{13}C$ NMR analysis. Below are the results pertaining to a degradation of 2-Chloroethyl ethyl sulfide with anatase $TiO_2$ nanofibers.

Figure 26:
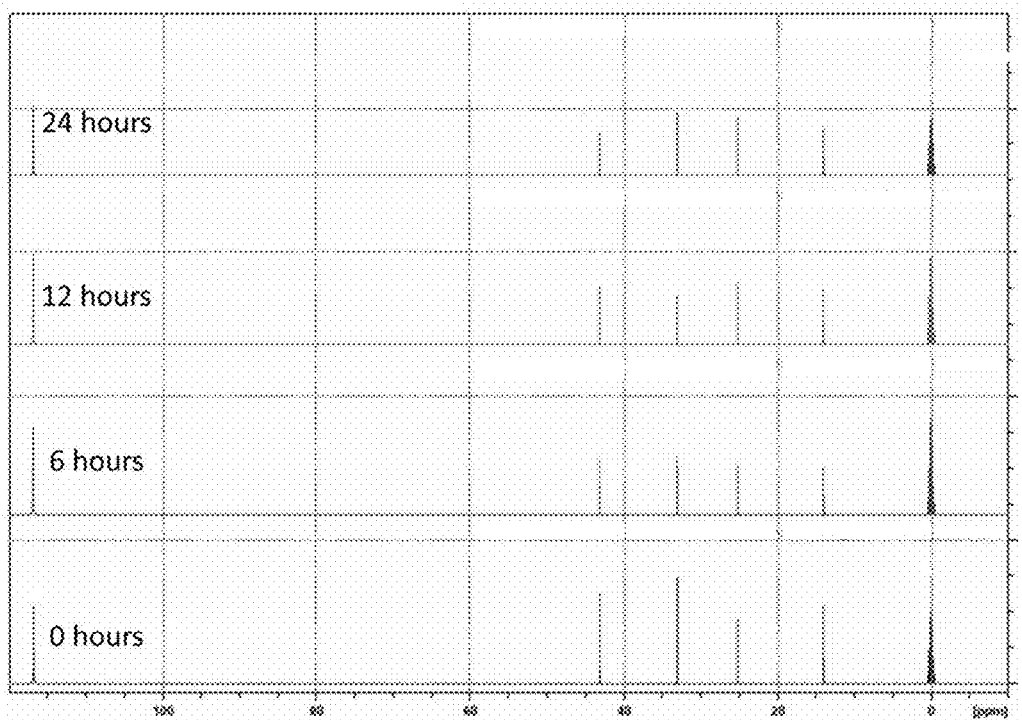
FIG. 26 shows photocatalysis of 2CEES in the presence of anatase $TiO_2$ nanofibers without solvent and irradiation in a quartz vial.
Figure 27:
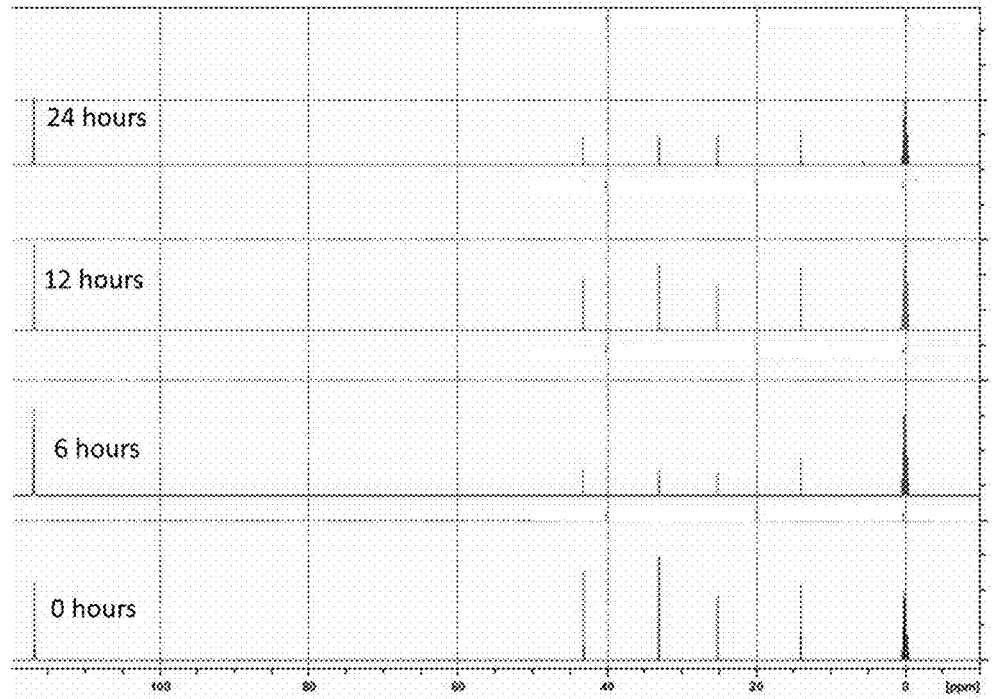
FIG. 27 shows photocatalysis of 2CEES in the presence of anatase $TiO_2$ nanofibers without solvent and with irradiation in a quartz vial.

FIGS. 26 and 27 show results for photocatalysis of 2CEES with anatase $TiO_2$ nanofibers, without solvent, in a quartz vial. No change was seen over a twenty four hour period. The reaction mechanism of $TiO_2$ was analyzed and showed that without the presence of absorbed water and oxygen, degradation would not occur. After the separation of electron-hole the absorbed water and oxygen will react the negative electron and positive hole creating superoxide and hydroxyl radicals. It is the presence of these radicals that initiate the degradation process. It is understood that 2-Chloroethyl ethyl sulfide hydrolyzes readily in water therefore it was necessary to be able to differentiate between the hydrolysis of 2-Chloroethyl ethyl sulfide and photodegradation. This led to an experiment where the $TiO_2$ nanofibers were soaked in deionized water for 1 hour and excess water was removed prior to the addition of 2-Chloroethyl ethyl sulfide.

Figure 28:
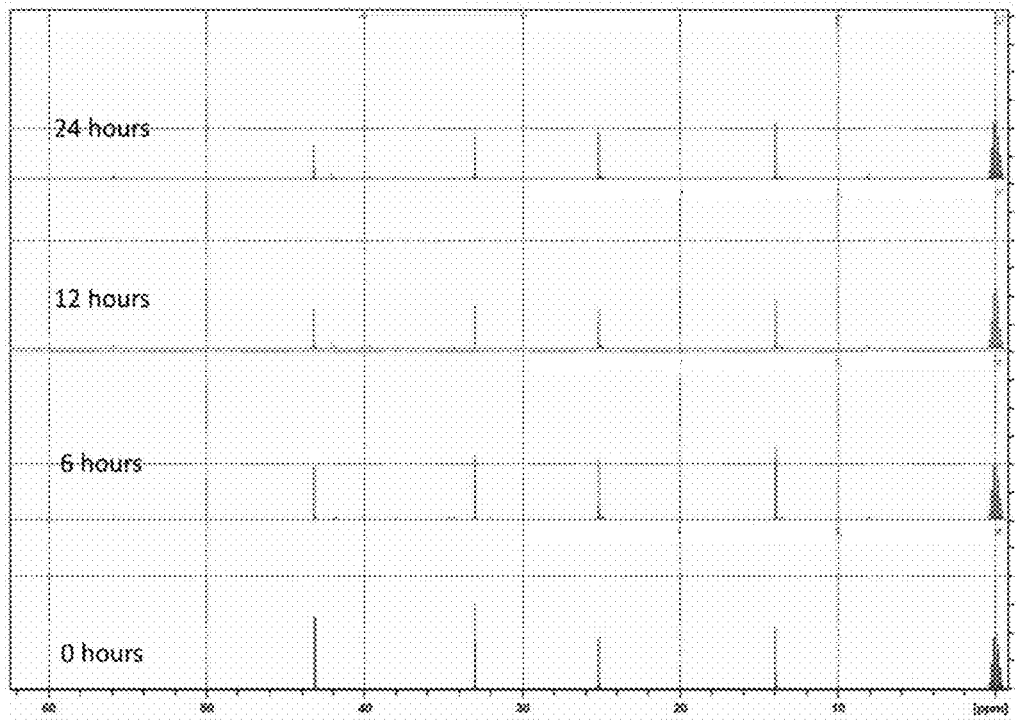
FIG. 28 shows photocatalysis of 2CEES in the presence of water saturated anatase TiO2 nanofibers without solvent and irradiation in a quartz vial.
Figure 29:
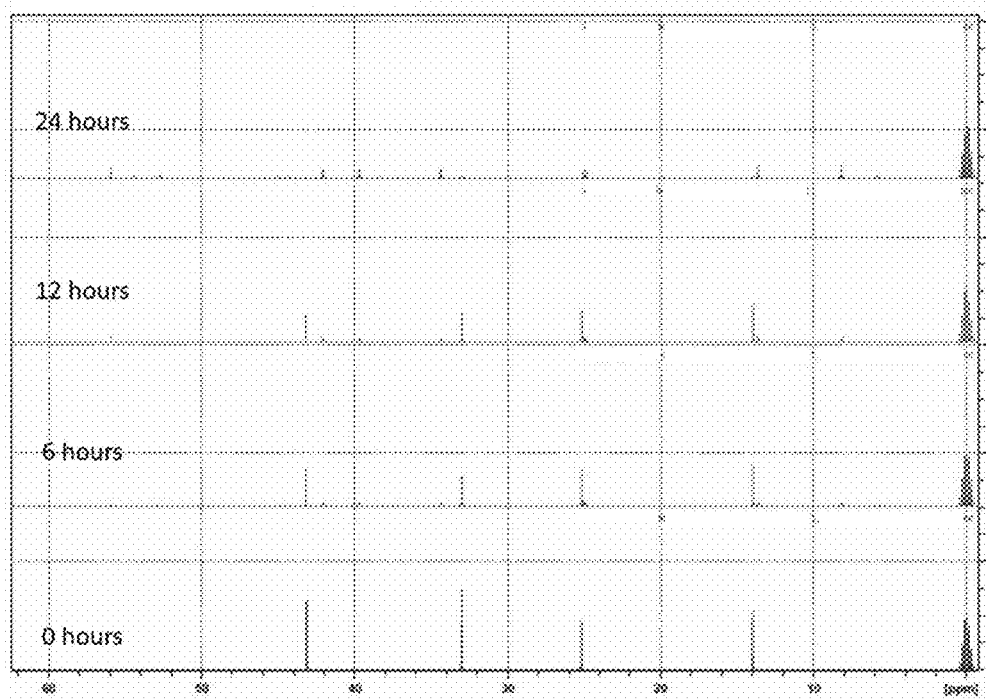
FIG. 29 shows photocatalysis of 2CEES in the presence of water saturated anatase TiO2 nanofibers without solvent and irradiation in a quartz vial.

FIGS. 28 and 29 show photocatalysis of 2CEES in the presence of water saturated anatase $TiO_2$ nanofibers without solvent, without and with UV irradiation in a quartz vial. After twenty four hours of UV irradiation, the 2-CEES completely degrades into its hydrolysis products where the sample being kept in the dark has no change over the same twenty four hour period.

Figure 30:
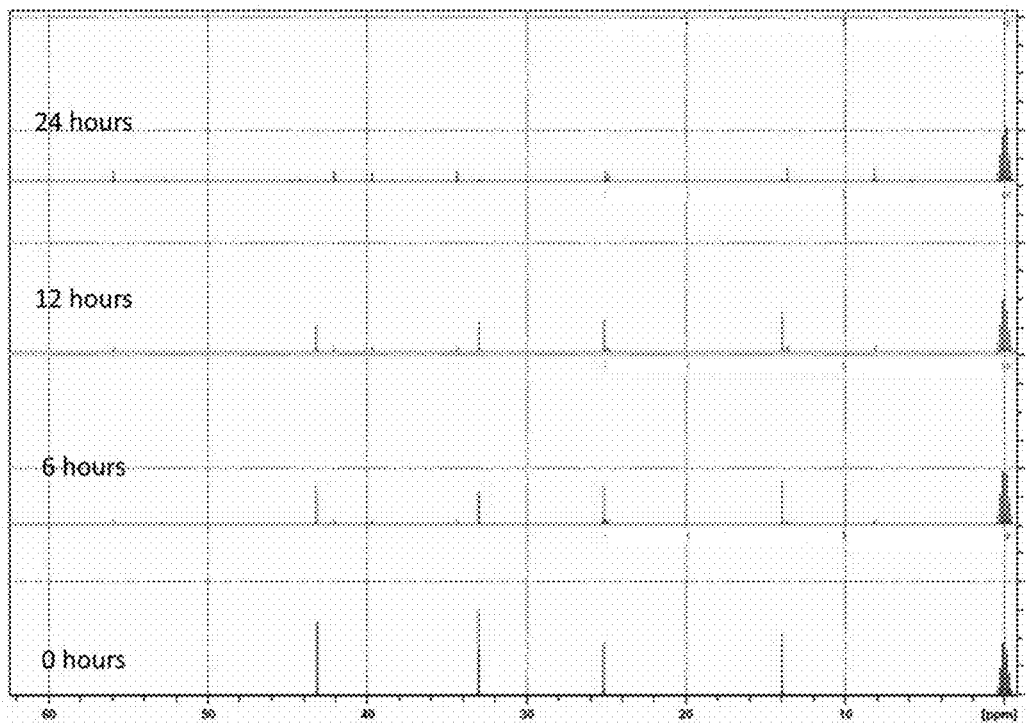
FIG. 30 shows $^{13}C$ NMR-Photocatalysis of 2CEES with water saturated $TiO_2$ nanofibers over 24 hours of UV Irradiation.
Figure 31:
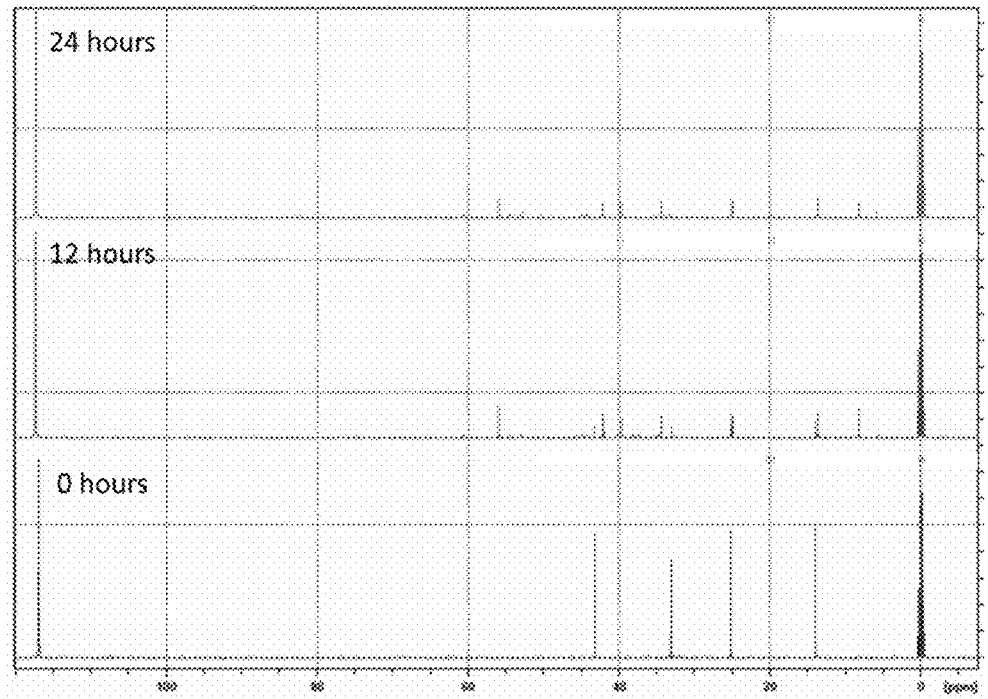
FIG. 31 shows $^{13}C$ NMR-Photocatalysis of 2CEES with water saturated silica gel over 24 hours of UV Irradiation.

FIGS. 30 and 31 show $^{13}C$ NMR-Photocatalysis of 2CEES with water saturated $TiO_2$ nanofibers and silica gel over 24 hours of UV Irradiation. The resulting peaks after 24 hours of UV irradiation are consistent with peaks of 2CEES hydrolysis making it uncertain if $TiO_2$ is playing a role in the hydrolysis process. Therefore, a control experiment was performed where silica gel replaced the $TiO_2$ in the photocatalysis and the experiment was repeated.

It was surprising to see a change in 2-Chloroethyl ethyl sulfide while in the presence of silica gel. After 24 hours not only was there a change in the $^{13}C$ NMR but also a visible change in color, from clear to pale yellow. UV-Vis spectroscopy was performed on the final product. The sample was sealed and frozen for GC-MS analysis at a later date. Silica gel was also sent to ECBC for breakthrough testing.

Figure 32:
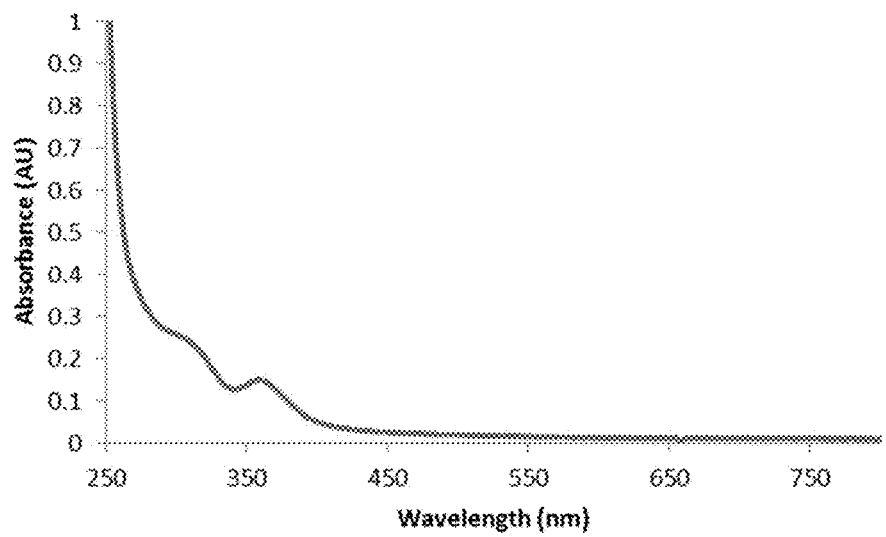
FIG. 32 shows UV-Vis of photocatalysis product after 24 hours of UV irradiation with silica gel.

FIG. 32 shows a UV-Vis analysis of photocatalysis product after 24 hours of UV irradiation with silica gel.

A 1 M solution was prepared of dimethyl methyl phosphonate in water. An aliquot was analyzed after hours 1, 4, 8, 24 and 72. The $^{13}C$ NMR showed no change after a 72 hour time period.

Figure 33:
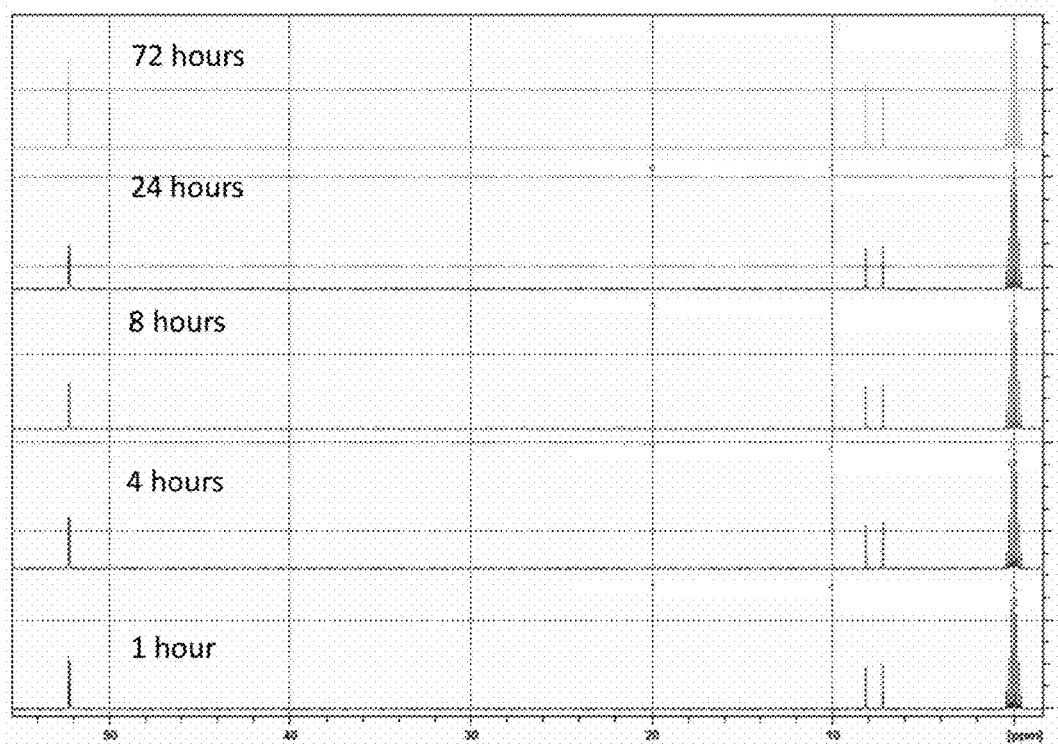
FIG. 33 shows $^{13}C$ NMR-Hydrolysis study of Dimethylmethyl phosphonate over 72 hours.

FIG. 33. shows a $^{13}C$ NMR-Hydrolysis study of Dimethylmethyl phosphonate over 72 hours. A control experiment was performed using standard Degussa P25 nanoparticles after 72 hours of UV irradiation yielded no change in the presence of anatase $TiO_2$ nanofibers. Experimental conditions remained the same as previous trials the only changing variable was the shape of the catalyst. Concentration of solution remained constant at 1 M. After an 8 hour period of UV irradiation there was no change. One possible reason for no change is due to saturating the catalyst, leaving a large amount of excess pollutant in the solution; therefore, when aliquot samples were removed for analysis the excess DMMP was masking any degradation that could have been present in solution.

Figure 34:
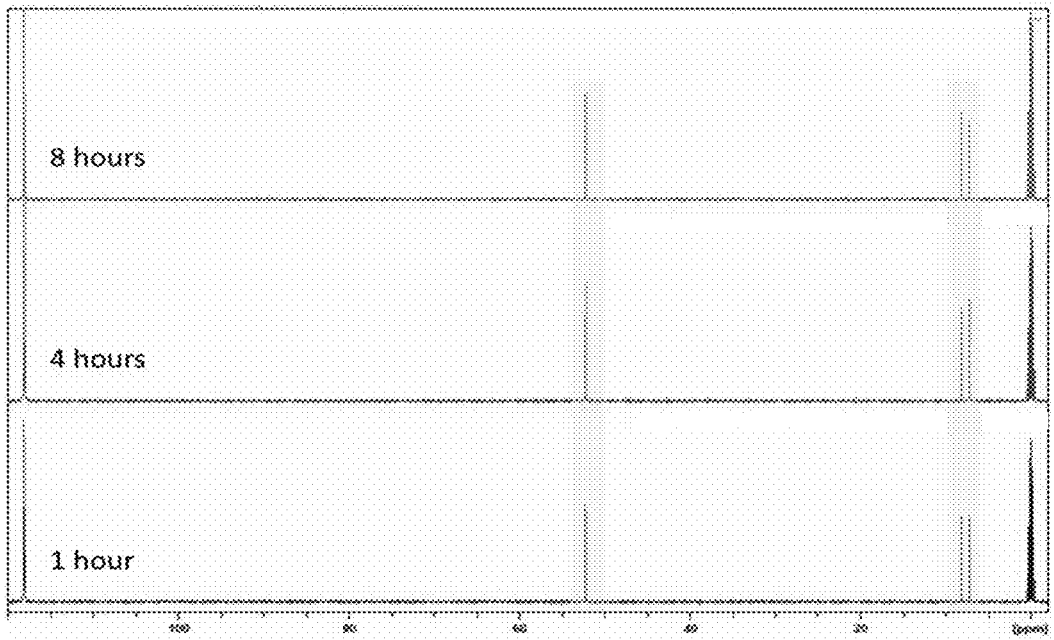
FIG. 34 shows $^{13}C$ NMR-Photocatalysis of DMMP with standard Degussa P25 nanoparticles in DI water over 8 hours of UV irradiation.

FIG. 34 shows $^{13}$C NMR-Photocatalysis of DMMP with standard Degussa P25 nanoparticles in DI water over 8 hours of UV irradiation. The experiment was repeated at a lower concentration of 100 μM, the rest of the experimental conditions remained the same except for UV irradiation ended after 4 hours.

Figure 35:
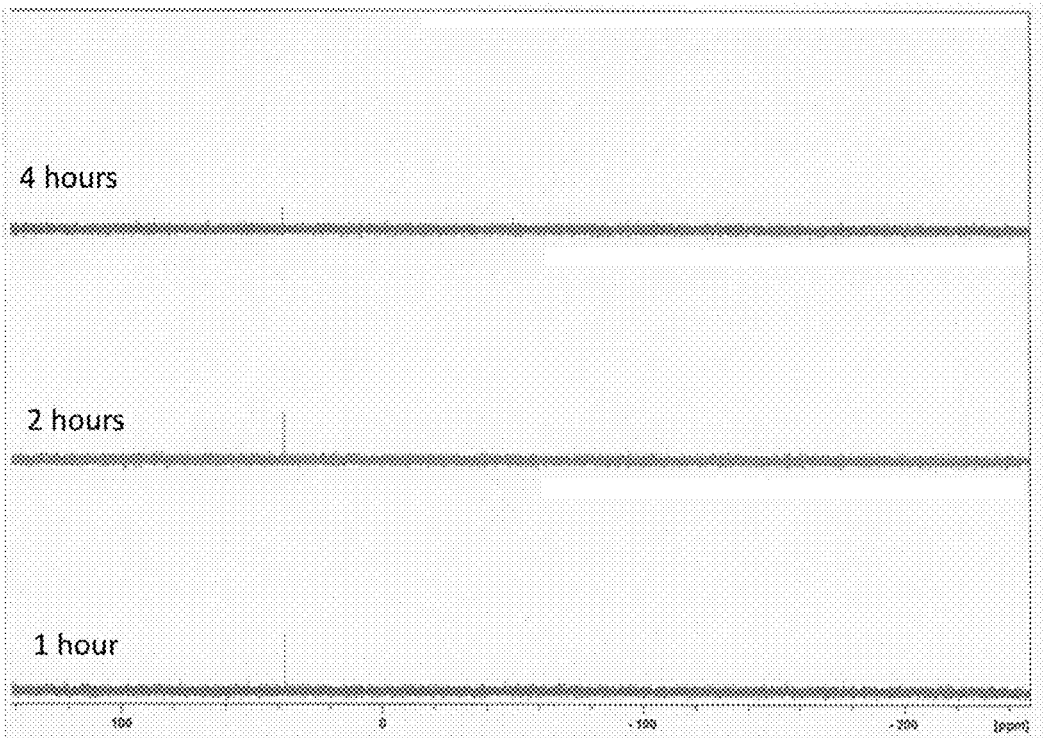
FIG. 35 shows $^{31}P$ NMR-Photocatalysis of DMMP with anatase $TiO_2$ nanofibers in water over 4 hours of UV irradiation.

FIG. 35 shows $^{31}$P NMR-Photocatalysis of DMMP with anatase TiO$_2$ nanofibers in water over 4 hours of UV irradiation. Results yielded a decrease in intensity over a 4 hour times period of UV irradiation.

Nanofibrous materials including metal supported nanoparticles on the surface of TiO$_2$ nanofibers can be provided, by including the metal supported nanoparticles in the polyol mixture for electrospinning. SEM/EDX mapping can be used to characterize the final product. FIG. 22 shows SEM/EDX mapping of Pt nanoparticles (purple) supported on the surface of anatase TiO$_2$ nanofibers.

Figure 36:
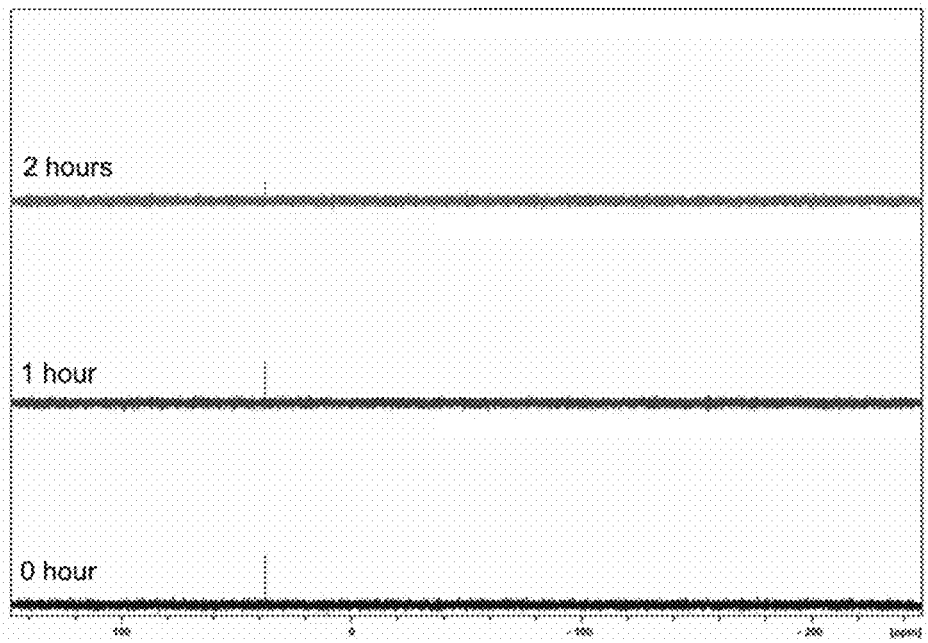
FIG. 36 shows photocatalysis of 100 µM solution dimethyl methylphosphonate with anatase $TiO_2$ nanofibers in a 100 mL quartz beaker over 2 hours of UV irradiation.
Figure 37:
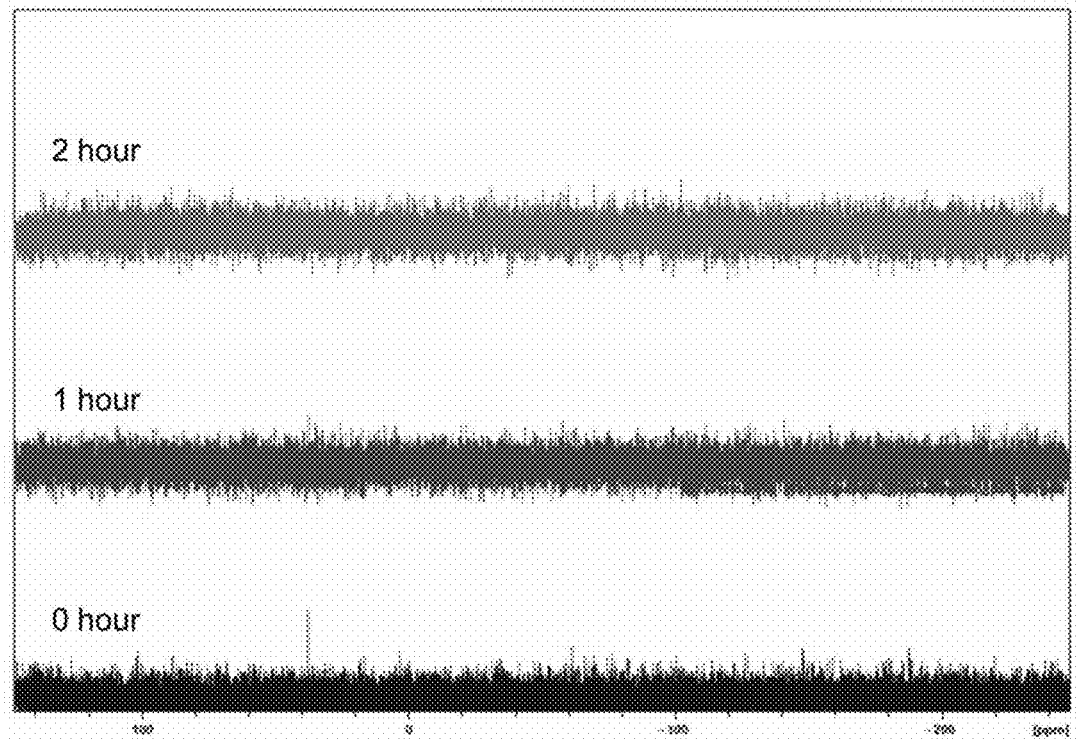
FIG. 37 shows photocatalysis of 100 µM solution dimethyl methylphosphonate with anatase $TiO_2$ nanofibers in a 16 mL quartz vial over 2 hours of UV irradiation.

FIGS. 36 and 37 show photocatalysis of 100 μM solution dimethyl methylphosphonate with anatase TiO$_2$ nanofibers in a 100 mL quartz beaker and a 16 ml quartz vial over 2 hours of UV irradiation. FIGS. 36 and 37 show that, after 2 hours of UV irradiation, a reaction vessel with a smaller volume showed a decrease in the signature phosphorus peak. The incident beam of UV irradiation was able to interact with the majority of the sample in the smaller beaker. This allowed for the generation of radicals to increase and react with the pollutant of interest.

Experiments comparing TiO$_2$ nanofibers to nanoparticles as well as Pt nanoparticle doped TiO$_2$ nanofibers were conducted. Pt nanoparticles displaced on the surface of TiO$_2$ should allow for better separation of the electron hole pair under UV and visible irradiation without fear of recombination. Therefore, Pt nanoparticles were dispersed on anatase TiO$_2$ nanofibers via the polyol synthesis:

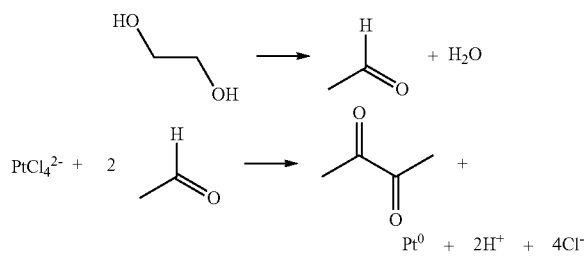

Polyol Synthesis of Pt Nanoparticles

Figure 38:
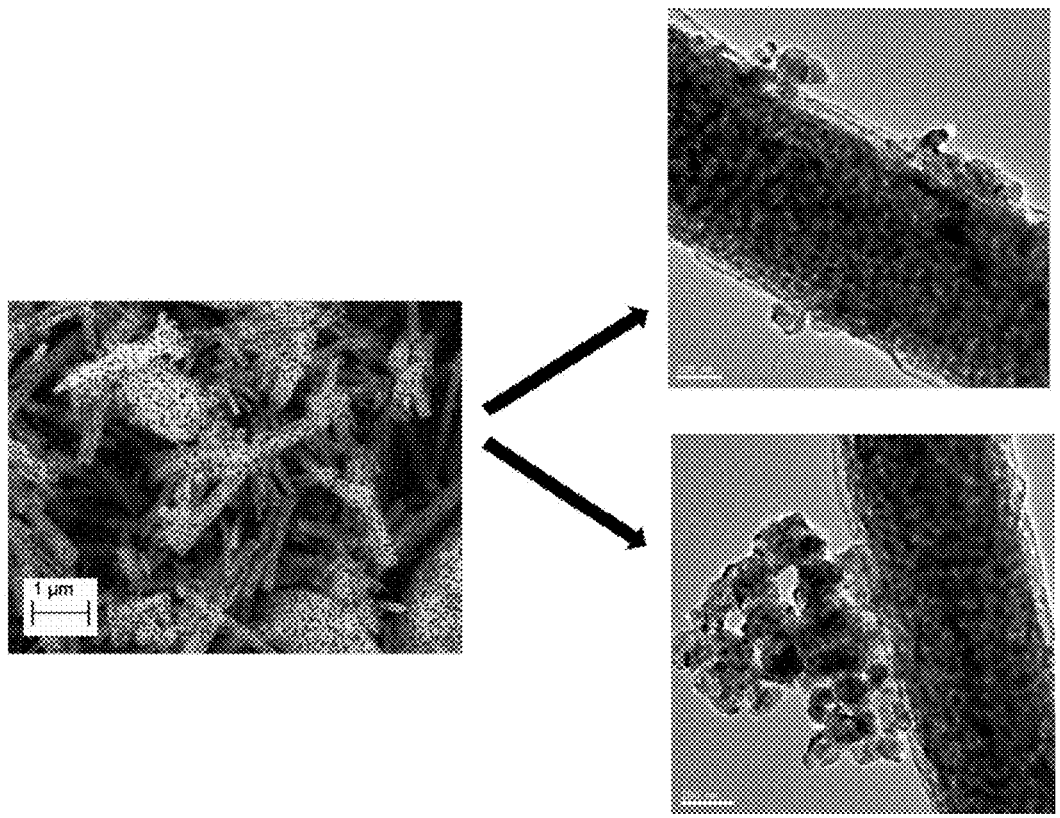
FIG. 38 shows TEM imaging of Pt nanoparticles supported on the surface of anatase $TiO_2$ nanofibers.

These nanofibers were characterized and confirmed using SEM/EDX(mapping) and TEM as seen in FIGS. 9A and 22. FIG. 38 shows TEM imaging of Pt nanoparticles supported on the surface of anatase TiO$_2$ nanofibers.

Figure 39:
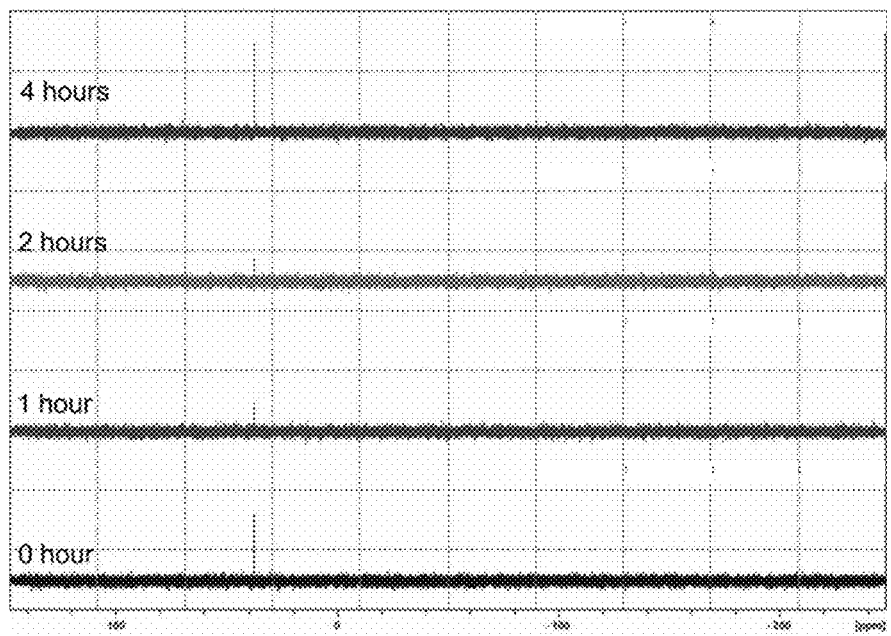
FIG. 39 shows $^{31}P$ NMR of Photocatalysis with 100 µM solution of dimethyl methylphosphonate and Pt nanoparticles supported on anatase $TiO_2$ nanofibers for 4 hours of UV irradiation.

The Pt—TiO$_2$ catalyst was then introduced to a 100 μM solution of dimethyl methylphosphonate and underwent 4 hours of UV irradiation as seen in FIG. 39. The $^{31}$P NMR was inconclusive; at 4 hours the signature peak for DMMP seemed to increase in intensity than decrease.

Figure 40:
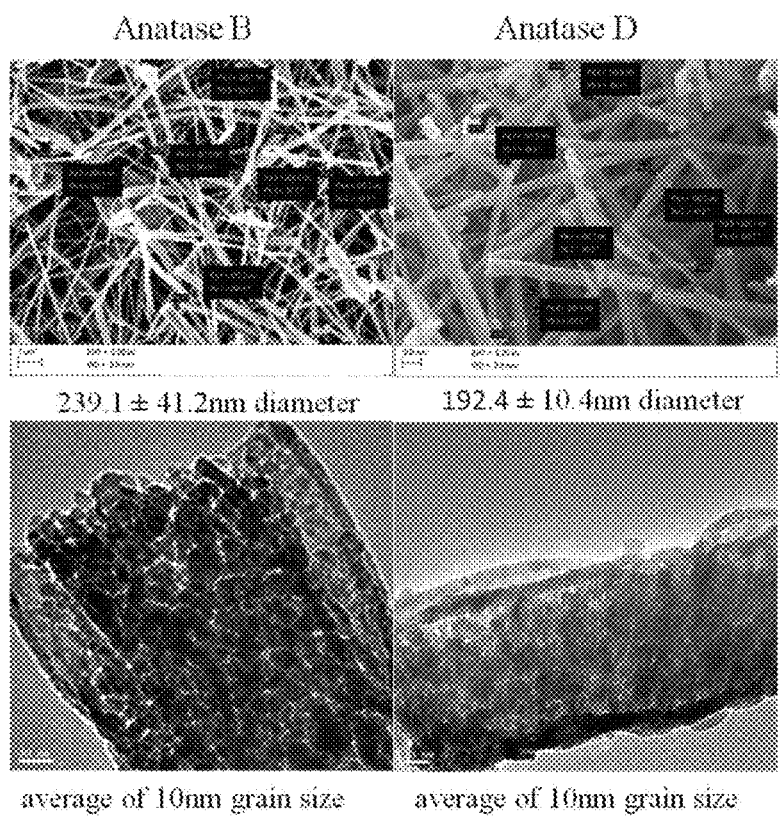
FIG. 40 shows SEM (above) and TEM (bottom) images of 2 varying diameters of anatase $TiO_2$ nanofibers ranging from 200 to 300 nm in diameter.

Diameter dependent photocatalysis experiments were also studied. It is hypothesized that the size of the grains that make up the nanofibers plays an important role in photodegradation. Therefore, anatase TiO$_2$ nanofibers were electrospun with 2 different diameter sizes as seen in FIG. 40, which shows SEM (above) & TEM (bottom) images of 2 varying diameters of anatase TiO$_2$ nanofibers ranging from 200 to 300 nm in diameter. These nanofibers were then introduced to a solution of Rhodamine B. in which UV-Vis spectroscopy was used to analyze the photodegradation process. According to Beer's Law, absorbance can be correlated to concentration of Rh.B.

Figure 41A:
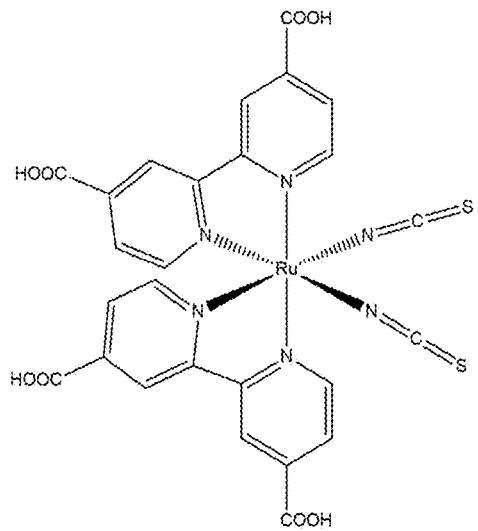
FIG. 41A shows the molecular formula of N3.
Figure 41B:
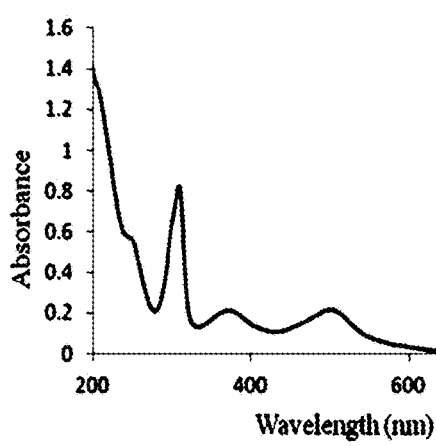
FIGS. 41B and 41C show UV-VIS spectra of N3 solution and UV-VIS of photodegradation of Phenazopyridine (PAP) using N3-sensitized $TiO_2$ nanofiber (from left to right), respectively.
Figure 41C:
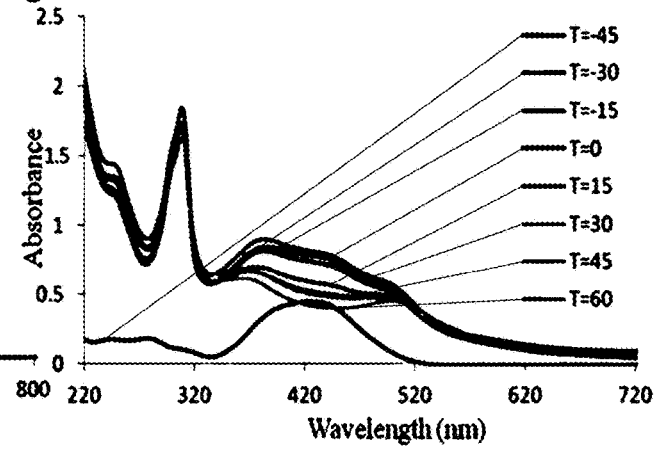
Figure 41D:
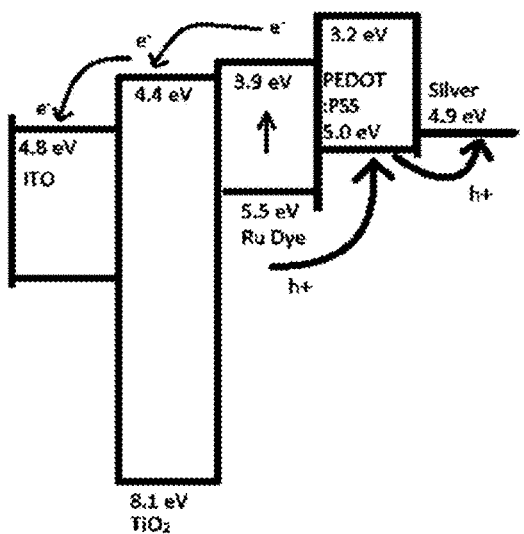
FIG. 41D shows a Relative wide band gap of $TiO_2$, which limits its application as photocatalyst using under visible light; N3-dye can absorb visible light and get excited to generate free electrons and transfer to $TiO_2$, which enlarge the application of $TiO_2$-based photocatalyst.

The UV-VIS spectra correlated to the photodegradation of Phenazopyridine (PAP) in FIG. 41A shows the molecular formula of N3. FIGS. 41B and 41C show a UV-VIS spectrogram of N3 solution and UV-VIS of photodegradation of Phenazopyridine (PAP) using N3-sensitized TiO$_2$ nanofiber (from left to right), respectively, showing almost no change when stirred in dark (T=−45 to T=0). Upon UV irradiation the spectra changed near the wavelength of 428 nm which was confirmed to be pure PAP absorption peak. This means N3-dye sensitized TiO$_2$ has the potential to be used as photocatalyst for degradation. FIG. 41D shows that the relative wide band gap of TiO$_2$ limits its application as photocatalyst using under visible light illumination, but that various dyes have narrower band gaps.

Figure 42:
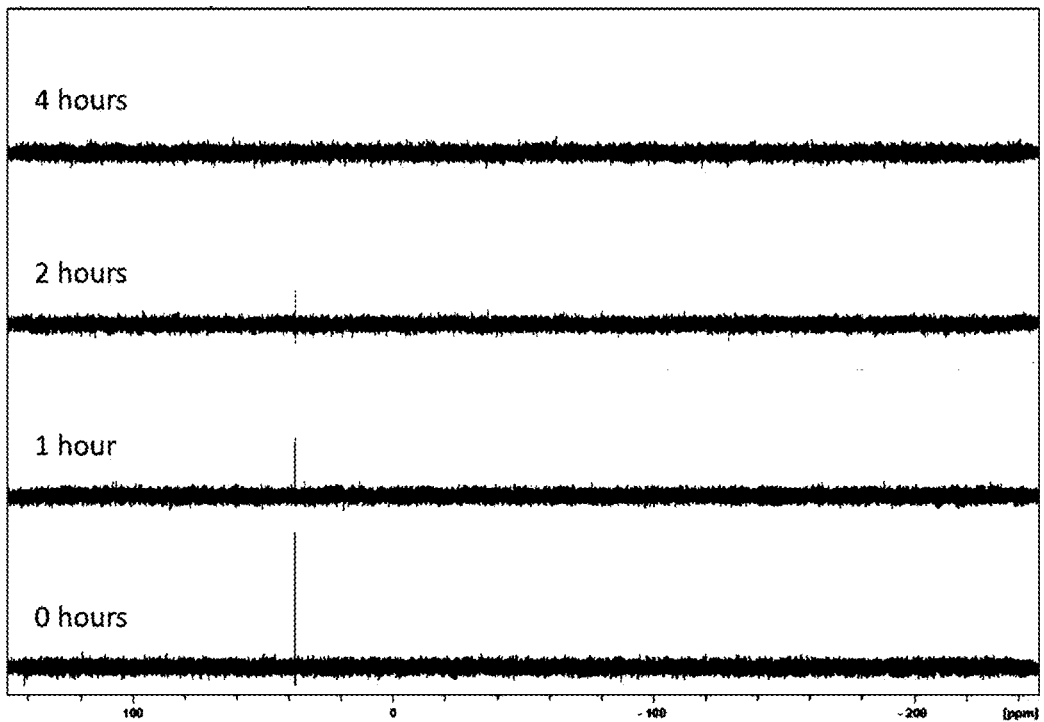
FIG. 42 shows photocatalysis of 100 µM solution of dimethyl methylphosphonate with Degussa P25 $TiO_2$ nanoparticles over 4 hours of UV irradiation.
Figure 43:
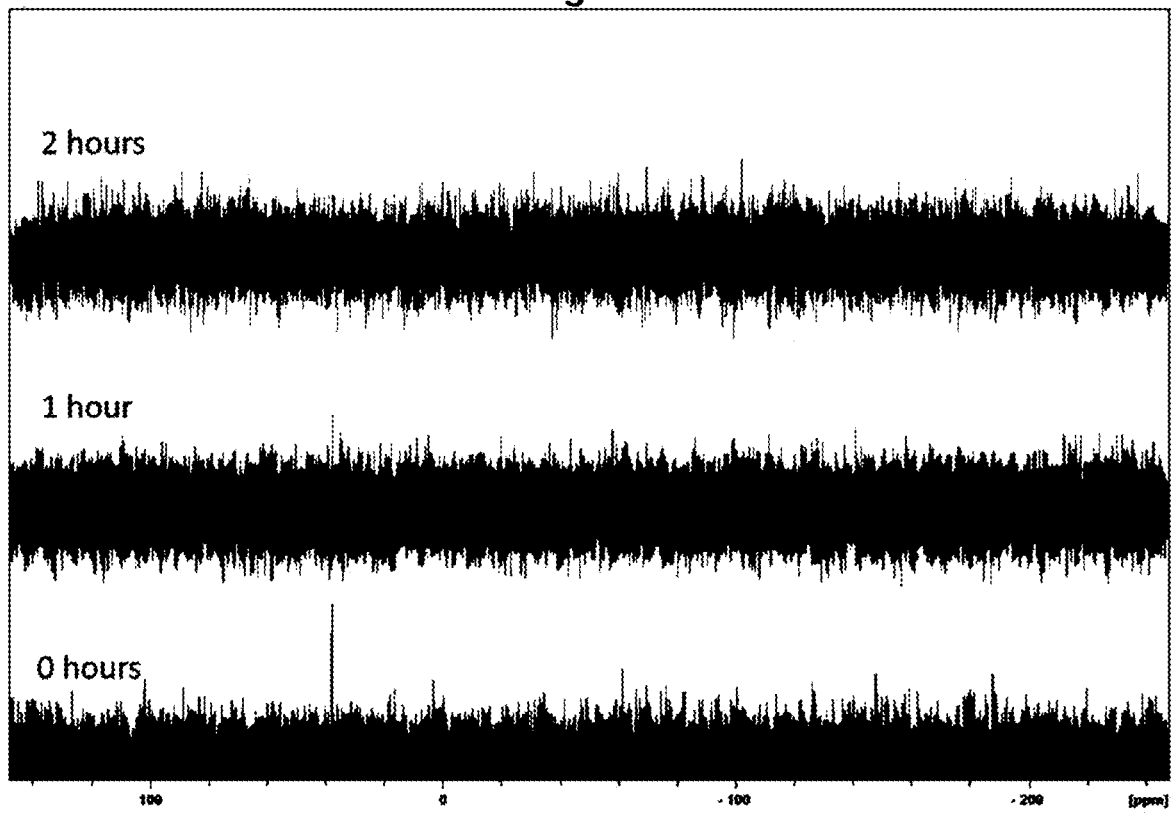
FIG. 43 shows photocatalysis of 100 µM solution of dimethyl methylphosphonate with anatase $TiO_2$ nanofibers over 2 hours of UV irradiation.

After determining the importance of the inner filter effect with the quartz vial and quartz beaker using anatase TiO$_2$ nanofibers, nanofibers and nanoparticles were compared. Degussa P25 nanoparticles were used, which are a standard TiO$_2$ nanoparticle frequently used in literature for photocatalysis experiments. The same experimental conditions were used for each photocatalysis experiment and the results were compared. This can be seen in FIGS. 42 and 43. FIG. 42 shows photocatalysis of 100 μM solution of dimethyl methylphosphonate with Degussa P25 TiO$_2$ nanoparticles over 4 hours of UV irradiation. FIG. 43 shows photocatalysis of 100 μM solution of dimethyl methylphosphonate with anatase TiO$_2$ nanofibers over 2 hours of UV irradiation. After 2 hours of UV irradiation the signature peak for DMMP became undetectable using anatase TiO$_2$ nanofibers where the Degussa P25 nanoparticles require 4 hours of UV irradiation before the signature peak for DMMP became undetectable. These results were confirmed by repetition of the experiment several more times.

Figure 44:
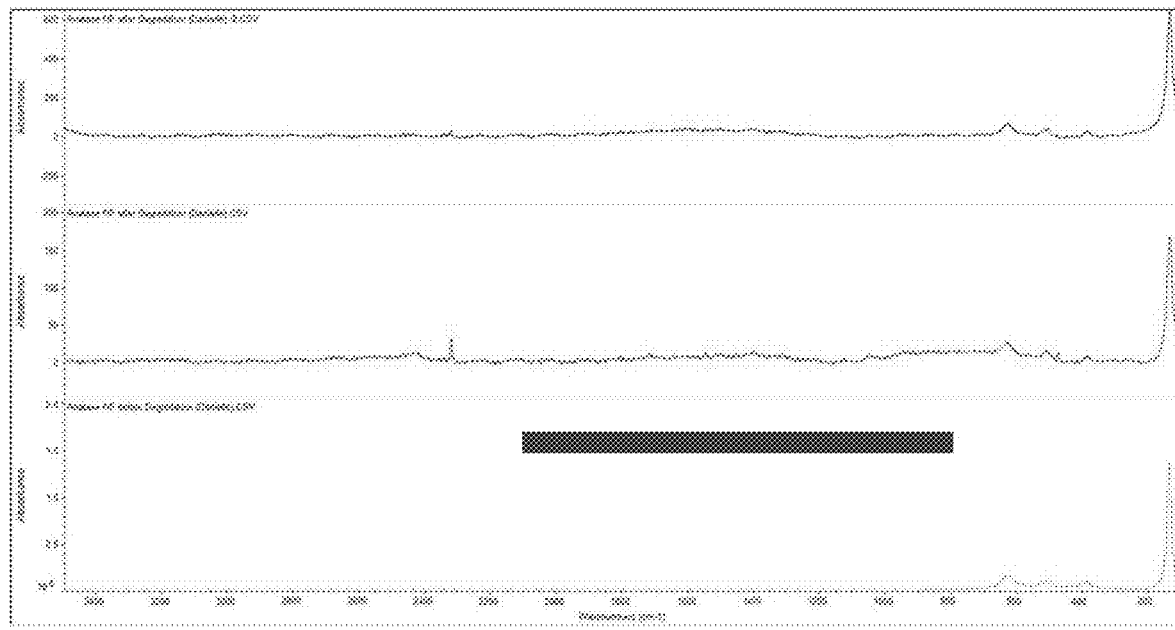
FIG. 44 shows Raman spectra of anatase $TiO_2$ nanofibers before and after photocatalysis with DMMP.

The question arose of where the phosphorus was going after the results of the previous experiments were acquired. The phosphorus peak in the NMR was only decreasing in intensity and not shifting or reappearing anywhere else in the spectra. It was then hypothesized that the phosphorus was binding to the TiO$_2$ catalyst and remaining bonded. This was attempted to be confirmed by Raman spectroscopy trying to find a Ti—P stretch of anatase TiO$_2$ nanofibers before and after photocatalysis with DMMP, as shown in FIG. 44. The Raman spectra showed a possible (but unconfirmed) indicator for a PH or PH$_2$ stretch.

Example 5

Polymethylmethacrylate (PMMA) fibers and PMMA/Titanium isopropoxide (TIP) fibers were created through an Electrospinning Procedure performed at 25 kV. The copper wire electrodes were separated by a distance of approximately 4 cm: Solution 1: 640 mg PMMA, 8 mL DMF, 1.32 mL TIP; and Solution 2: 640 mg PMMA, 8 mL DMF (no metal).

Figure 45:
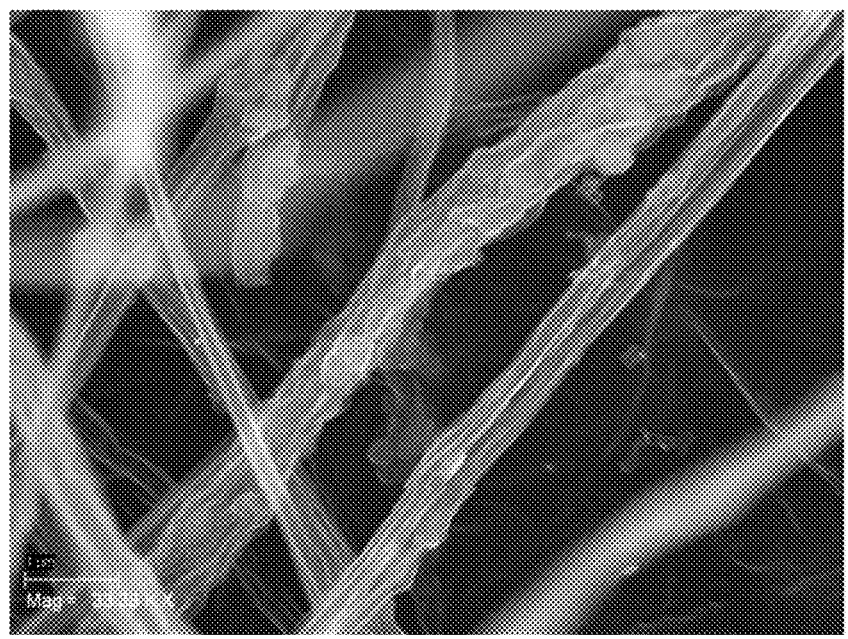
FIG. 45 shows an SEM image of blended PMMA/PMMA:TIP polymer fibers.
Figure 46:
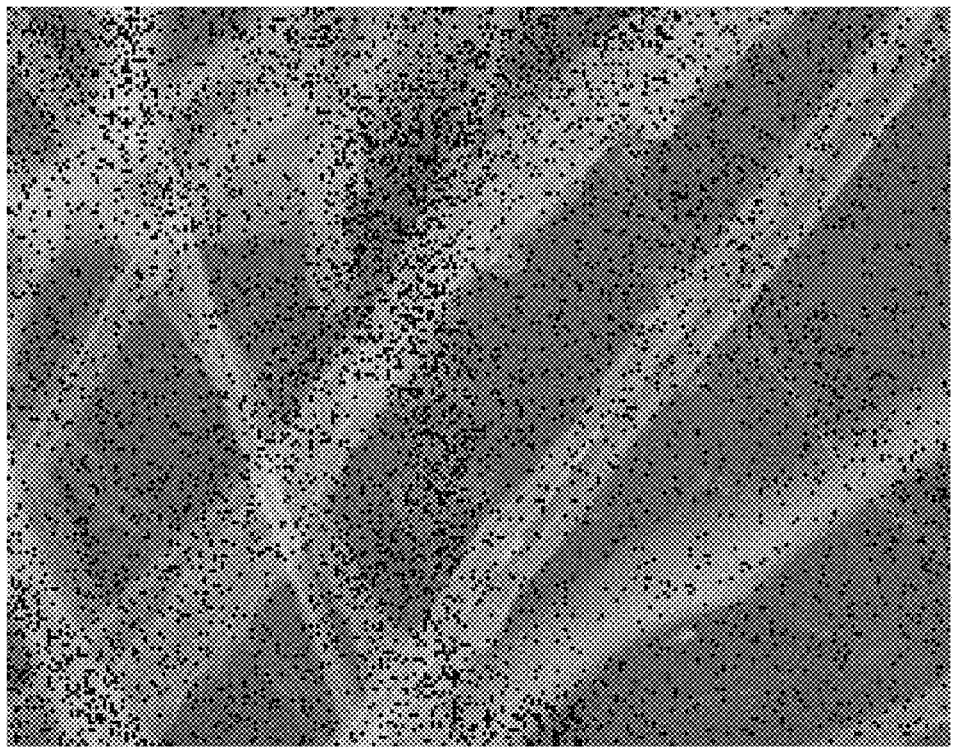
FIG. 46 shows EDX (mapping) polymer blended nanofibers where blue represents titanium distributed in the matrix.
Figure 47:
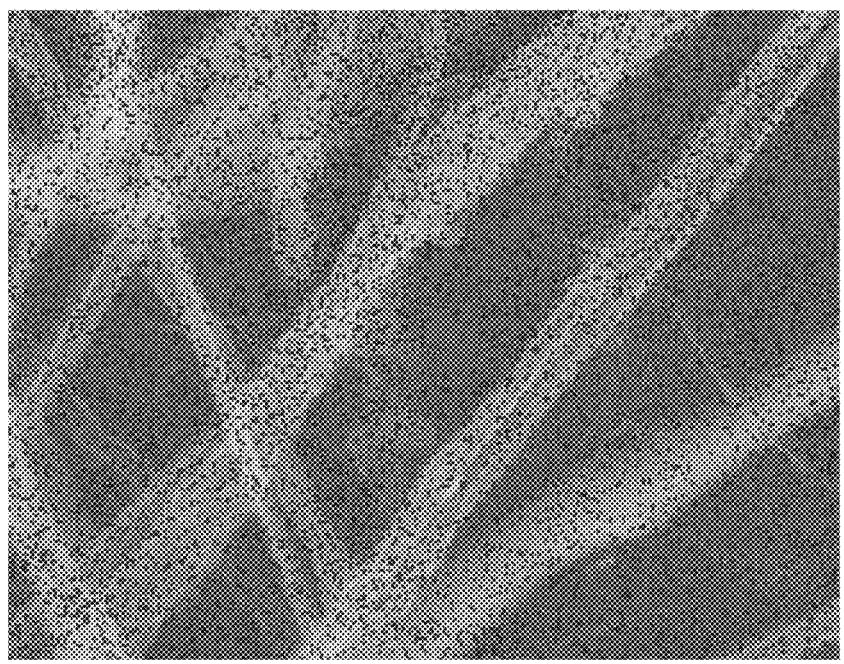
FIG. 47 shows EDX (mapping) polymer blended nanofibers where green represents oxygen distributed in the matrix.
Figure 48:
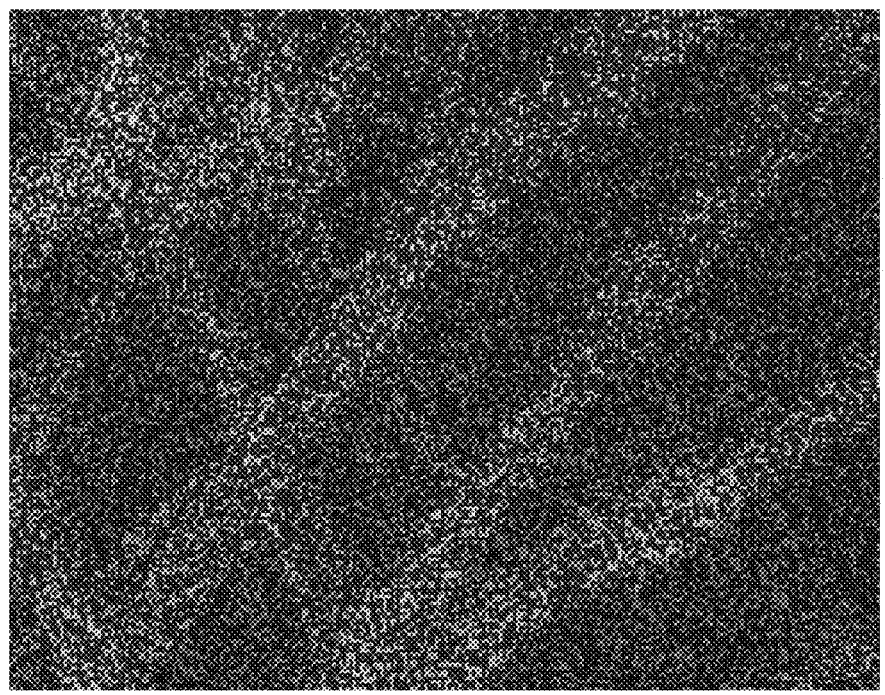
FIG. 48 shows EDX (mapping) polymer blended nanofibers where red represents the carbon distributed in the matrix.

Two sol-gel solutions were synthesized. 640 mg PMMA was dissolved in 8 mL DMF for both solutions. However, in only one of the solutions was 1.32 mL Titanium isopropoxide added. Both solutions were added to glass pipettes and sequentially placed on a continuous copper wire which is connected to a high voltage supply source. The solutions were subjected to 25 kV, and once enough charge accumulated the polymer solution was drawn from the pipette to an aluminum foil collector. A dual jet setup for electrospinning polymer fiber blends was employed. FIG. 45 shows an SEM image of blended PMMA/PMMA:TIP polymer fibers. The two large fibers in the center of the image seem to have different surface morphologies and therefore, EDX/mapping was preformed to determine the elemental makeup of these fibers and to confirm distribution of titanium. This can be seen in FIGS. 46, 47 and 48. FIG. 46 shows EDX(mapping) polymer blended nanofibers where blue represents titanium distributed in the matrix. The blue represents the titanium present in the sample. We can tell there is slight Ti density dispersion. However, the density difference is not so significant. It is possible that the fibers might be wet during the spinning and they mix with each other slightly. Therefore, we cannot distinguish the fibers easily. The slight different Ti density dispersion also, might be a hint of our purpose to make a mesh of two types of fibers. FIG. 47 shows EDX (mapping) polymer blended nanofibers where green represents oxygen distributed in the matrix. FIG. 48. EDX (mapping) polymer blended nanofibers where red represents the carbon distributed in the matrix. The SEM images reveal titania dispersion throughout the fibers, making it difficult to discern those fibers with and without the titanium isopropoxide precursor.

Figure 49:
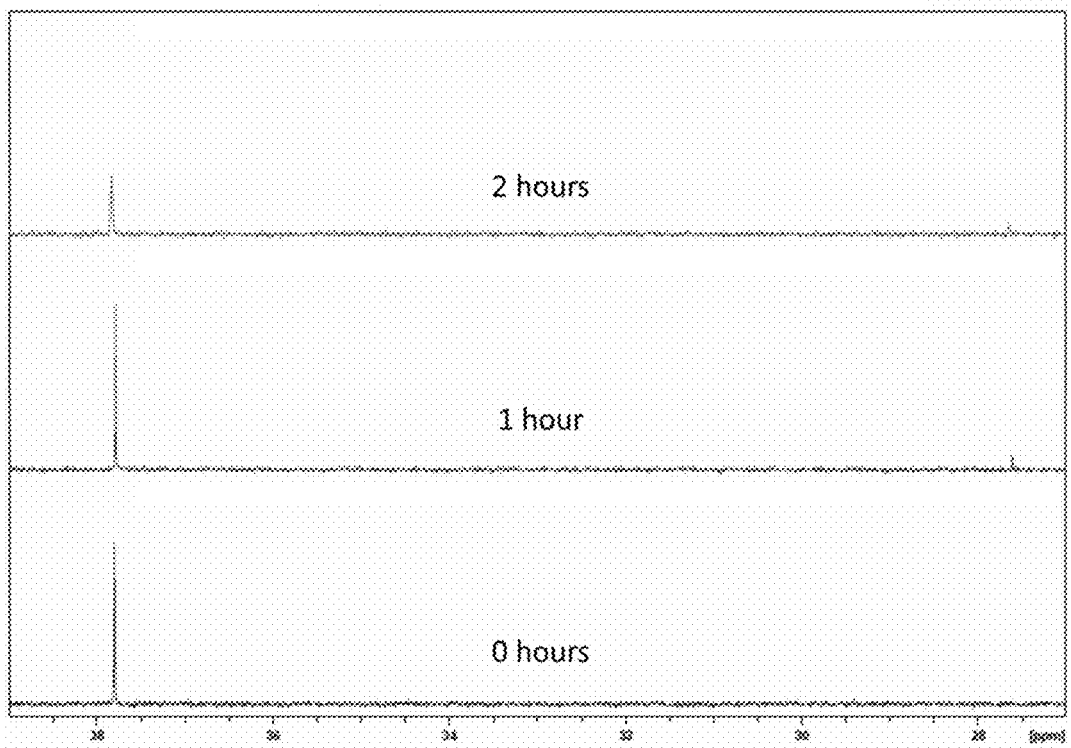
FIG. 49 shows $^{31}$P NMR of the photodegradation of 100 μM DMMP with TiO$_2$ nanofibers.

Recently, attempts have been made to replicate the photocatalytic degradation of DMMP with $TiO_2$ nanofibers and compare that to the literature standard of Degussa P25 nanoparticles. An experiment was unsuccessful in showing the signature DMMP $^{31}P$ NMR disappear in only 1 hour, as shown in FIG. 49, which shows $^{31}P$ NMR of the photodegradation of 100 μM DMMP with $TiO_2$ nanofibers. However, the P25 nanoparticles showed data consistent with previous results. This implies that the nanofibers were the source of variation in results.

Figure 50A:
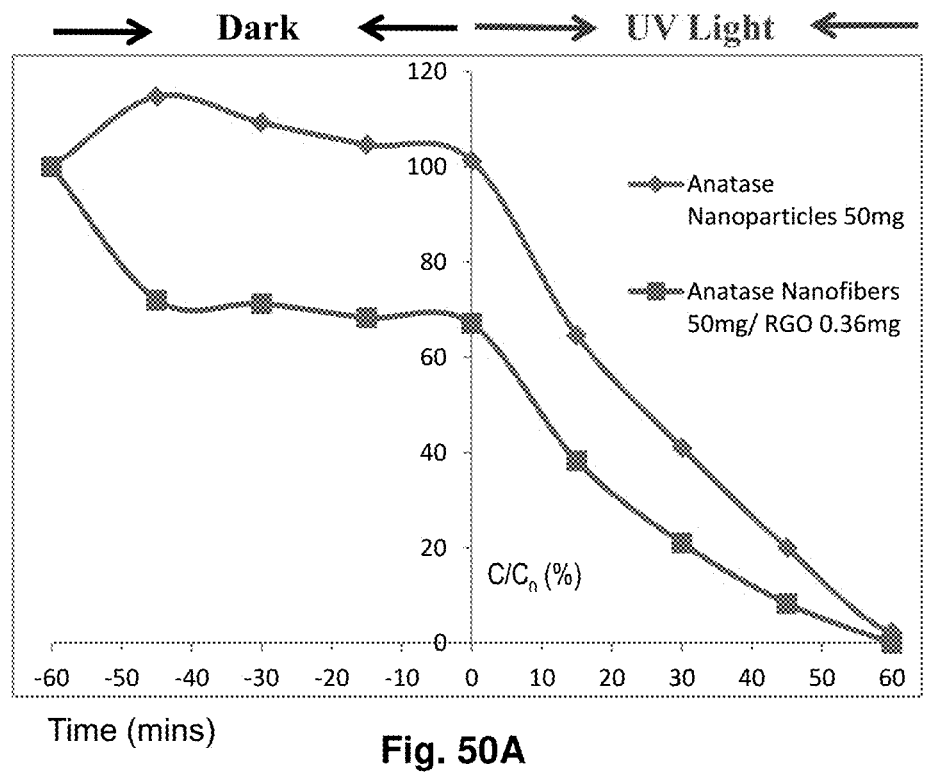
FIGS. 50A and 50B show that the degradation process is a first-order reaction; Anatase/RGO has a higher initial rate constant (k=0.0384 min$^{-1}$) than pure anatase nanoparticles (k=0.0301 min$^{-1}$) during the first 30 mins degradation.
Figure 50B:
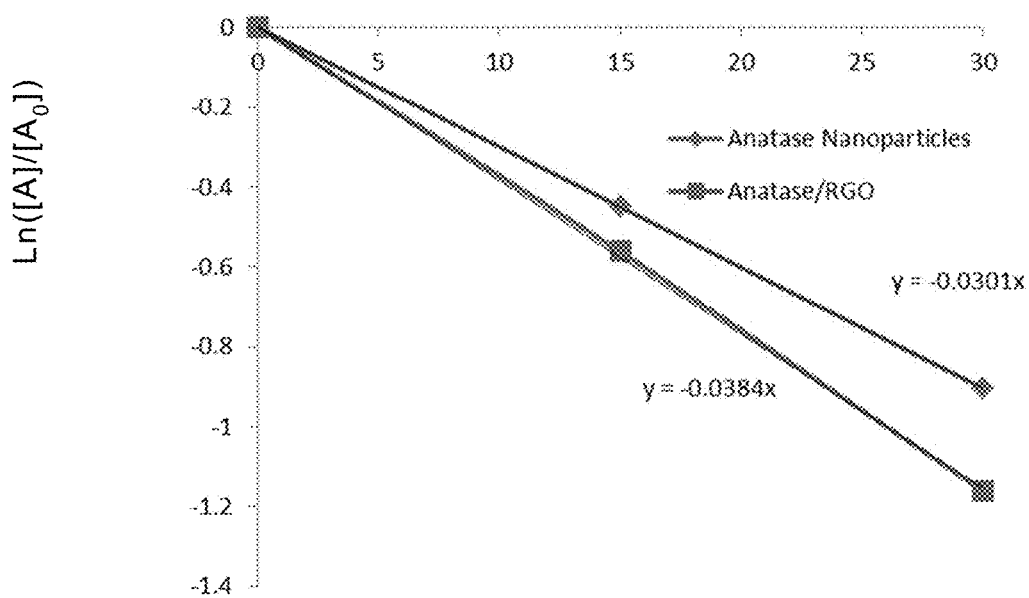

FIGS. 50A and 50B shows that the photocatalytic degradation process is a first-order reaction, and that Anatase/ RGO has a higher initial rate constant (k=0.0384 $min_{-1}$) than pure anatase nanoparticles (k=0.0301 $min^{-1}$) during the first 30 mins degradation.

What is claimed is:

1. A method of forming photocatalytic titanium oxide fibers, comprising:
    forming a polymeric suspension of titanium oxide sol-gel precursor;
    electrospinning the polymeric suspension to form a titanium oxide fibrous layer; and
    calcining the titanium oxide fibrous layer, to produce the photocatalytic titanium oxide fibers comprising a distinct rutile phase and anatase phase comprising a ratio of rutile phase to anatase phase of at least 3:97,
    wherein the photocatalytic titanium oxide fibers are photoexcitable to produce electron-hole pairs with an ability to form reactive radical species of proximate molecules from both the conduction band and the valence band,
    the rutile phase being adapted to absorb photons, form hydroxyl radicals and hydrogen anions from surface absorbed water, and to transfer electrons to the anatase phase, and
    the anatase phase being adapted to absorb photons, receive electrons from the rutile phase, and form superoxide radicals from surface absorbed oxygen.

2. The method according to claim 1, wherein the photocatalytic titanium oxide fibers have a ratio of rutile phase to anatase phase of less than 97:3.

3. The method according to claim 1, wherein the photocatalytic titanium oxide fibers further comprise at least one of a catalytic metal and graphene.

4. The method according to claim 1, wherein the photocatalytic titanium oxide fibers further comprise a metalorganic framework (MOF).

5. The method according to claim 1, wherein the photocatalytic titanium oxide fibers further comprise a Poly(3,4-ethylenedioxythiophene) (PEDOT) surface film.

6. The method according to claim 1, wherein the photocatalytic titanium oxide fibers further comprise a dye which interacts with light to at least one of:
    elevate an electron into a conduction band in the photocatalytic titanium oxide fibers; and
    receive an electron from a valence band in the photocatalytic titanium oxide fibers to produce a hole.

7. The method according to claim 1, wherein the photocatalytic titanium oxide fibers further comprise a dopant in the titanium oxide which induces semiconductivity.

8. The method according to claim 1, wherein the rutile phase is adapted to absorb an organic hydroxyl on a surface, form carboxy radicals and hydrogen anions from the surface absorbed organic hydroxyl, and to transfer electrons to the anatase phase.

9. The method according to claim 1, further comprising:
    photoexciting the photocatalytic titanium oxide fibers to form electron-hole pairs;
    forming hydroxyl radicals and hydrogen anions from surface absorbed water in the rutile phase, and transferring electrons to the anatase phase, and
    receiving electrons from the rutile phase into the anatase phase, and forming superoxide radicals from surface absorbed oxygen on the anatase phase.

10. The method according to claim 9, wherein the hydroxyl radicals and the superoxide radicals are formed in a solution containing an organic compound,
    further comprising degrading the organic compound by exposure to the hydroxyl radicals and the superoxide radicals.

11. The method according to claim 10, wherein the solution comprises an aqueous effluent stream.

12. The method according to claim 9, wherein the photocatalytic titanium oxide fibers further comprise at least one of a catalytic metal, graphene, a metal-organic framework (MOF), a Poly(3,4-ethylenedioxythiophene) (PEDOT) surface film, and a dopant in the titanium oxide which induces semiconductivity.

13. The method according to claim 9, wherein the photocatalytic titanium oxide fibers further comprise a dye which interacts with light to transfer an electron into a conduction band in the titanium dioxide.

14. The method according to claim 1, further comprising:
    moistening the photocatalytic titanium oxide fibers;
    irradiating the moistened photocatalytic titanium oxide fibers with ultraviolet or visible radiation; and
    degrading an organic compound with the irradiated, moistened photocatalytic titanium oxide fibers.

15. The method according to claim 14, wherein the photocatalytic titanium oxide fibers further comprise at least one of a catalytic metal, graphene, a metal-organic framework (MOF), a Poly(3,4-ethylenedioxythiophene) (PEDOT) surface film, a dopant in the titanium oxide which induces semiconductivity, and a dye which interacts with light to at least one of: (i) elevate an electron into a conduction band in the photocatalytic titanium oxide fibers; and (ii) produce a hole in a valence band in the photocatalytic titanium oxide fibers.

16. A method of forming photocatalytic fibers, comprising:
  suspending a polymeric titanium oxide sol-gel precursor in a solution;
    electrospinning the solution to form a titanium oxide fibrous layer comprising photocatalytic titanium oxide fibers; and
    calcining the titanium oxide fibrous layer to form distinct regions within the photocatalytic titanium oxide fibers having at least two distinct phases, comprising a rutile phase and an anatase phase each having a different respective bandgap, the photocatalytic titanium oxide fibers comprising a dopant which induces semiconductivity,
  wherein the photocatalytic titanium oxide fibers in the calcined titanium oxide fibrous layer are photoexcitable to produce electron-hole pairs from both a conduction band and a valence band of the at least two distinct phases,
  wherein photoexcited electrons migrate from the conduction band of a first phase to the conduction band of a second phase, and photoexcited electrons in the valence band of the second phase migrate into the valence band of the first phase, and
  wherein the calcined titanium oxide fibrous layer is configured to selectively form free radical oxygen compounds from oxygen compounds in the environment from the conduction band of the second phase and the valence band of the first phase.

17. A method of forming photocatalytic titanium oxide fibers, comprising:
  providing a suspension of a titanium oxide sol-gel precursor;
  forming a titanium oxide fibrous layer comprising photocatalytic titanium oxide fibers by electrospinning the titanium oxide sol-gel precursor suspension; and
  calcining the titanium oxide fibrous layer to form photocatalytic titanium oxide fibers having a distinct rutile phase and an anatase phase, having a ratio of rutile phase to anatase phase of between 3:97 and 97:3,
  wherein the distinct rutile phase and an anatase phase of the photocatalytic titanium oxide fibers are each configured to be photoexcitable under excitation with visible or ultraviolet light to produce electron-hole pairs, and to form reactive radical species of proximate molecules from both a conduction band of the rutile phase and a valence band of the anatase phase of the photocatalytic titanium oxide fibers.

18. The method according to claim 17, wherein:
  the rutile phase is adapted to absorb photons, form hydroxyl radicals and hydrogen anions from surface absorbed water, and to transfer electrons to the anatase phase; and
  the anatase phase is adapted to absorb photons, form superoxide radicals from surface absorbed oxygen, and receive electrons from the rutile phase.

19. The method according to claim 18, wherein:
  the photocatalytic titanium oxide fibers further comprising one of a catalytic metal and a metal-organic framework (MOF), and a dopant in the titanium oxide which induces semiconductivity.

20. The method according to claim 18, wherein the photocatalytic titanium oxide fibers further comprise at least one of: graphene, and Poly(3,4-ethylenedioxythiophene) (PEDOT).

* * * * *